United States Patent [19]

Inada

[11] Patent Number: 5,311,425
[45] Date of Patent: May 10, 1994

[54] RESERVATION SYSTEM TERMINAL

[75] Inventor: Takaya Inada, Tokyo, Japan

[73] Assignee: Japan Airlines, Co., Ltd., Tokyo, Japan

[21] Appl. No.: 730,859

[22] PCT Filed: Nov. 28, 1990

[86] PCT No.: PCT/JP90/01547
§ 371 Date: Sep. 17, 1991
§ 102(e) Date: Sep. 17, 1991

[87] PCT Pub. No.: WO91/08540
PCT Pub. Date: Jun. 13, 1991

[30] Foreign Application Priority Data

Nov. 28, 1989 [JP] Japan .................................. 1-308028

[51] Int. Cl.$^5$ ............................................. G06F 15/00
[52] U.S. Cl. ...................................................... 364/407
[58] Field of Search ................................. 364/401, 407

[56] References Cited

U.S. PATENT DOCUMENTS 4,449,186 5/1992 Kelly et al. ........................... 364/407

FOREIGN PATENT DOCUMENTS

| 61-196319 | 8/1986 | Japan | G06F 3/037 |
| 1196320 | 8/1986 | Japan . | |
| 62-69363 | 3/1987 | Japan | G06F 15/26 |
| 62-150464 | 7/1987 | Japan | G06F 15/26 |
| 1-166254 | 6/1989 | Japan | G06F 15/26 |

OTHER PUBLICATIONS

Kuroda, "The MELCOM 70 Airport Check-In System", Jun. 1976, p. 8.

Apple Computer Inc., "Macintosh System Software User's Guide, Version 6.0", 1988, pp. 11-26, 52-74.

*Primary Examiner*—Roy N. Envall, Jr.
*Assistant Examiner*—Ari M. Bai
*Attorney, Agent, or Firm*—Beveridge, DeGrandi, Weilacher & Young

[57] ABSTRACT

Disclosed is a reservation system terminal connected to a host computer for controlling the overall reservation status. The terminal can inquire of the host computer the present reservation status, request the reservation acquisition, and prepare, refer to, or change the reservation record to be received by the host computer. The terminal is provided with a terminal computer, a display unit (17) and a pointing device. The terminal computer can execute in parallel mode a plurality of tasks such as a reservation process for a reservation acquisition task, a reservation edition process for reservation record preparation and a change task, a reservation record reference process for preparing a reservation record reference task, etc. In each of these processes (reservation, reservation, edition, reservation record reference), images are formed, respectively, and displayed in multi-window fashion. Each image includes a plurality of arranged visible parts operable by the pointing device. Therefore, various tasks related to reservation can be executed simply when the operator points to positions on these visible parts with the pointing device. Various data that is usable in common is automatically transferred among the above-mentioned processes and coordinated through inter-process communications. The arrangement of the images can be freely changed, so that any required image can be displayed in the front of a multidisplay image.

27 Claims, 87 Drawing Sheets

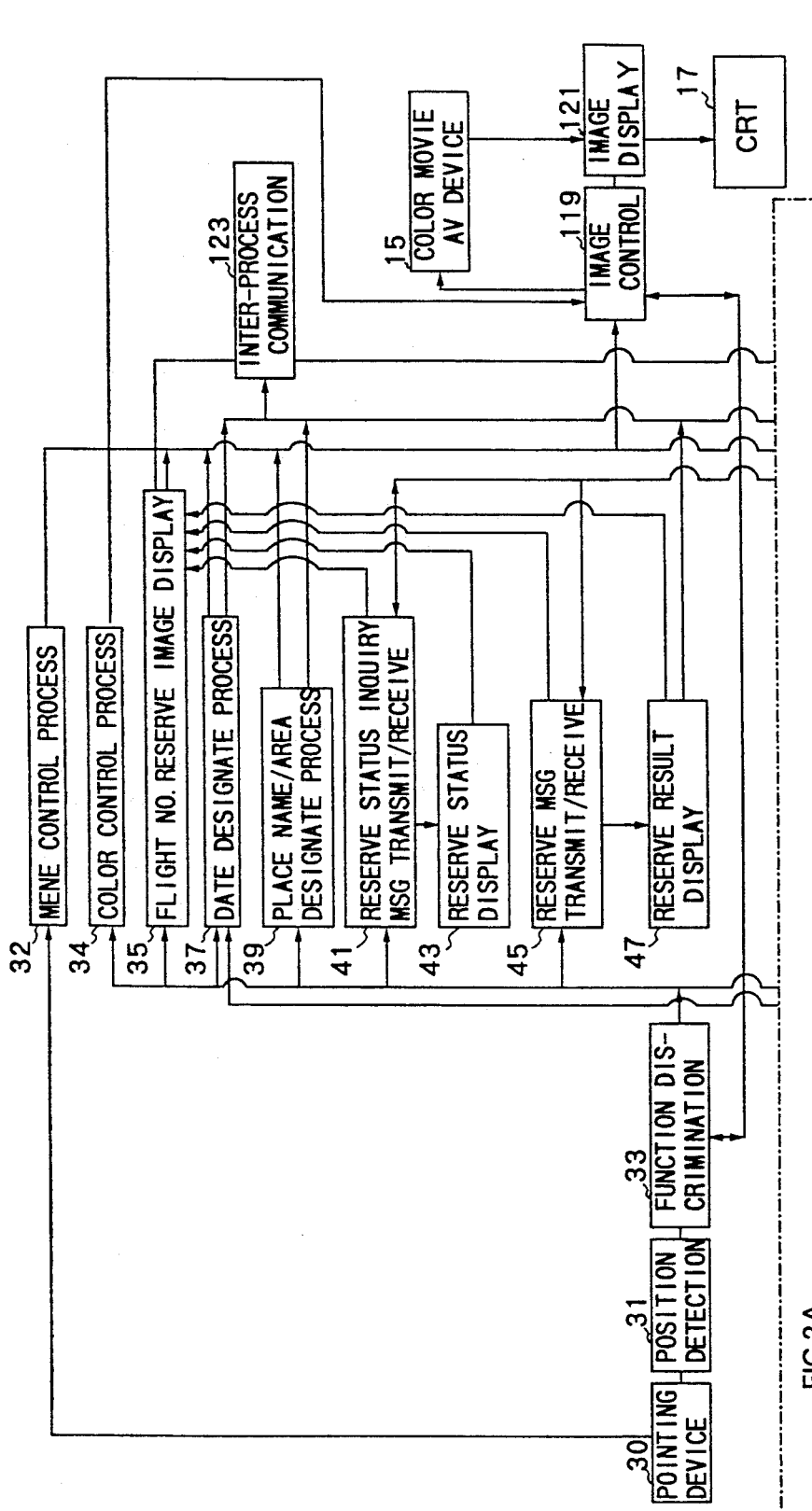
FIG.2A I

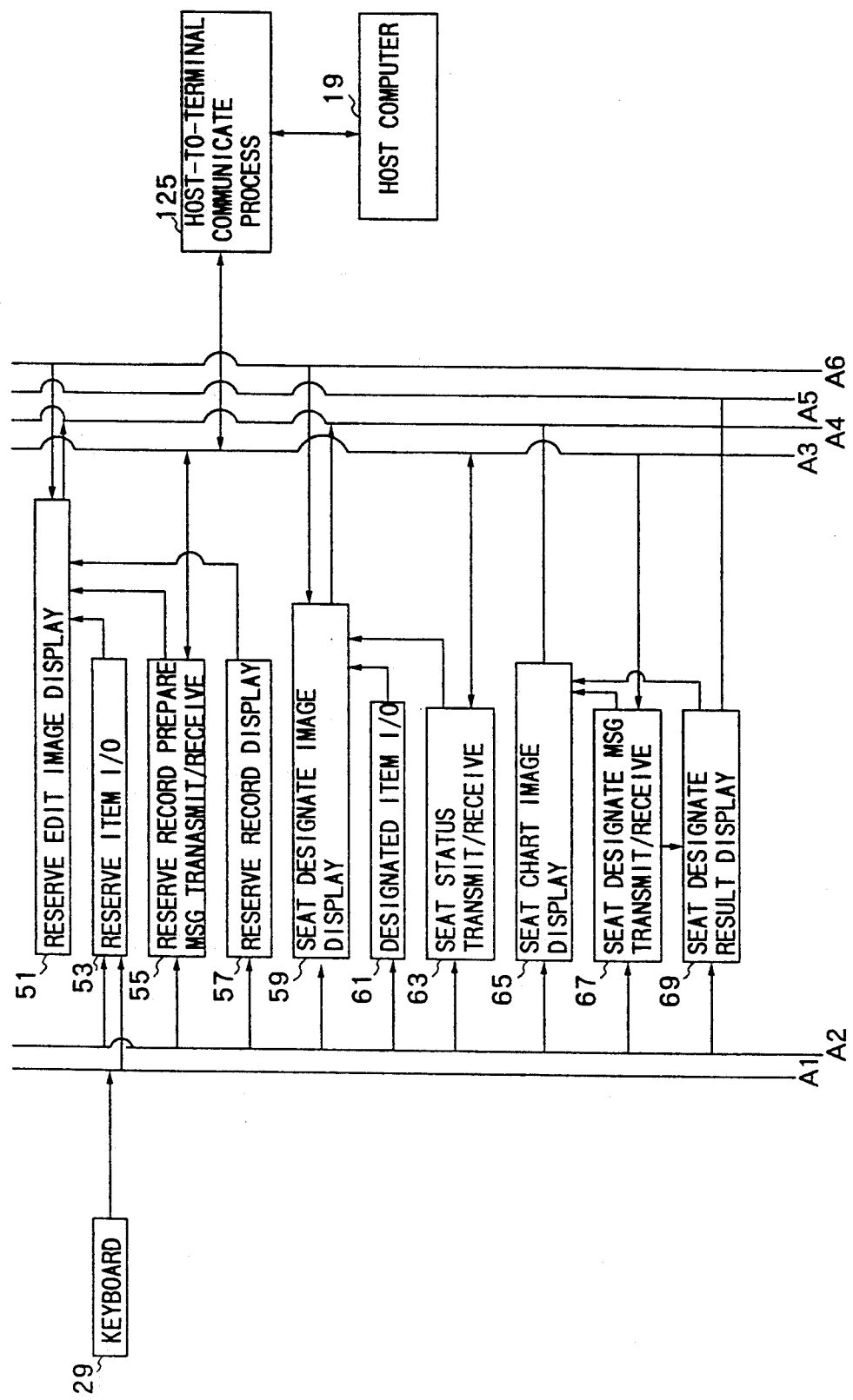
FIG.2A II

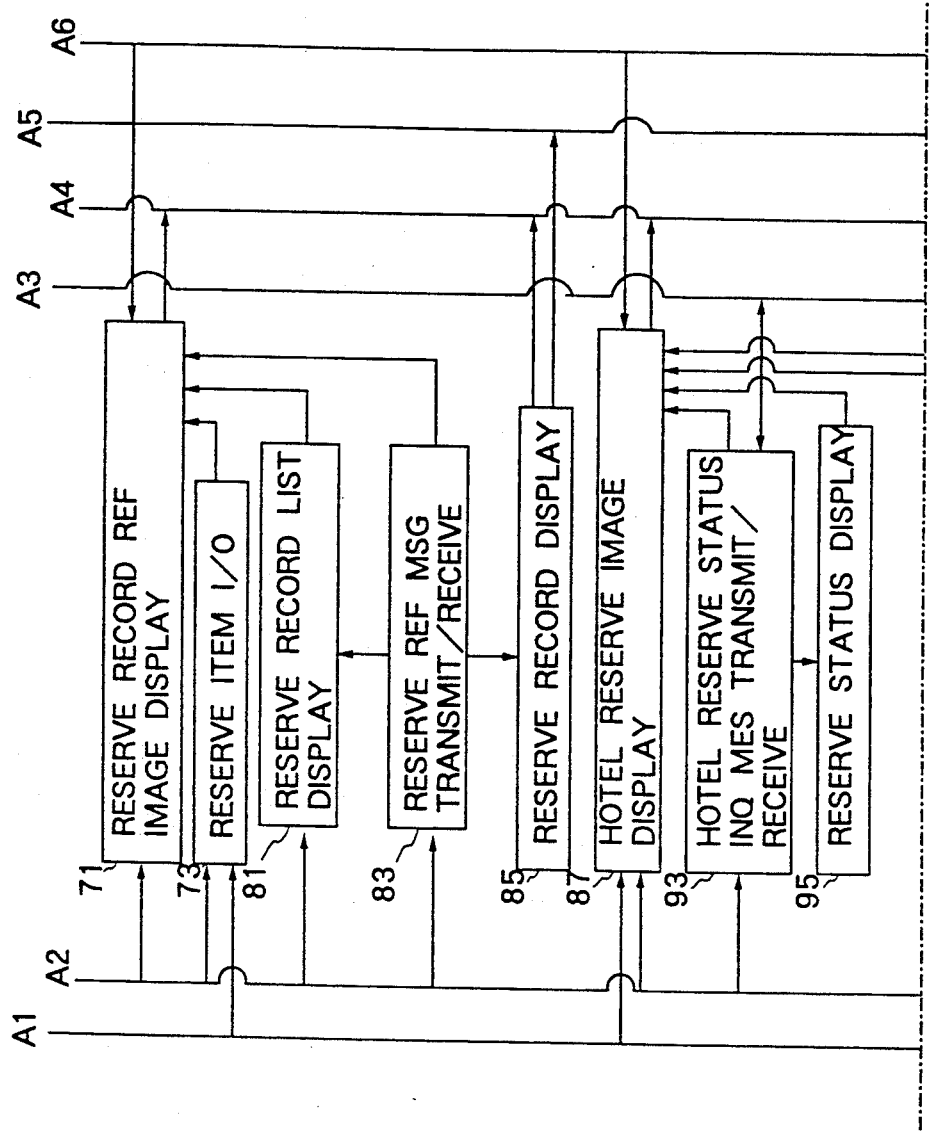
FIG.2B I

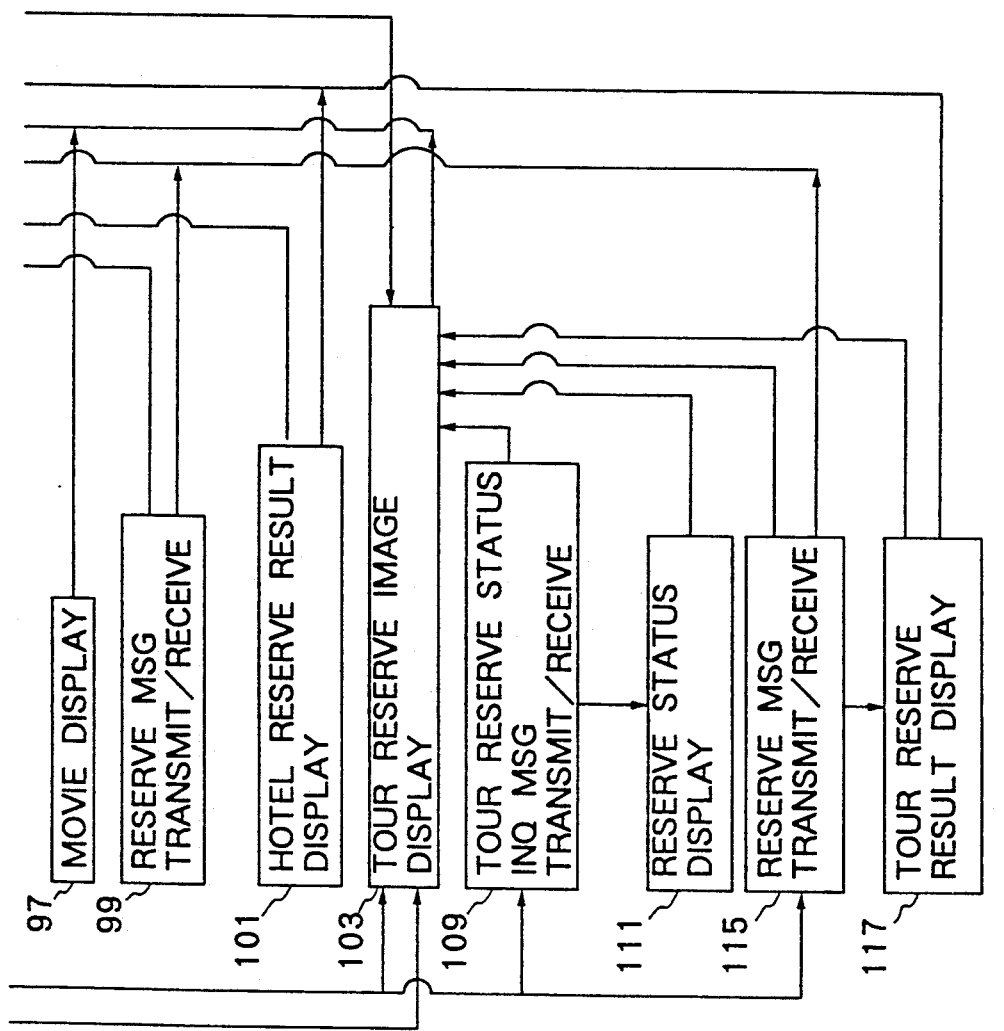
FIG.2B II

FIG.3

| 日付 | 便名 | 出発 | 到着 | 機種 | 乗継 | 予約状況 |
|---|---|---|---|---|---|---|
| 16 | 日本航空101 | 0700 | 0800 | 747 | 0 | F51 席以上 Y51 席以上 |
| 16 | 日本航空105 | 0850 | 0950 | D10 | 0 | J51 席以上 Y51 席以上 |
| 16 | 日本航空109 | 1045 | 1145 | D10 | 0 | P51 席以上 Y51 席以上 |
| 16 | 日本航空113 | 1300 | 1400 | D10 | 0 | Q51 席以上 Y51 席以上 |
| 16 | 日本航空117 | 1510 | 1810 | D10 | 0 | F51 席以上 Y51 席以上 |
| 16 | 日本航空125 | 1800 | 1900 | 747 | 0 | F51 席以上 Y51 席以上 |
| 16 | 日本航空127 | 1935 | 2035 | 747 | 0 | F51 席以上 Y51 席以上 |

1989年 9月

| 日 | 月 | 火 | 水 | 木 | 金 |
|---|---|---|---|---|---|
| 3 | 4 | 5 | 6 | 7 | 1 |
| 10 | 11 | 12 | 13 | 14 | 8 |
| 17 | 18 | 19 | 20 | 21 | 15 |
| 24 | 25 | 26 | 27 | 28 | 22 |
|   |   |   |   |   | 29 |

1989年 10月

| 日 | 月 | 火 | 水 | 木 | 金 |
|---|---|---|---|---|---|
| 1 | 2 | 3 | 4 | 5 | 6 |
| 8 | 9 | 10 | 11 | 12 | 13 |
| 15 | 16 | 17 | 18 | 19 | 20 |
| 22 | 23 | 24 | 25 | 26 | 27 |
| 29 | 30 | 31 |   |   |   |

便予約 (AXE) —179
国内都市指定 —181
国際都市指定 —183
中断 —185

| | 予約編集 |
|---|---|

予約記録番号 [NARITA] 作成日 [12]月[27]日有効期限

*先頭に挿入する場合はここをクリックしてください。…
1. AAA/AAA      20 女性
2. BBB/BBB      30 男性
3. CCC/CCC      10 男性
4. DDD/DDD      20 女性

■便予約  ■予約照会
□ホテル  ■事前座席
□ツアー  発信  完了
■動画  中断  確認
■男性 □女性 □幼児

名前 [　　　　　　　　] 年

連絡先 [TY0045-555-6666]  ■自宅 □勤務先 □代理店
       [TY003-456-7053]   □自宅 ■勤務先 □代理店

申込者 □1 [PSGR]  ■本人 □その他
       □2

搭乗者
1　INADA／TAKAYA　　38男性
2　INADA／TAEKO　　35女性
3　INADA／MIMI　　　4女性

■ホテル　355
都市　東京　357
　　　371　373　375　　　381
□IN　11月11日　　　□部屋コード
　　　377　379
□OUT　11月12日　　□部屋数
位置　□空港□都心□市街□リゾート　401
追加情報
ホテルリスト

帝国ホテル　－NHI（WH1101）
　SGLB　A　B　　24000　27000
帝国ホテル　－NRML－NHI（JH1101）
　SGLB　A　B　C　28000　32000　36000
銀座日航ホテル（WH1111）
　SGLB　A＊　B＊　9000　10000
銀座日航ホテル　－NRML　（HT1111）
　SGLB　A－　B－　9700　10900
川崎日航ホテル　－NHI（WH1142）
　SGLB　A＊　10000

359　361　363　　　394
発信　中断　次頁　　　□
　　383　　　　　　　393
　　□A□B□C□その他　■国内都市
　385　387　389
　1　＋　－
　　　　　　　　　　　391
種別　□日航ホテル□エアーホテル
409

365　367　369
■日付指定　■国内都市　■国際都市
384　　　　　　　　　　　407
□　□部屋コード□X□Y□Z□その他
　　　　　　　　395　397　399
　　□部屋数　　1　＋　－
　　　　　　　　　　　　　405
グレード　□高級□一級□普通□ツーリスト

TWNB　X　Y　28000　31000

TWNB　X　Y　Z　32000　36000　40000

TWNB　X＊　Y＊　15000　17000

TWNB　X－　Y－　17500　20000

TWNB　X＊　15000

| ツアーコード | ツアー名 | | | 部屋 | 食事 | FLTパタン | 販売価格 |
|---|---|---|---|---|---|---|---|
| JA1306A | マイコース | 6日間 | プリンセスカイウラニ | 海側 | | BC | 222,000B |
| JA1306B | マイコース | 6日間 | プリンセスカイウラニ | 海側 | 食事付 | BC | 249,000B |
| JA1306C | マイコース | 6日間 | ロイヤルハワイアン | デラックス | | BC | 258,000B |
| JA1306D | マイコース | 6日間 | ロイヤルハワイアン | デラックス | 食事付 | BC | 285,000B |
| JA1306E | マイコース | 6日間 | ハワイアンリージェント | 海側 | | BC | 242,000B |
| JA1306F | マイコース | 6日間 | ハワイアンリージェント | 海側 | 食事付 | BC | 269,000B |
| JA1306G | マイコース | 6日間 | モアナサーフライダー | 海側 | | BC | 258,000B |
| JA1306H | マイコース | 6日間 | モアナサーフライダー | 海側 | 食事付 | BC | 285,000B |
| JA1306I | マイコース | 6日間 | ヒルトンレインボータワー | | | BC | 258,000B |
| JA1306J | マイコース | 6日間 | ヒルトンレインボータワー | | 食事付 | BC | 285,000B |

FIG.12

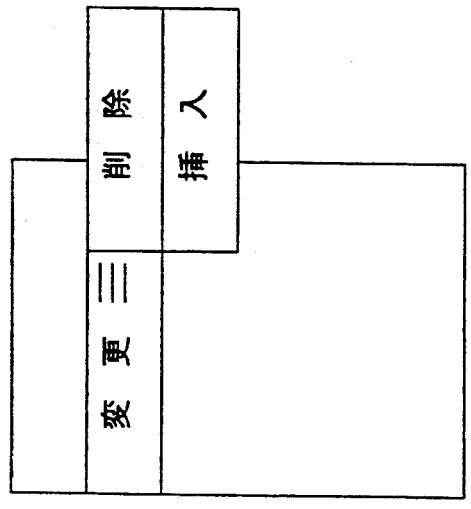
FIG.14A
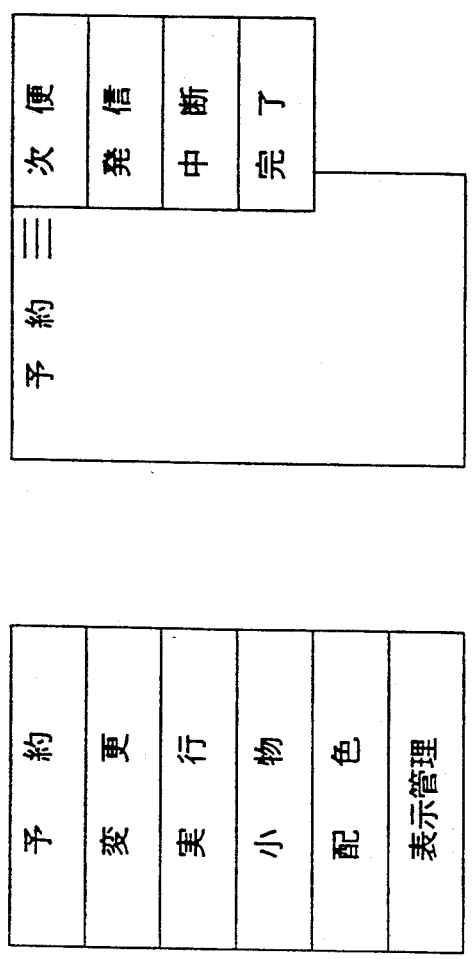
FIG.14B
FIG.14C
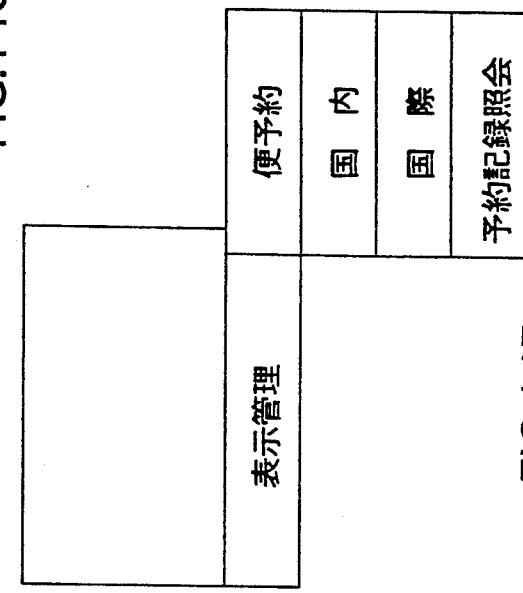
FIG.14E
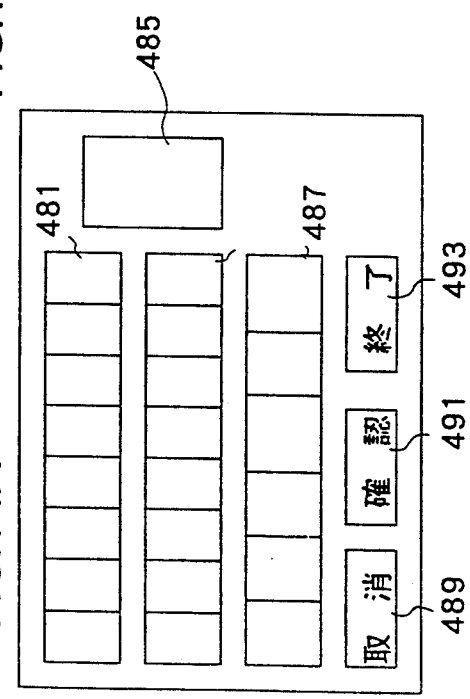
FIG.14D

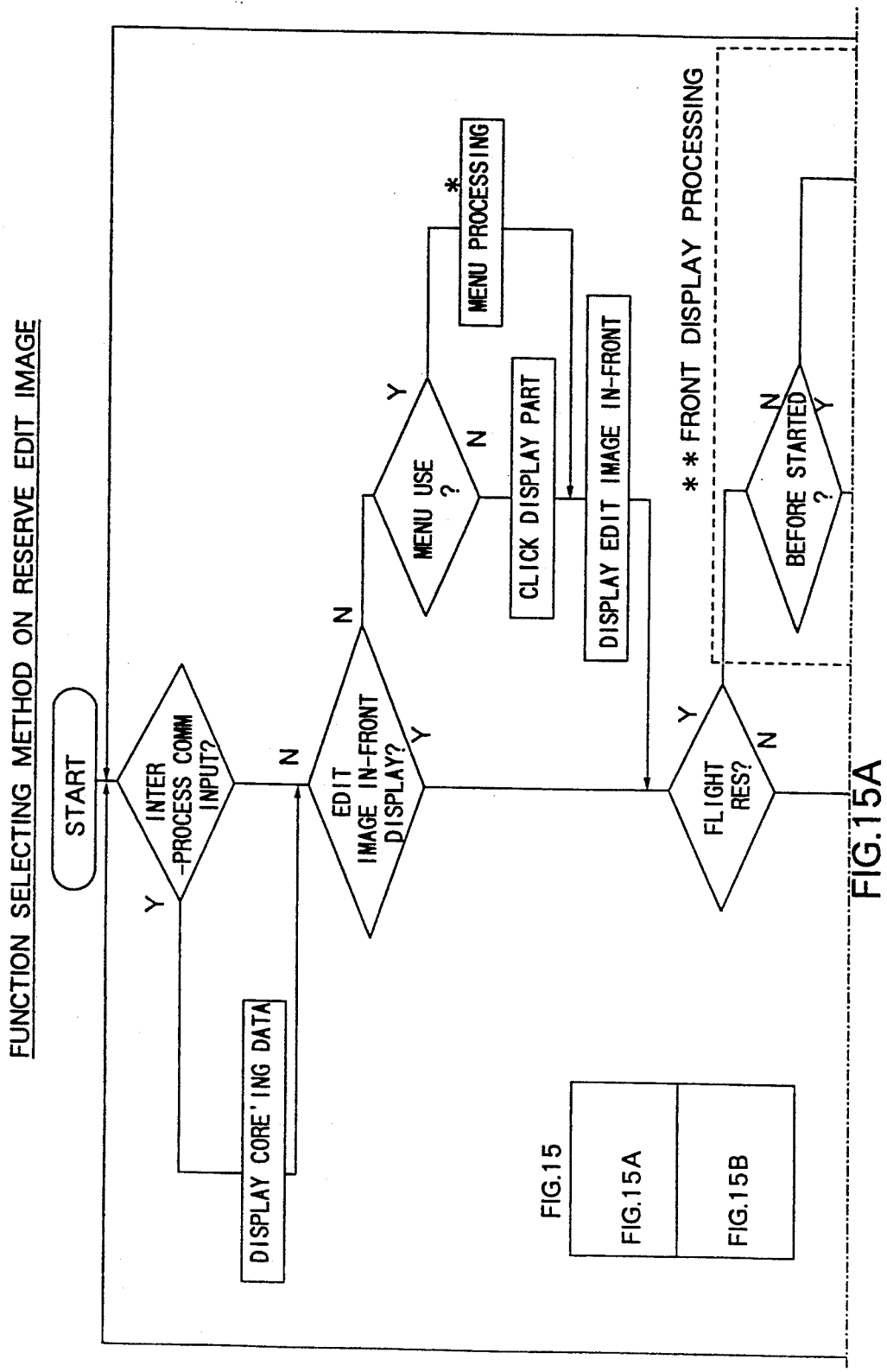

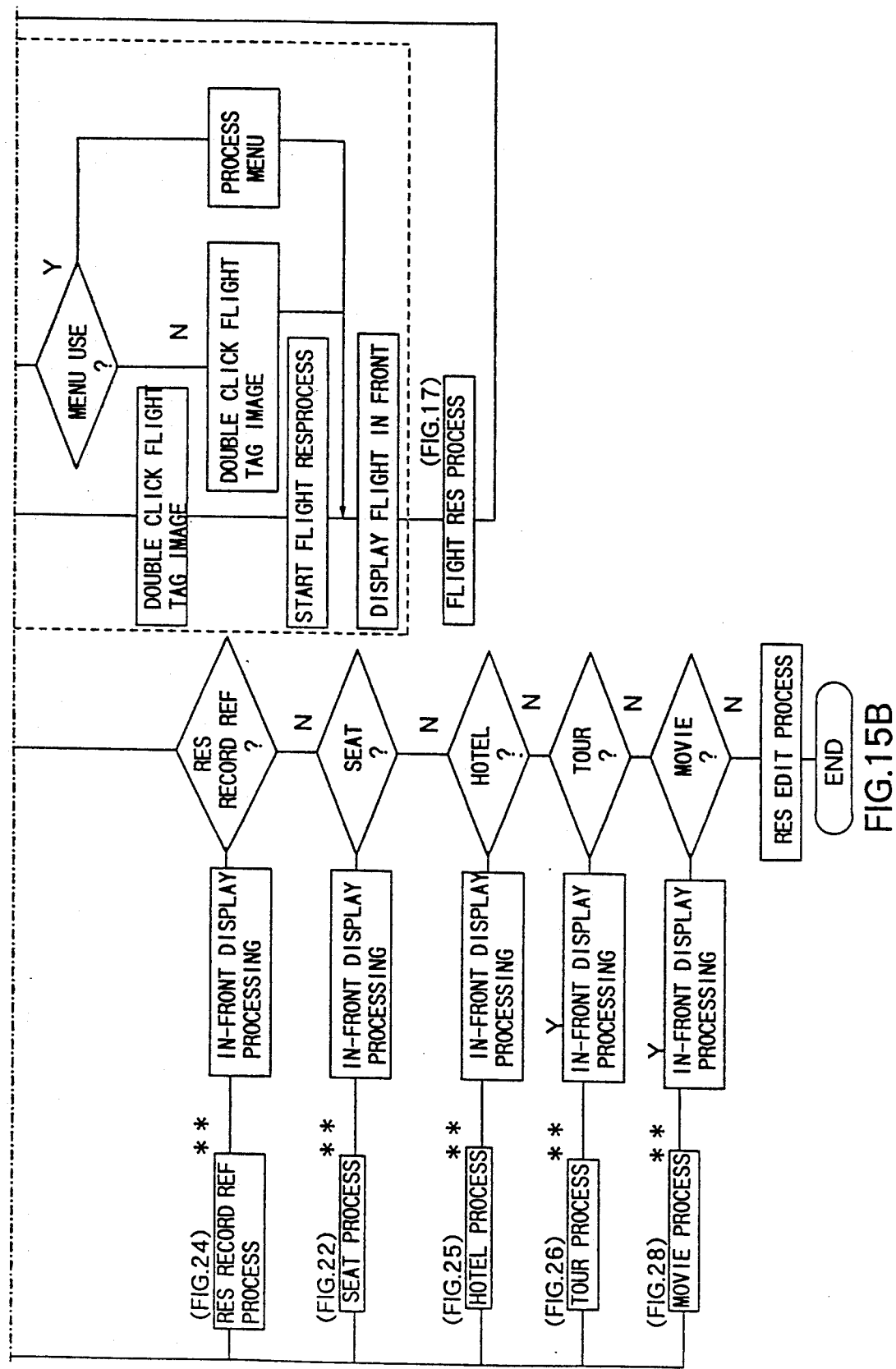

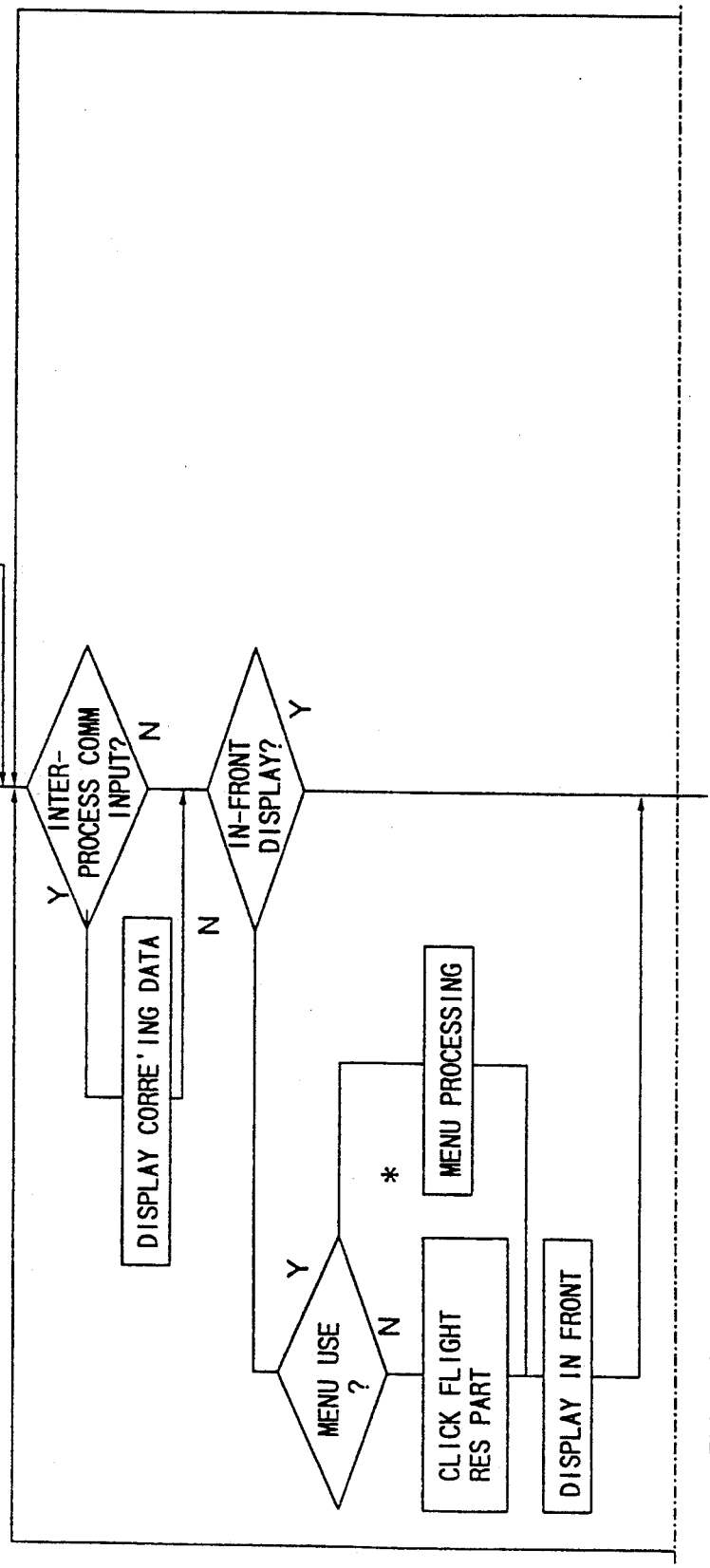
FIG.17A I

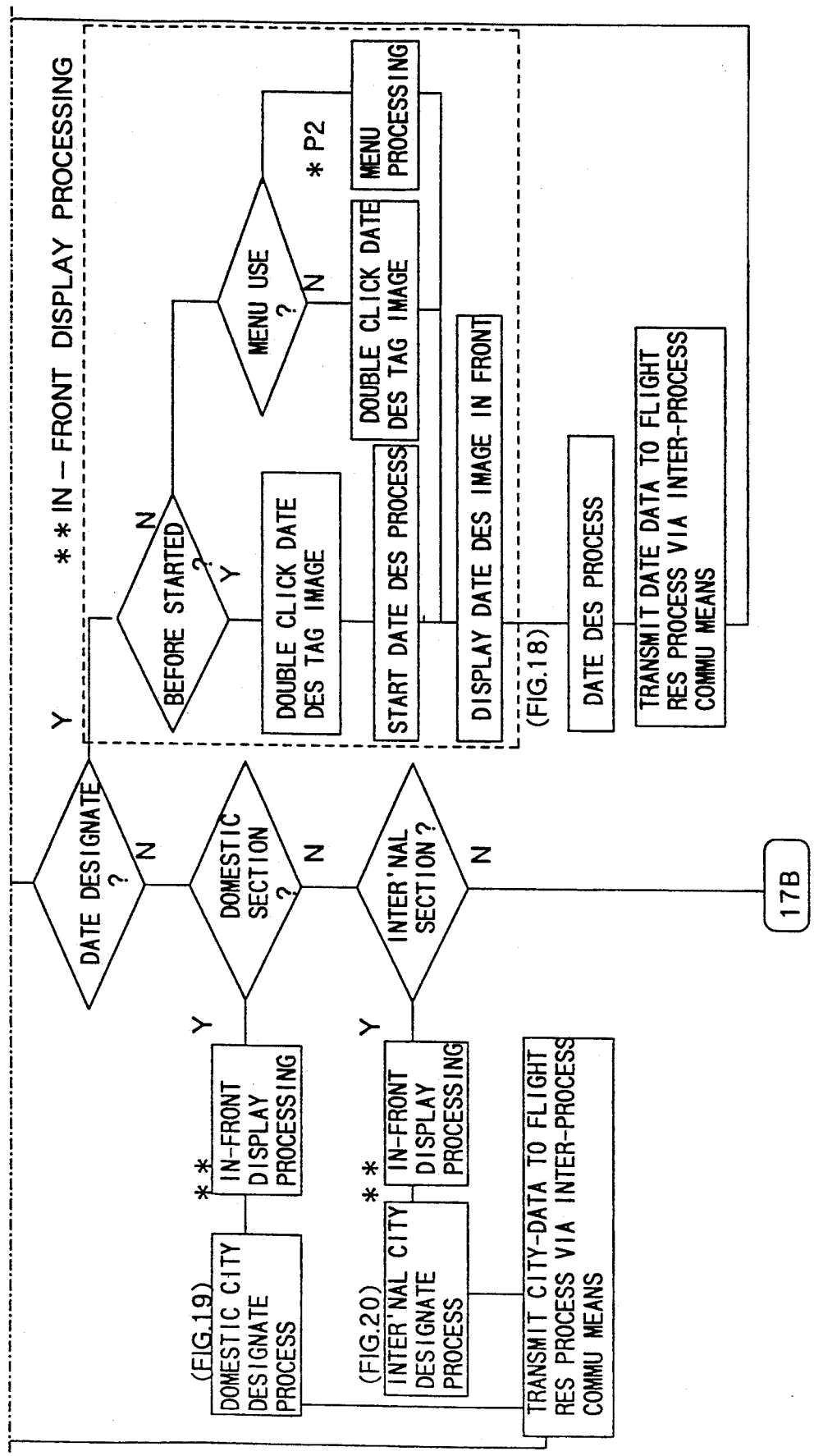
FIG.17A II

FIG.17B I

| FIG.17B I |
| FIG.17B II |

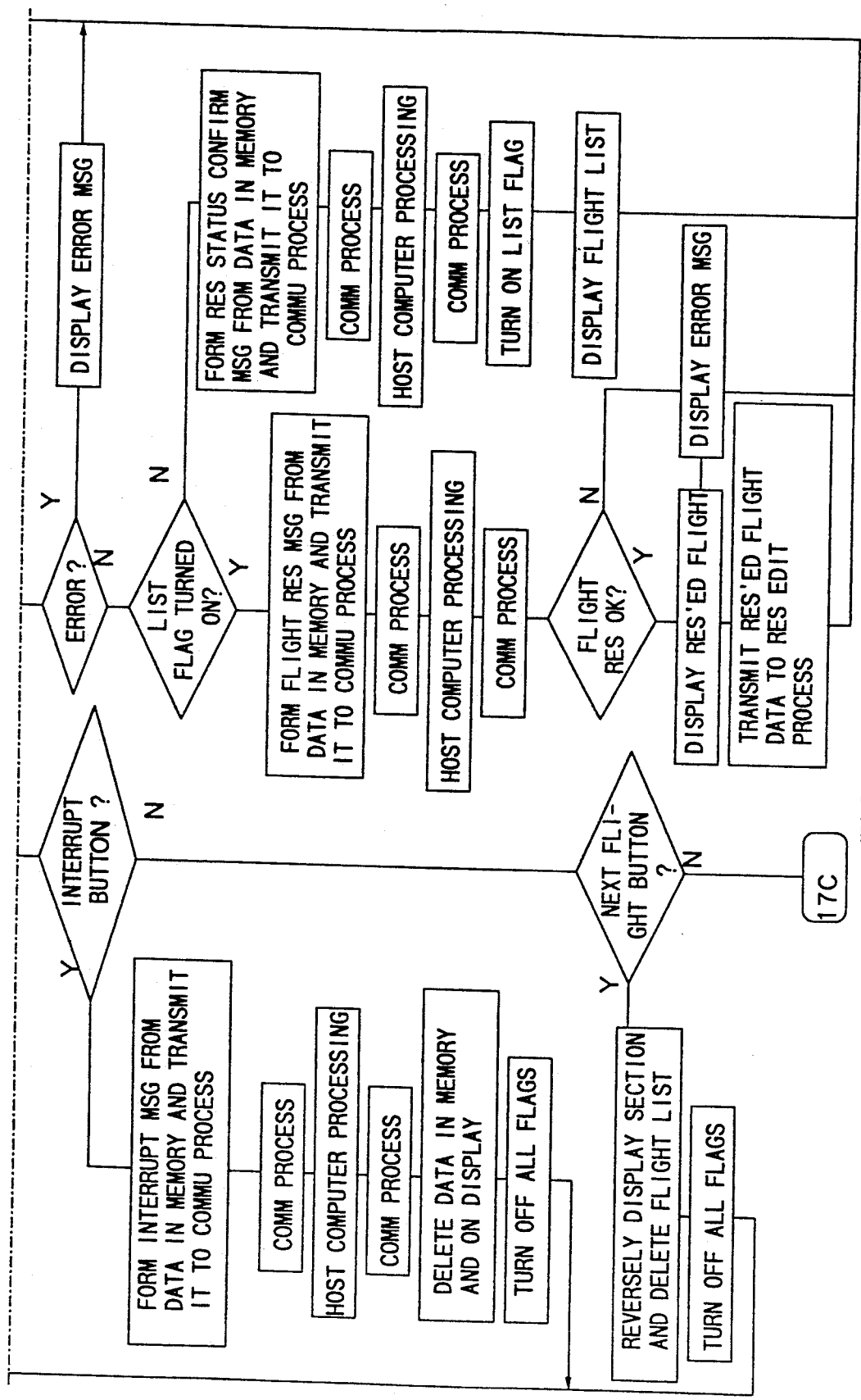
FIG.17B II

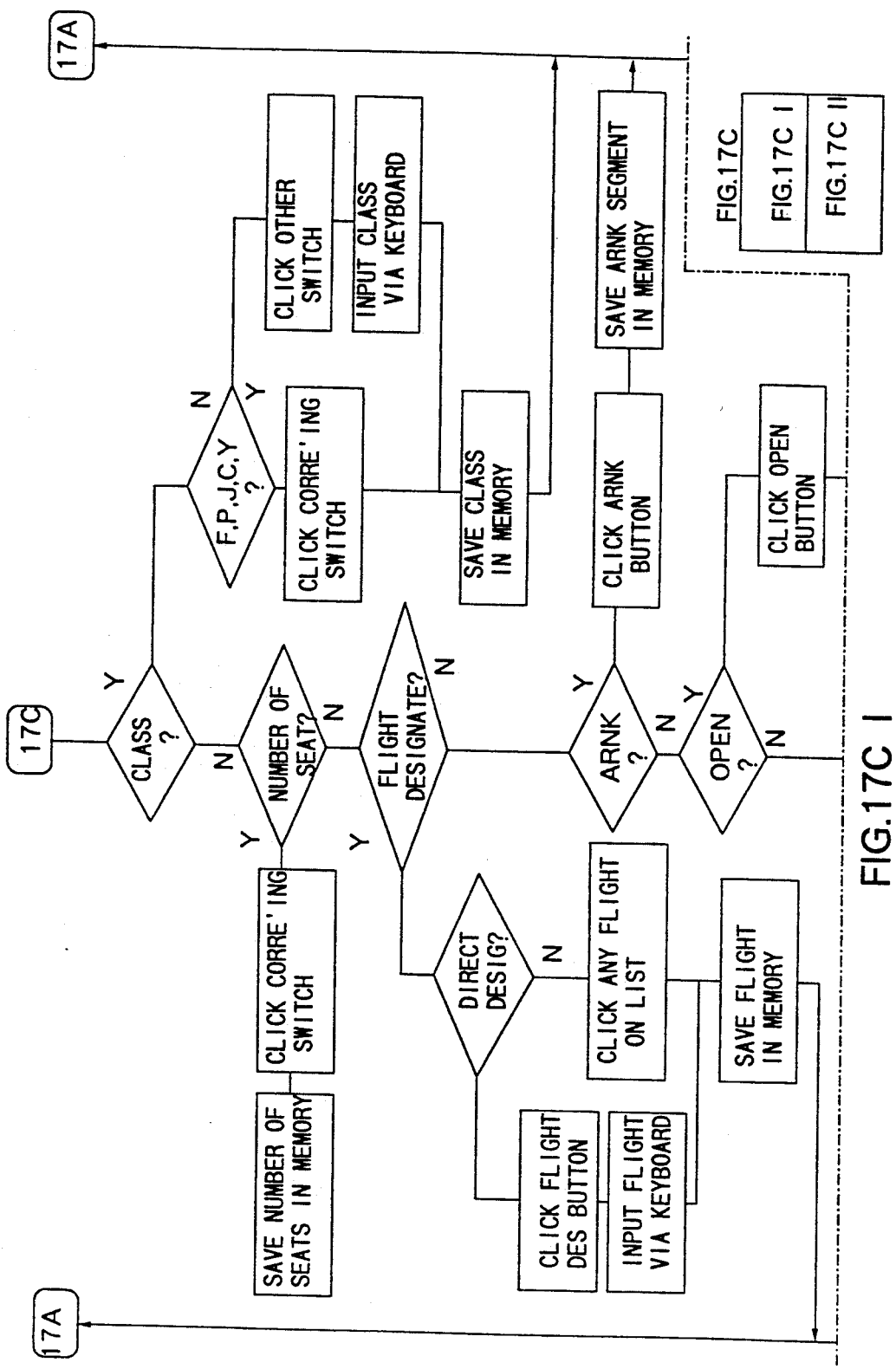
FIG.17C I

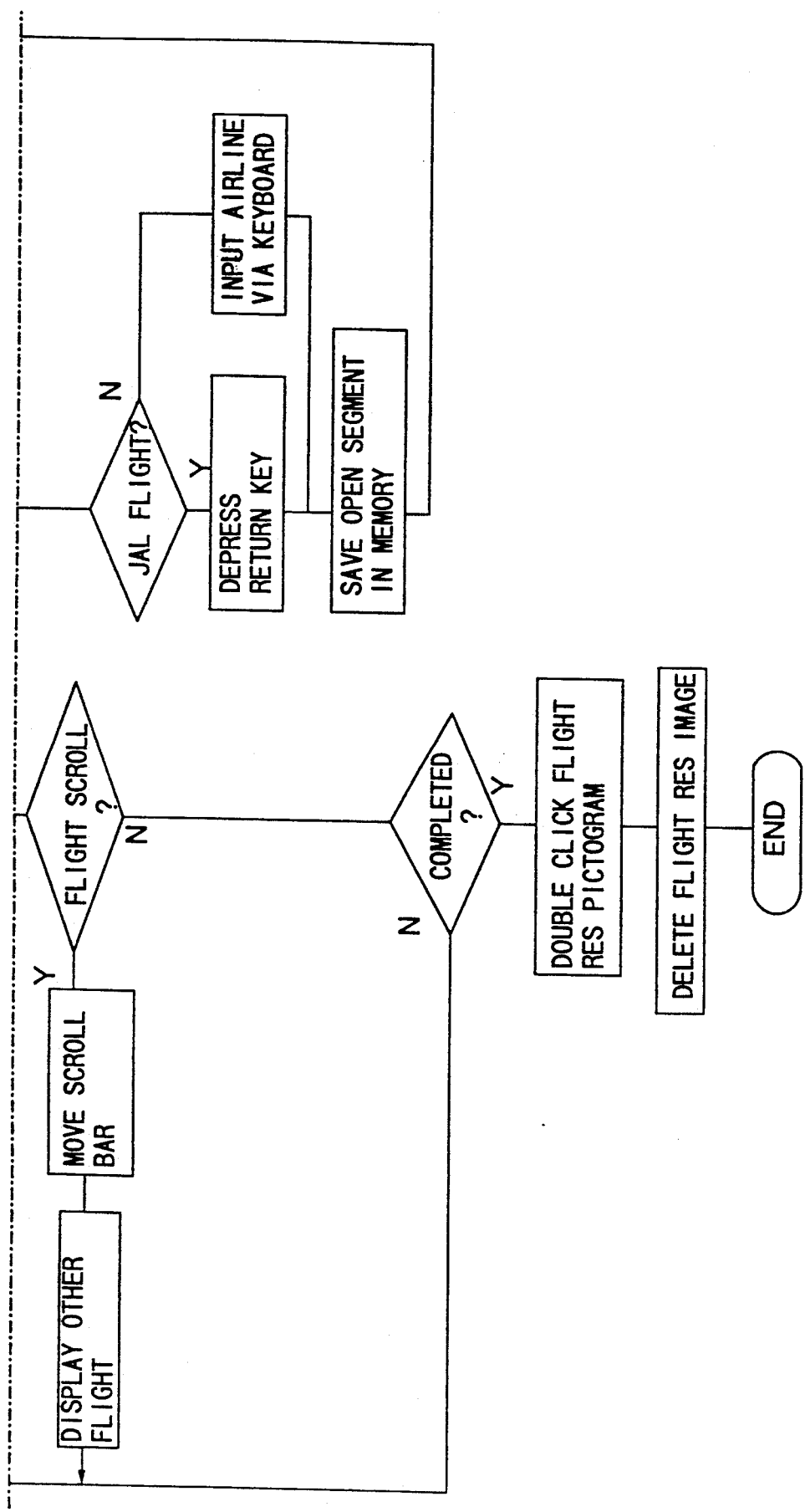
FIG.17C II

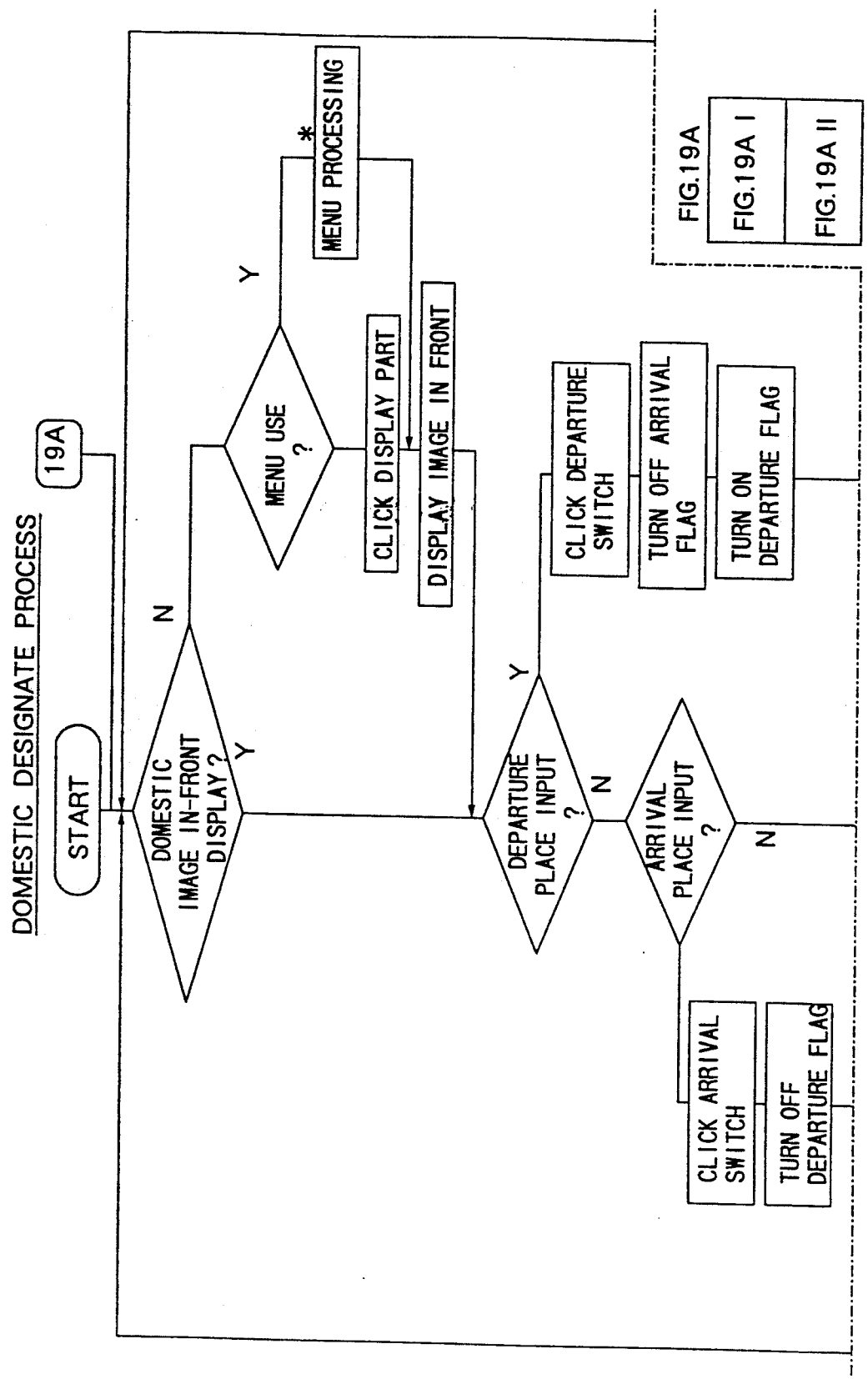

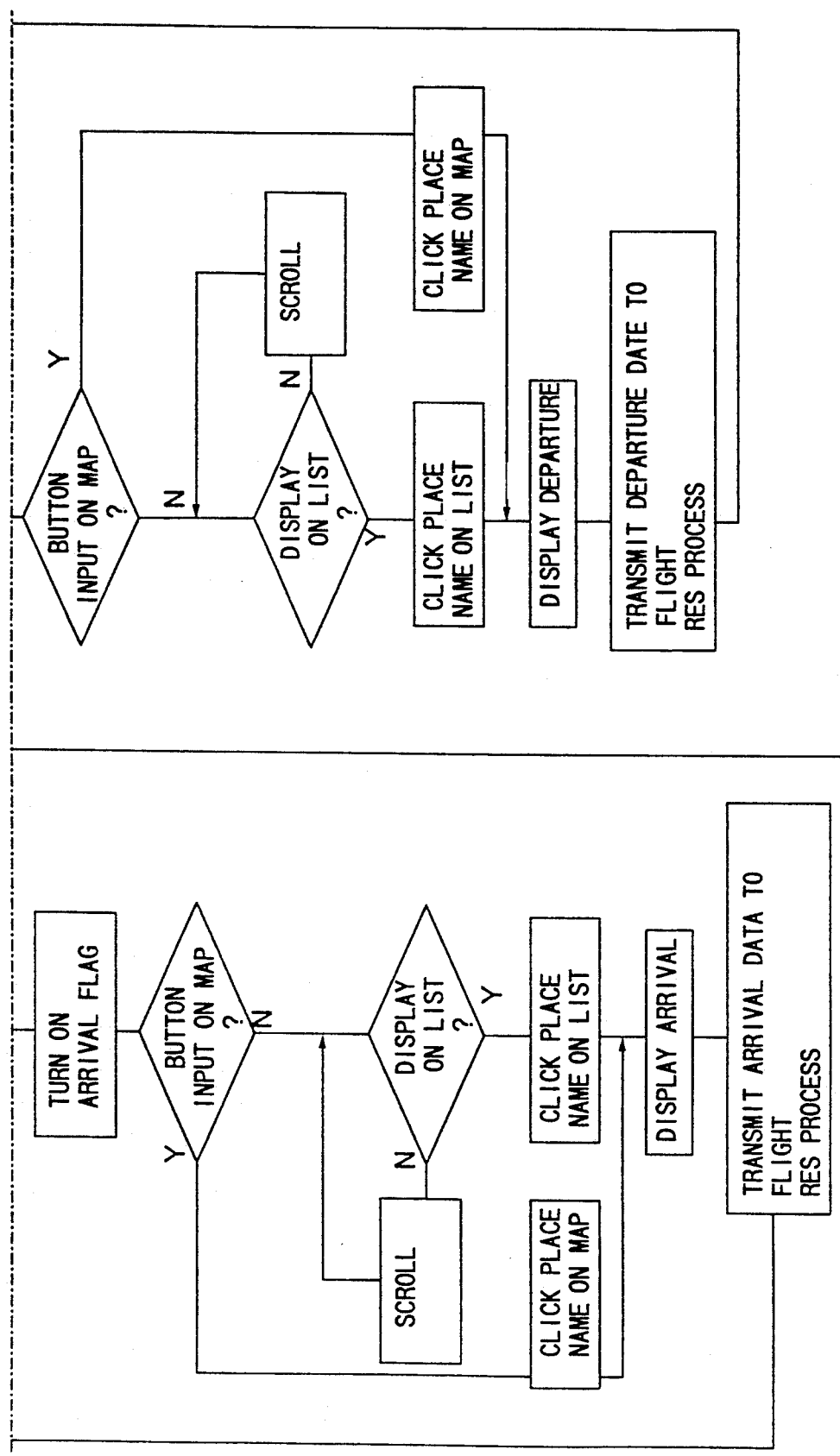
FIG.19A II

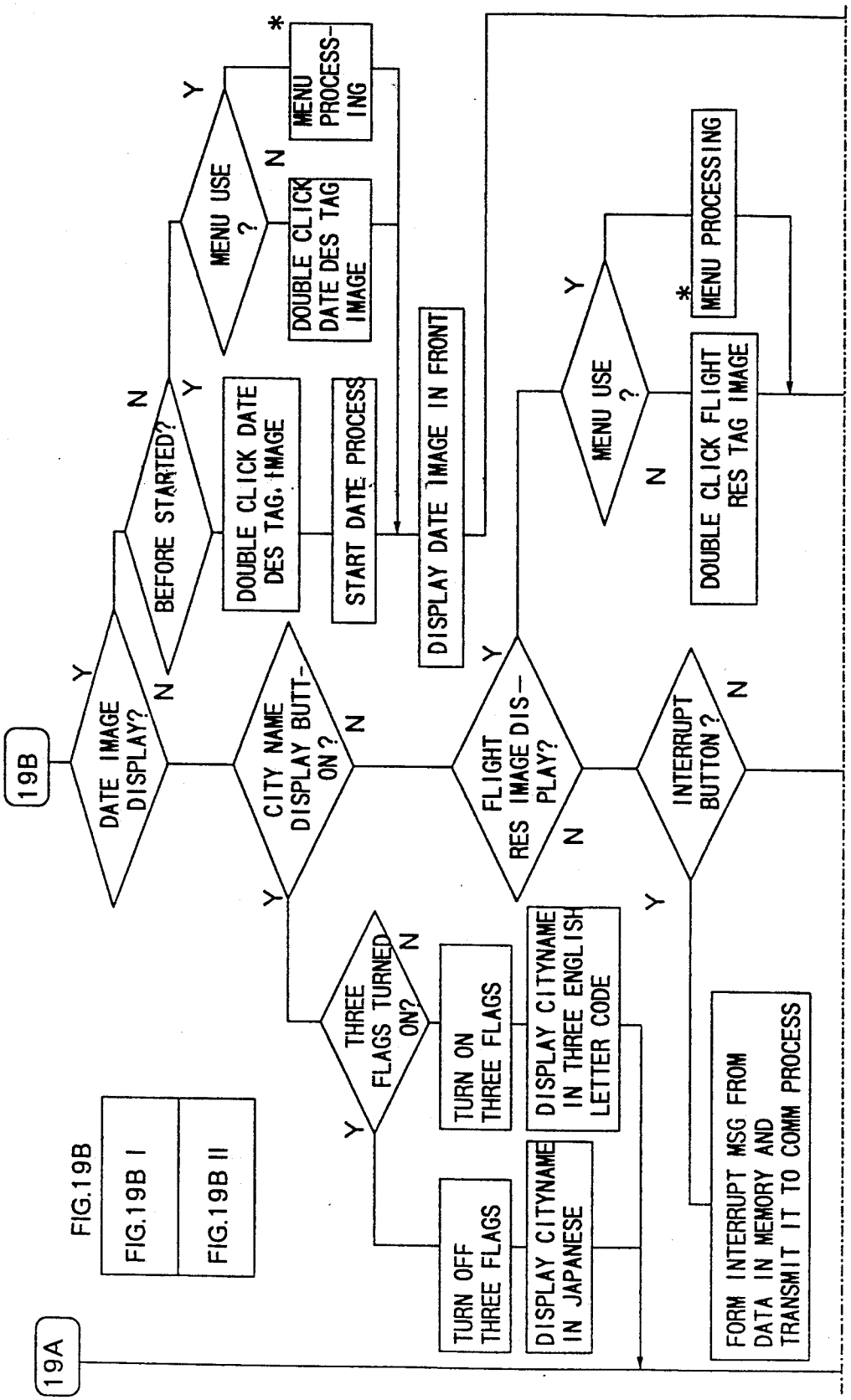

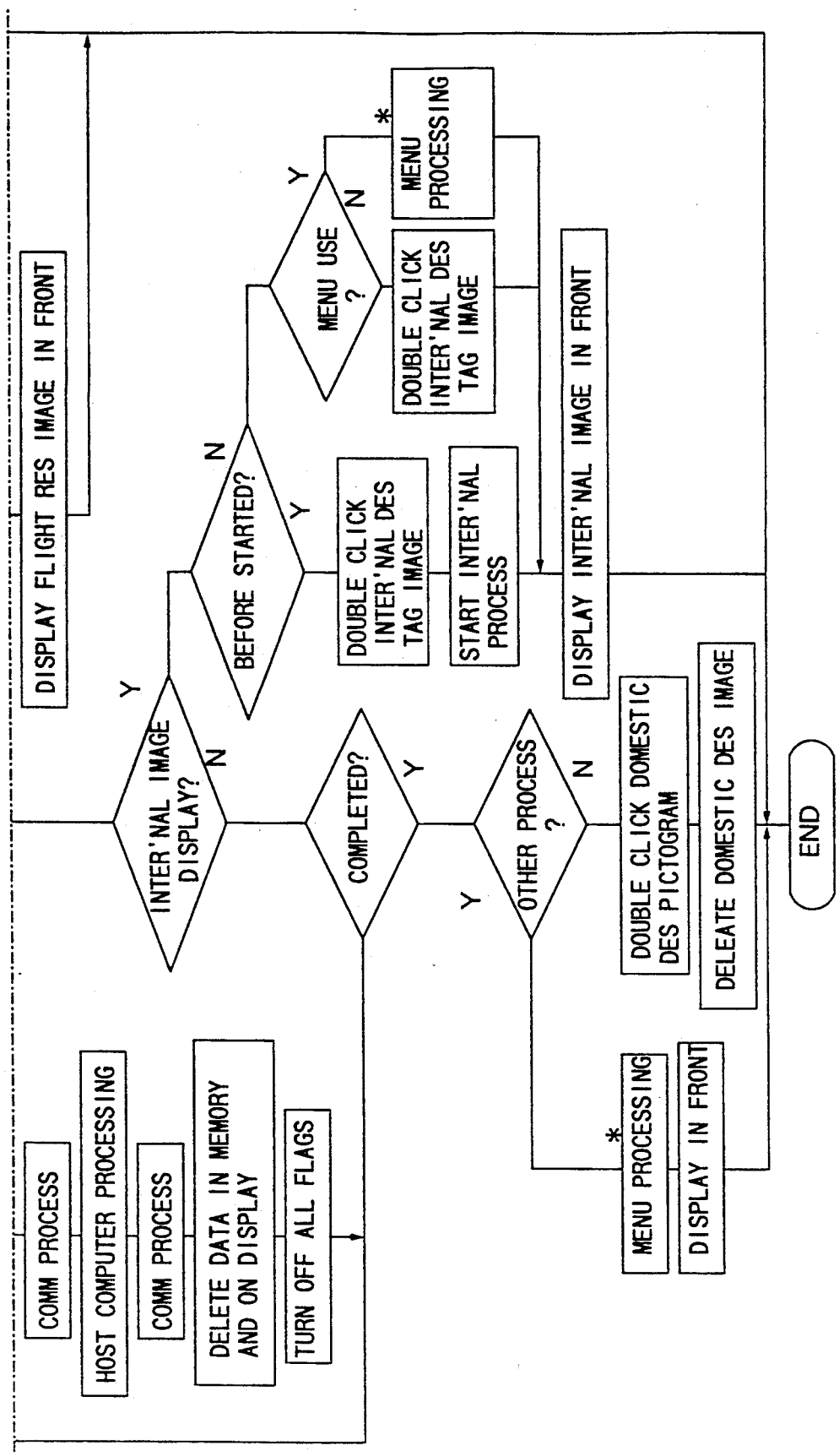
FIG.19 B II

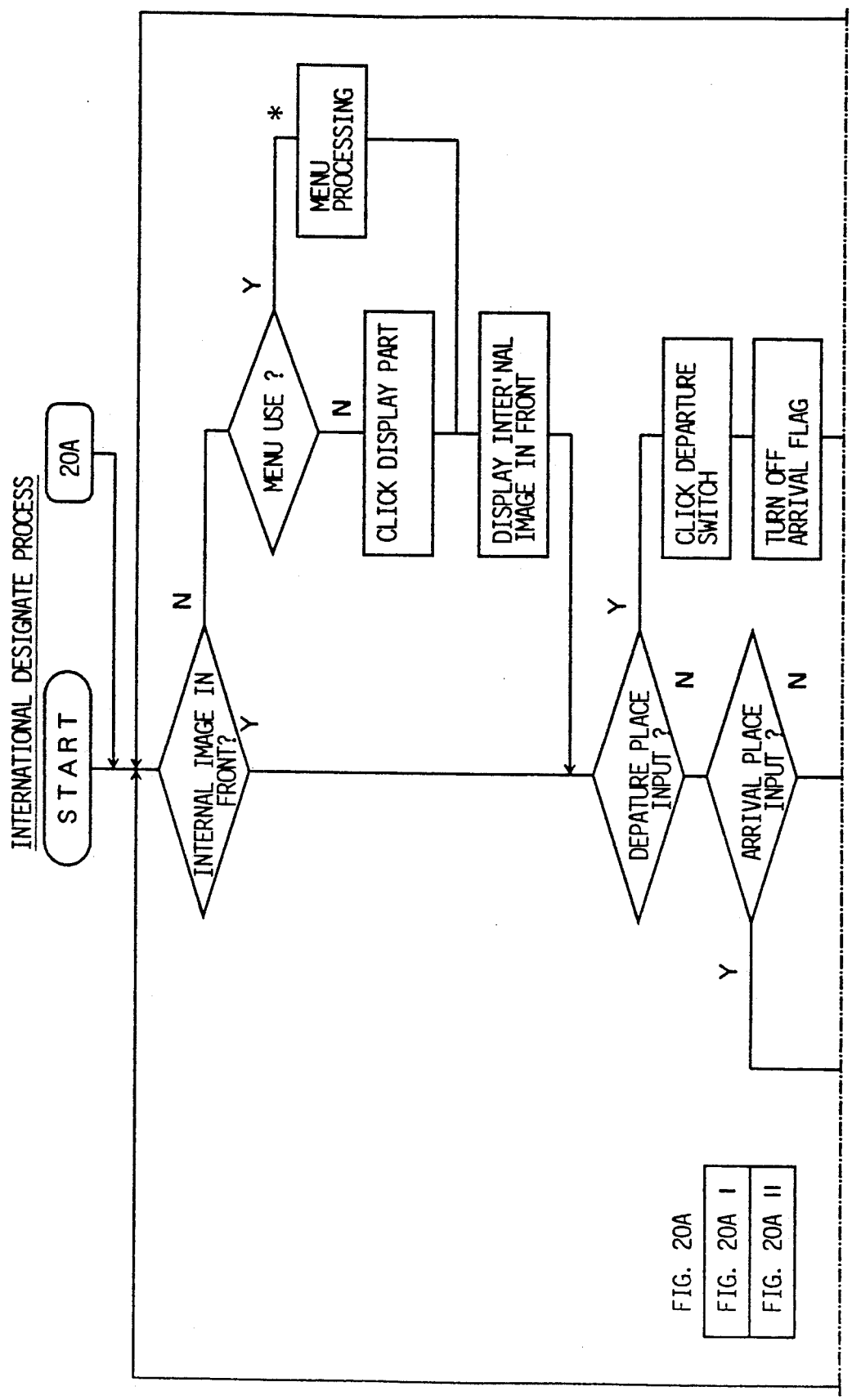
FIG. 20A I

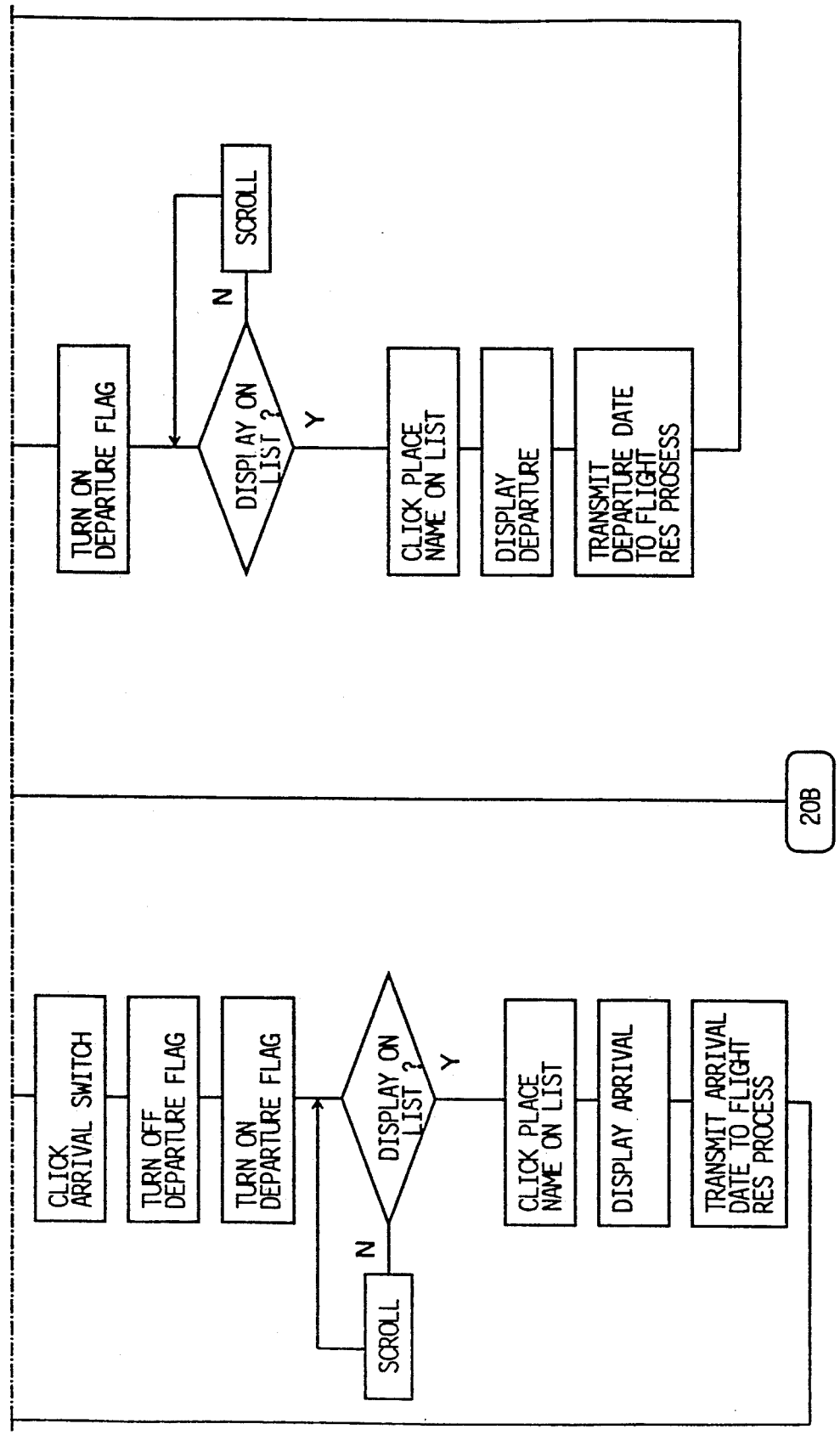
FIG. 20A II

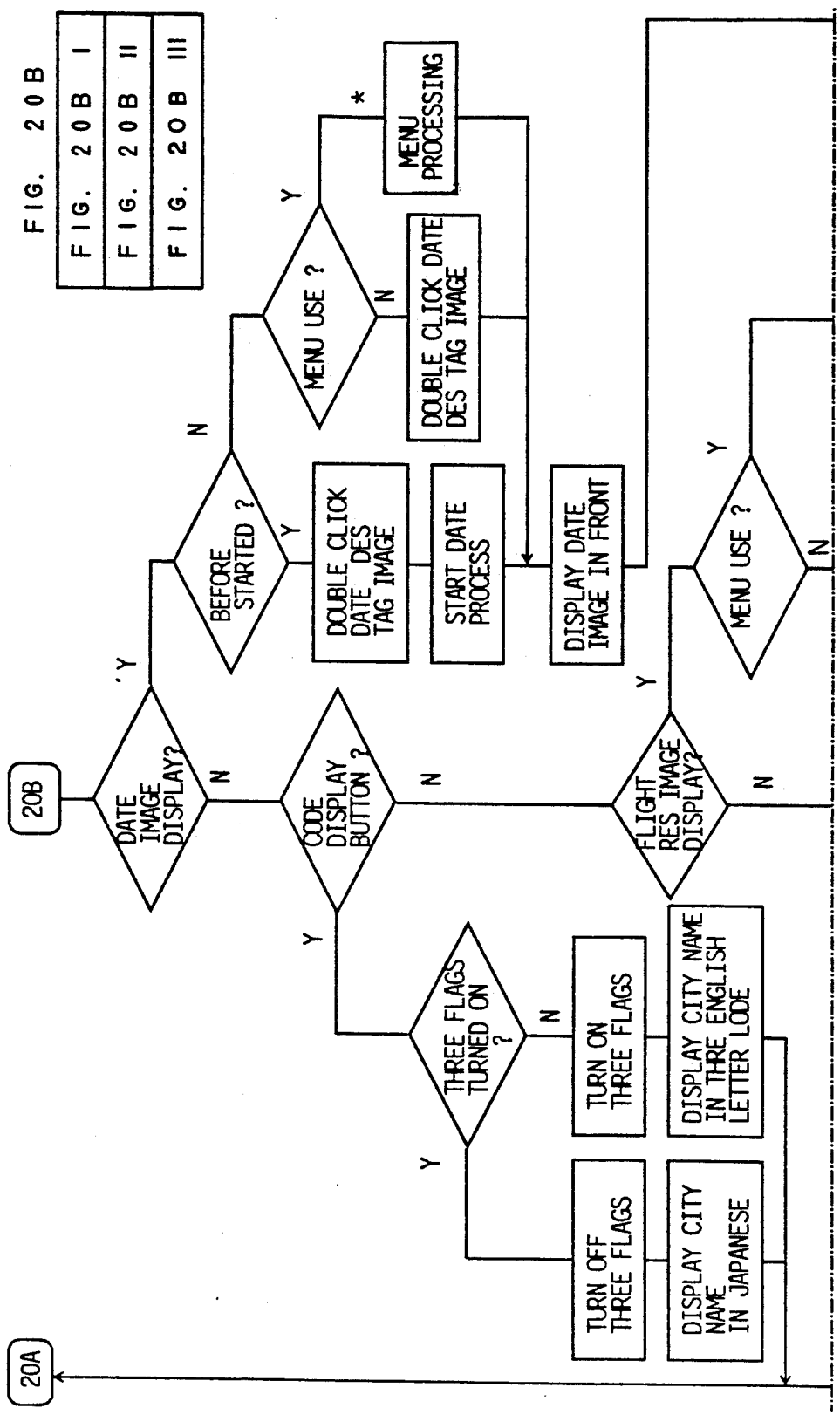
FIG. 20B I

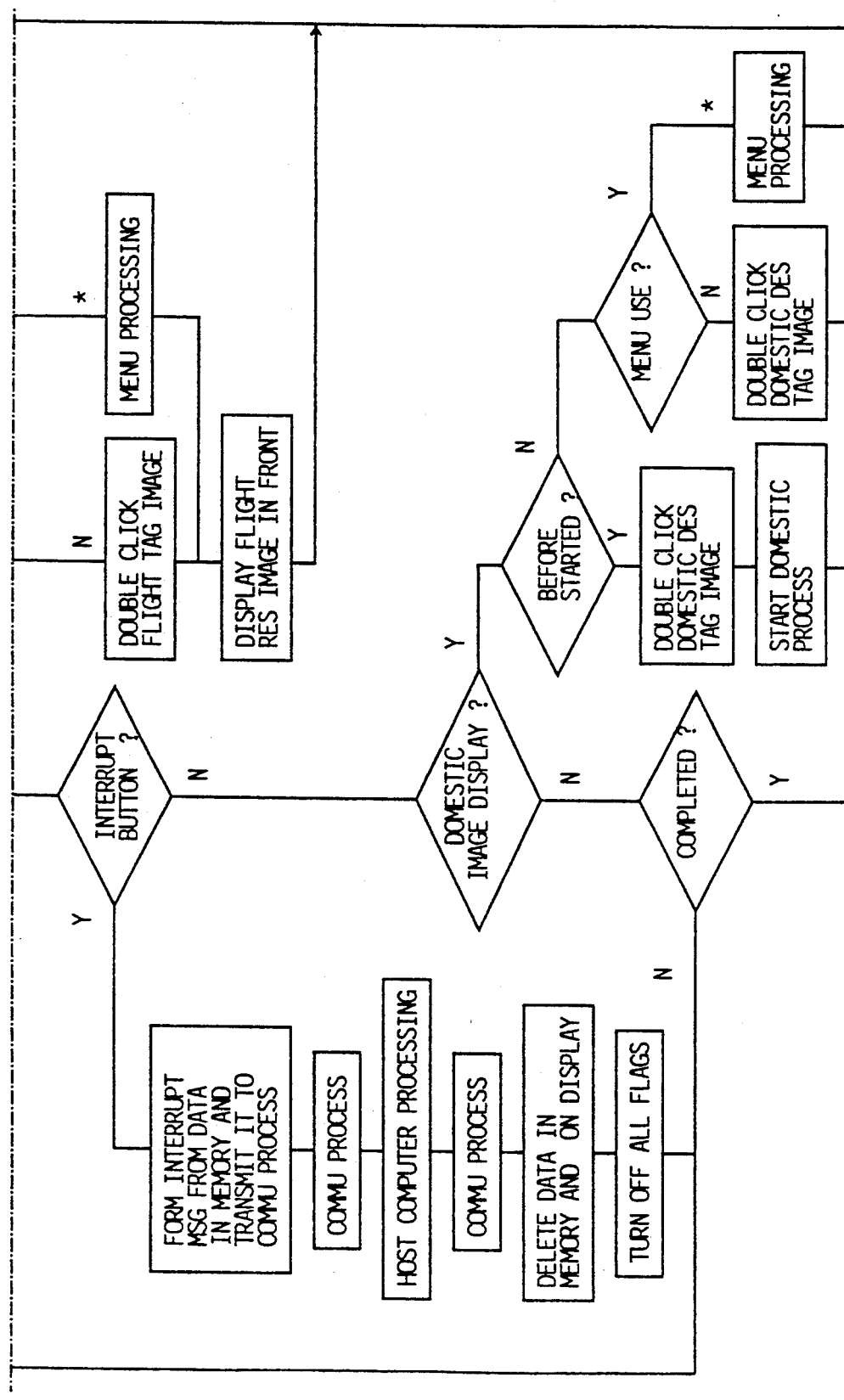
FIG. 20B II

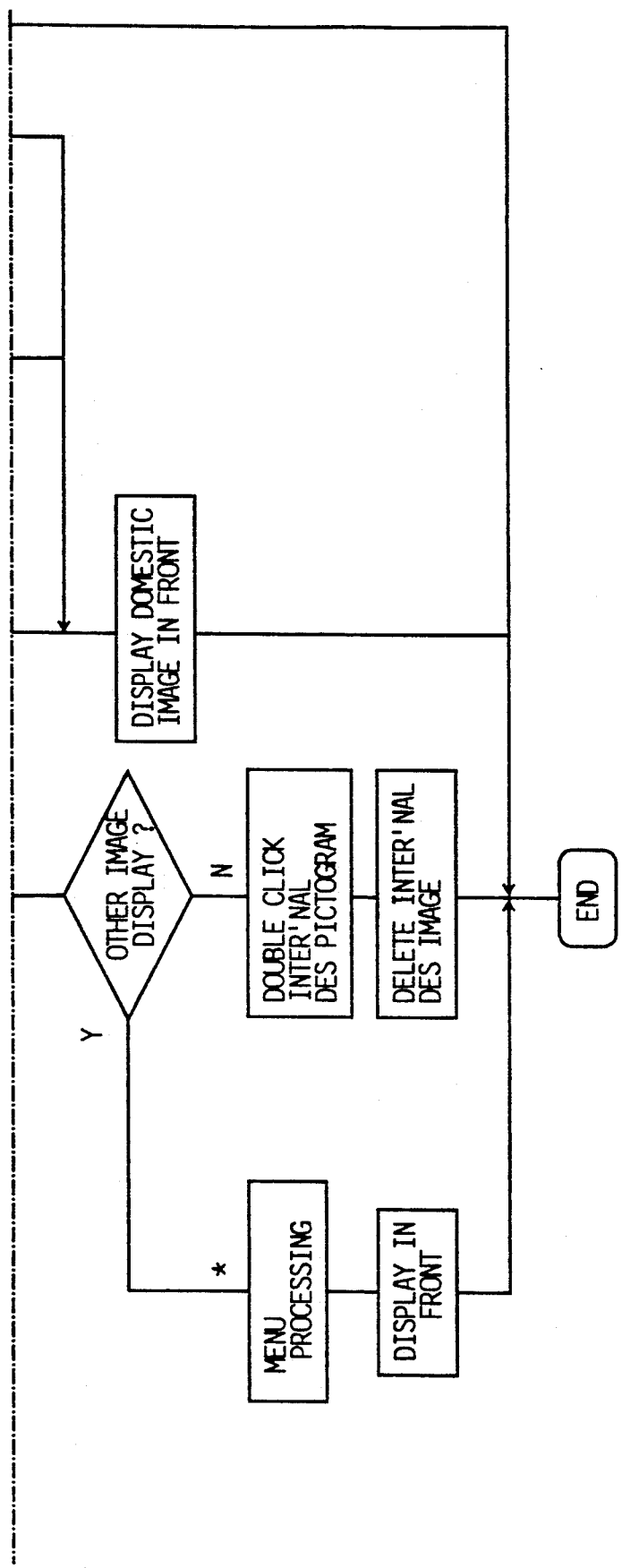
FIG. 20B III

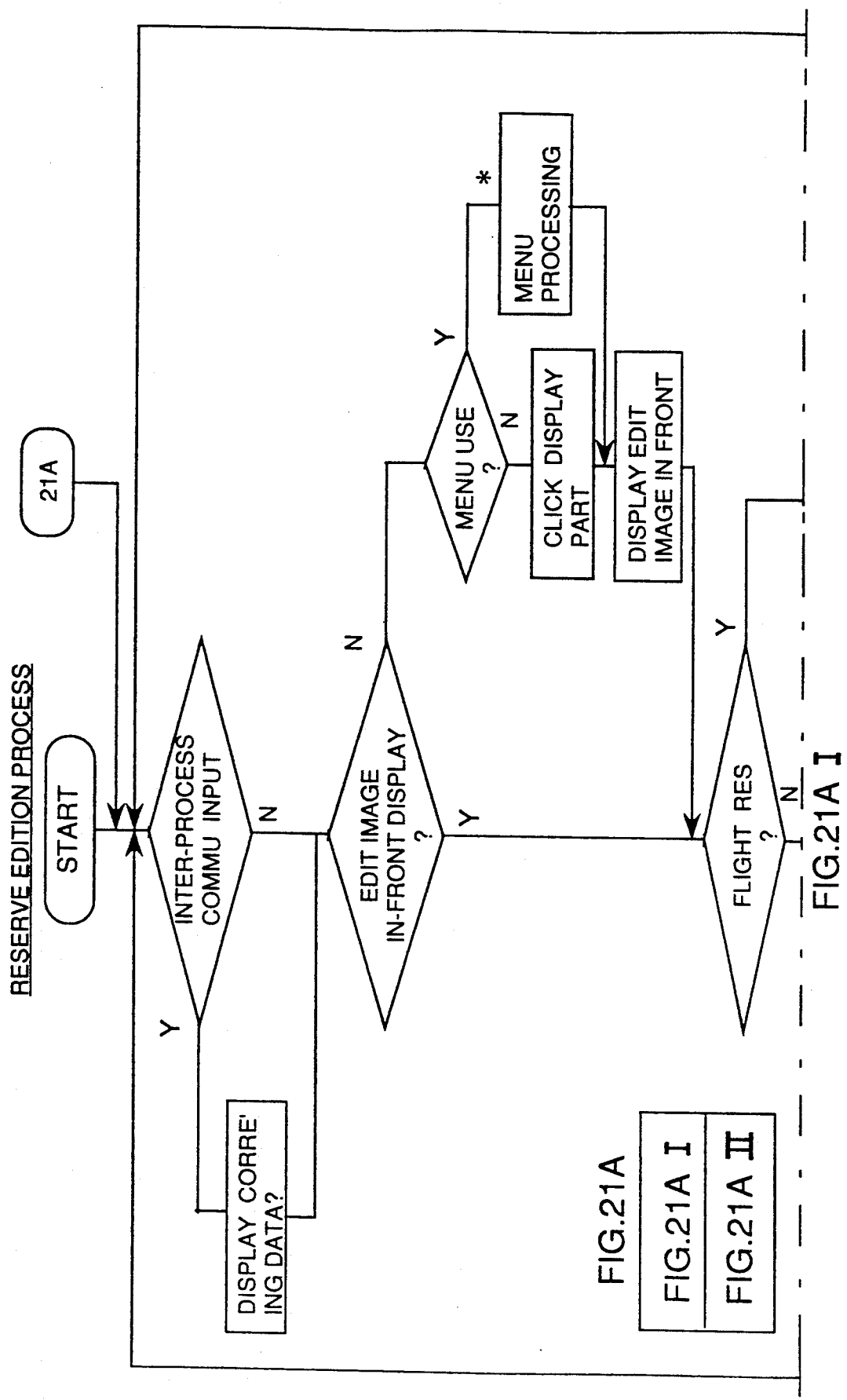

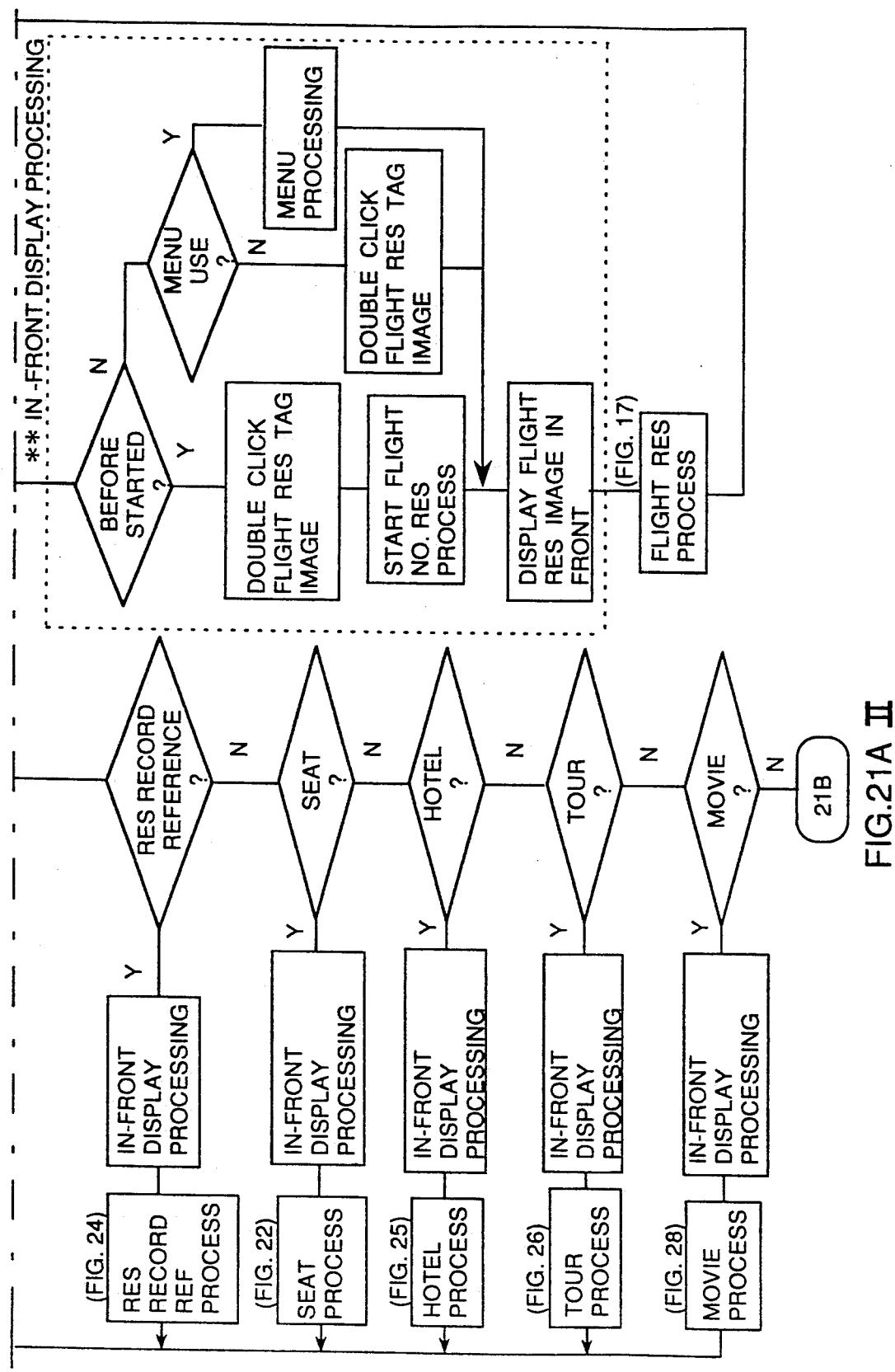
FIG.21A II

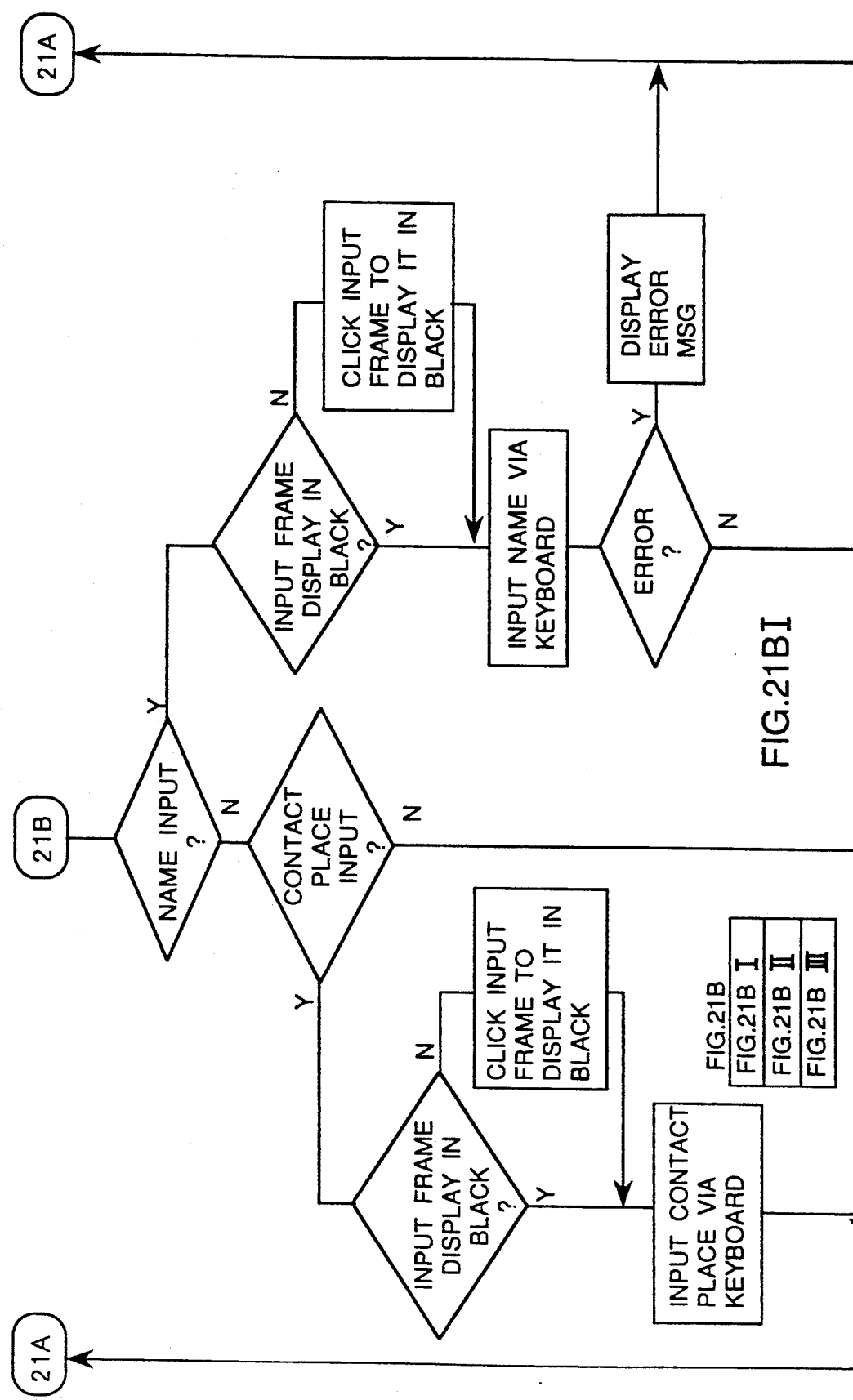

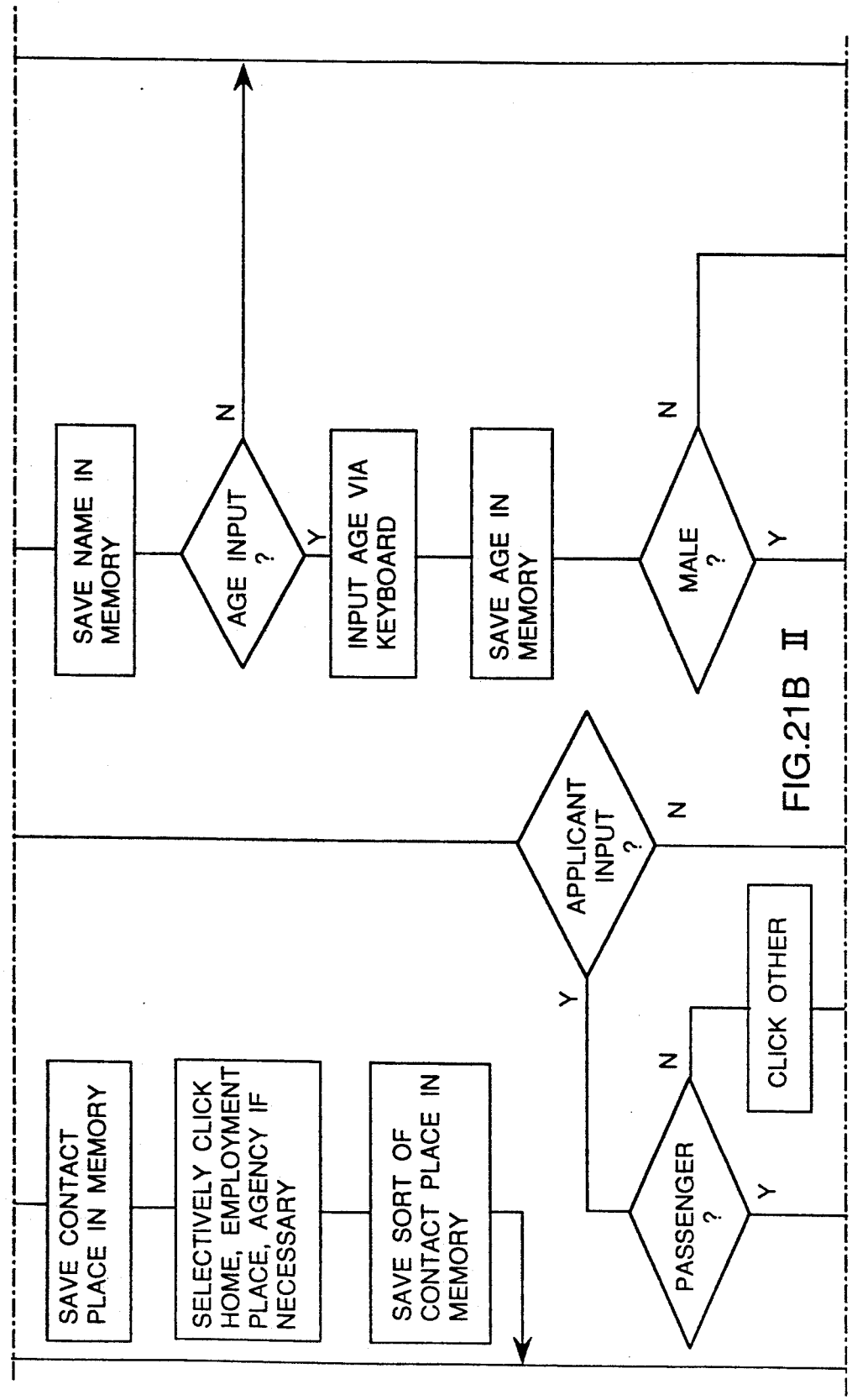
FIG.21B II

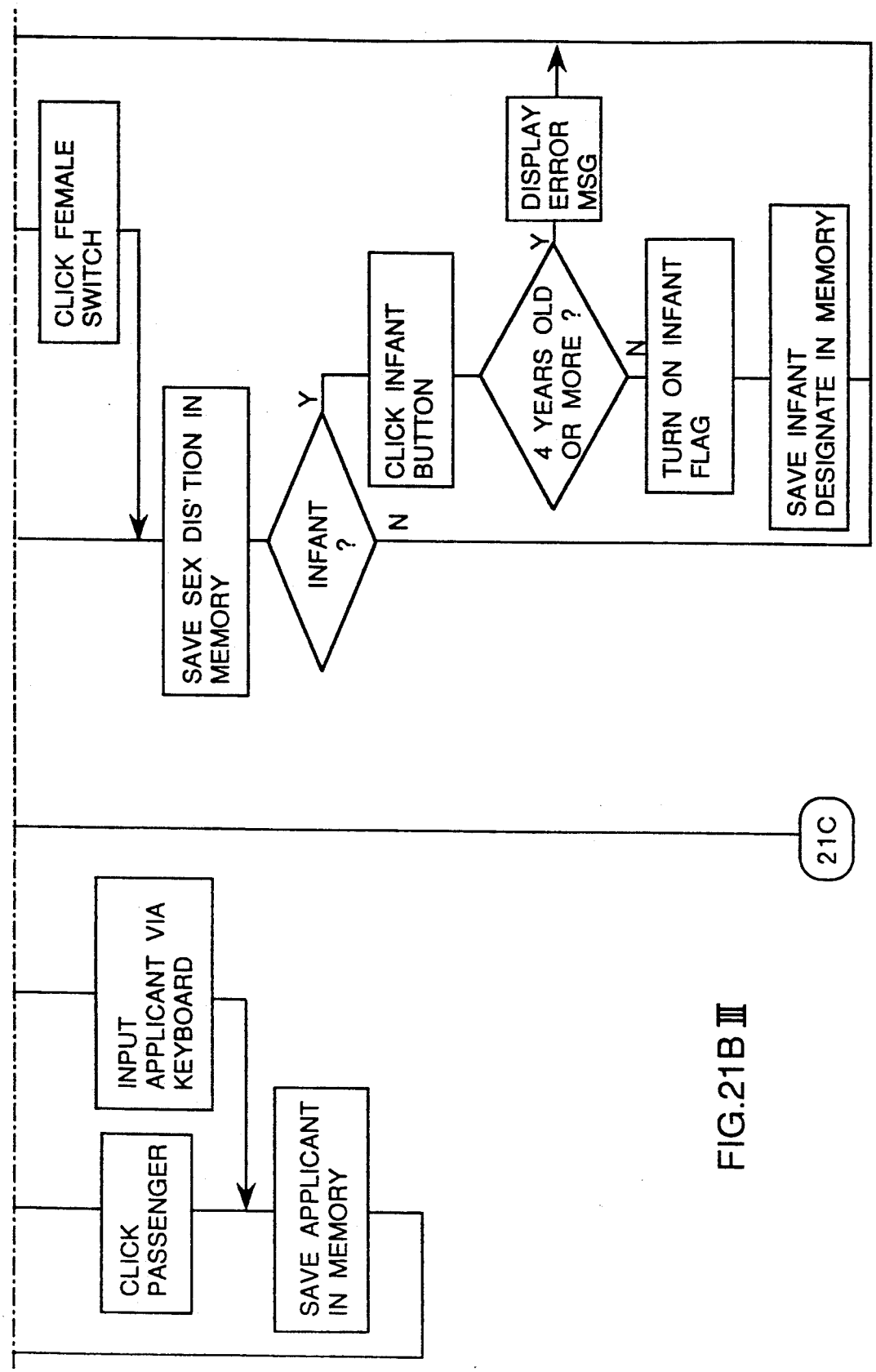
FIG.21B Ⅲ

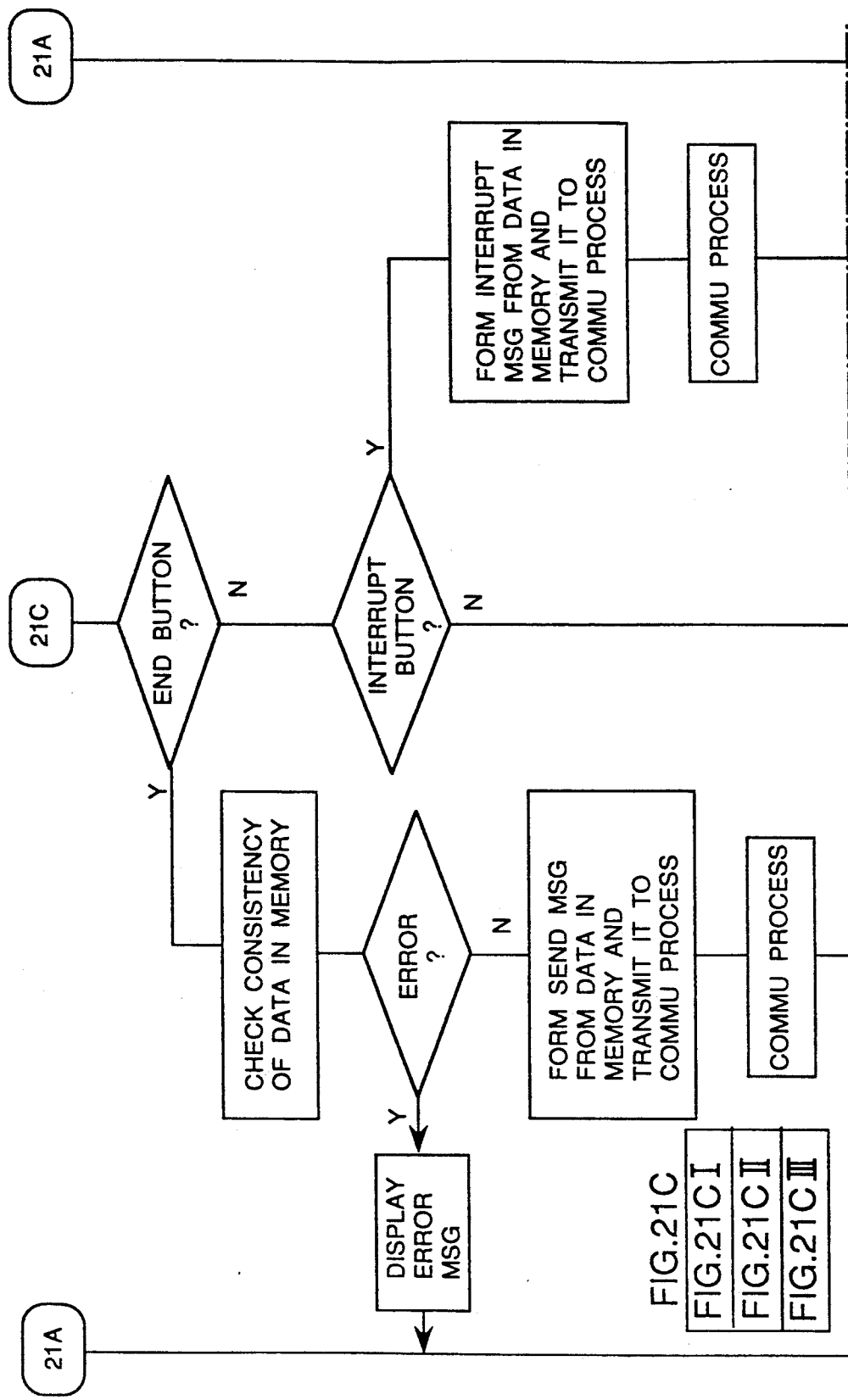

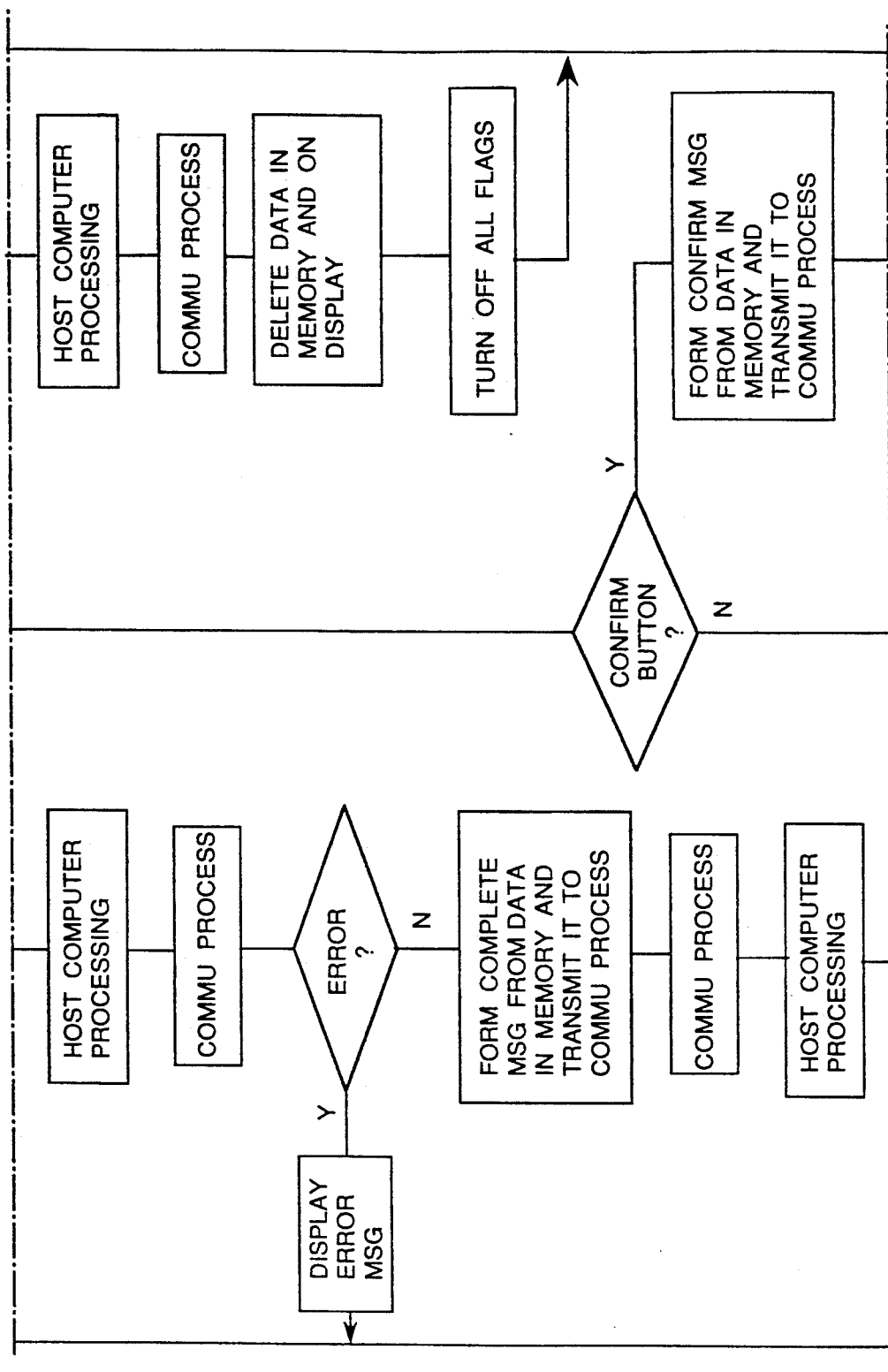
FIG.21CII

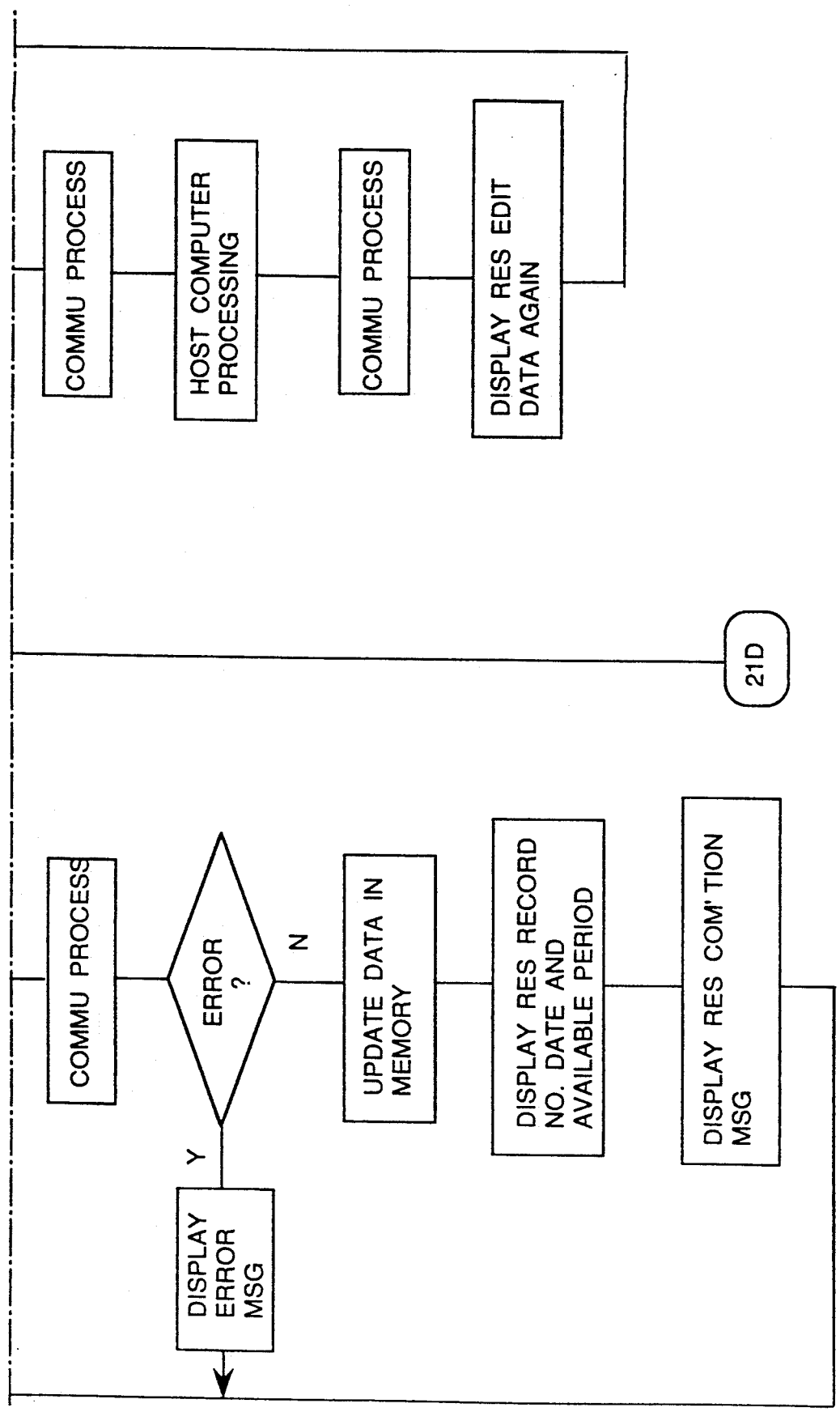
FIG.21C III

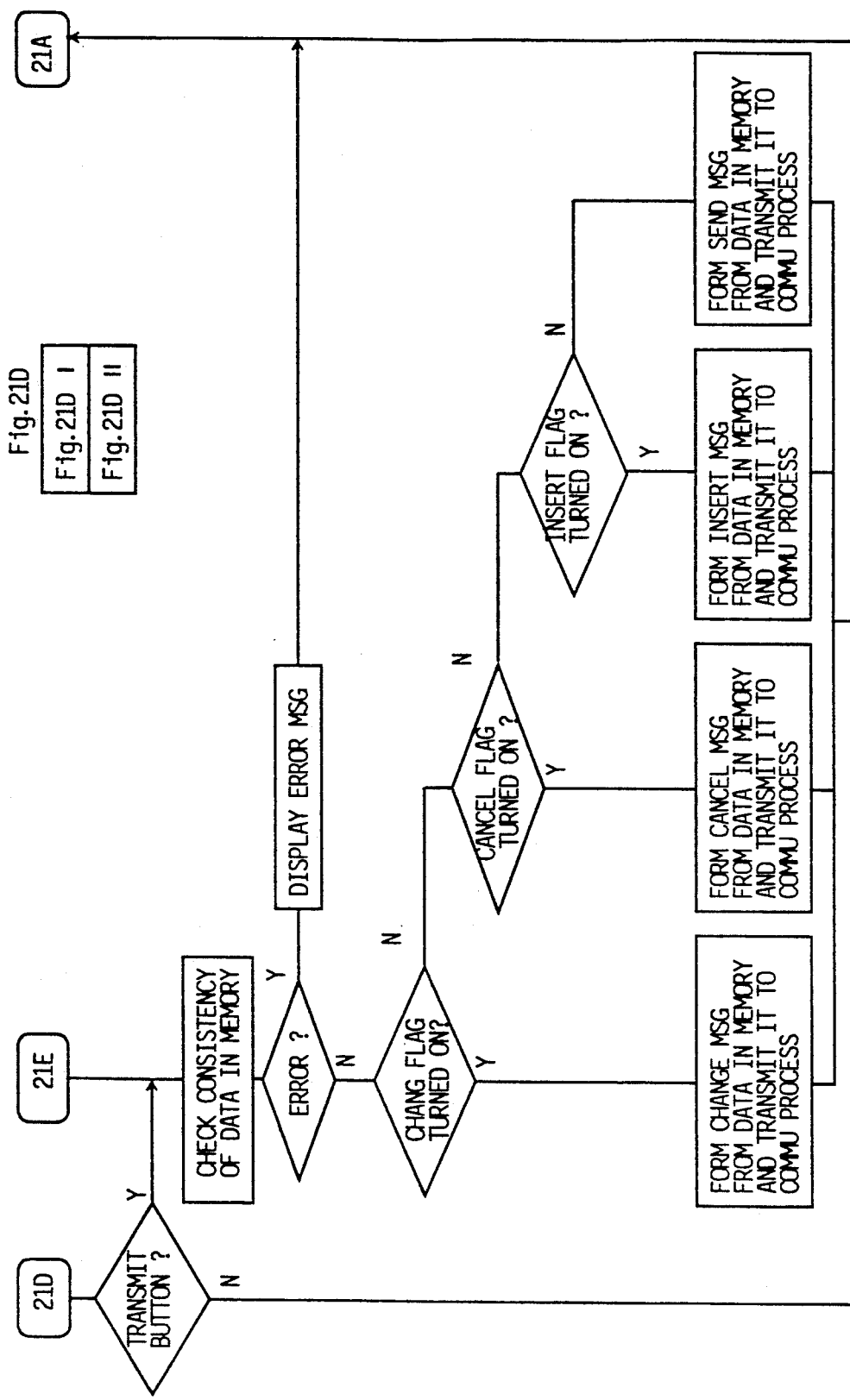
FIG. 21D I

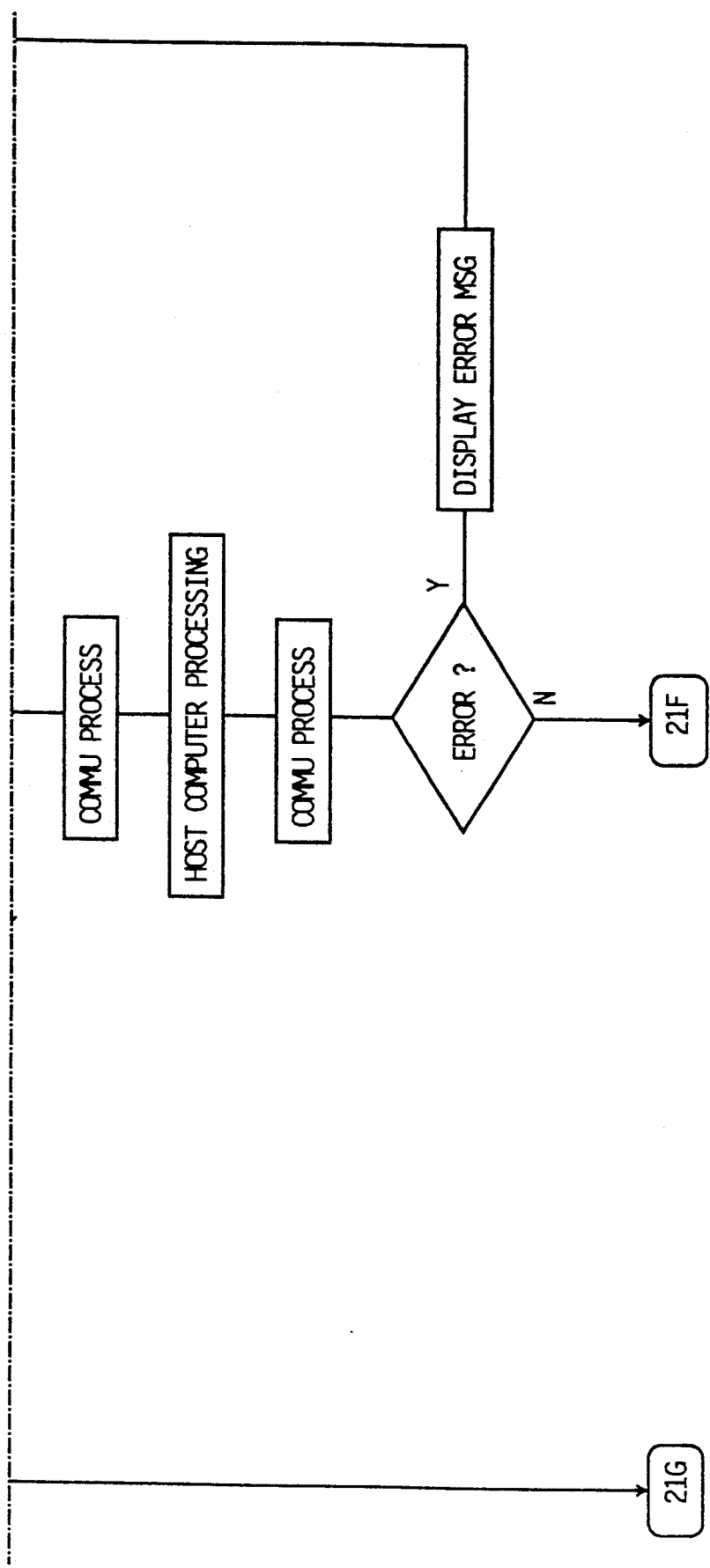
FIG. 21D II

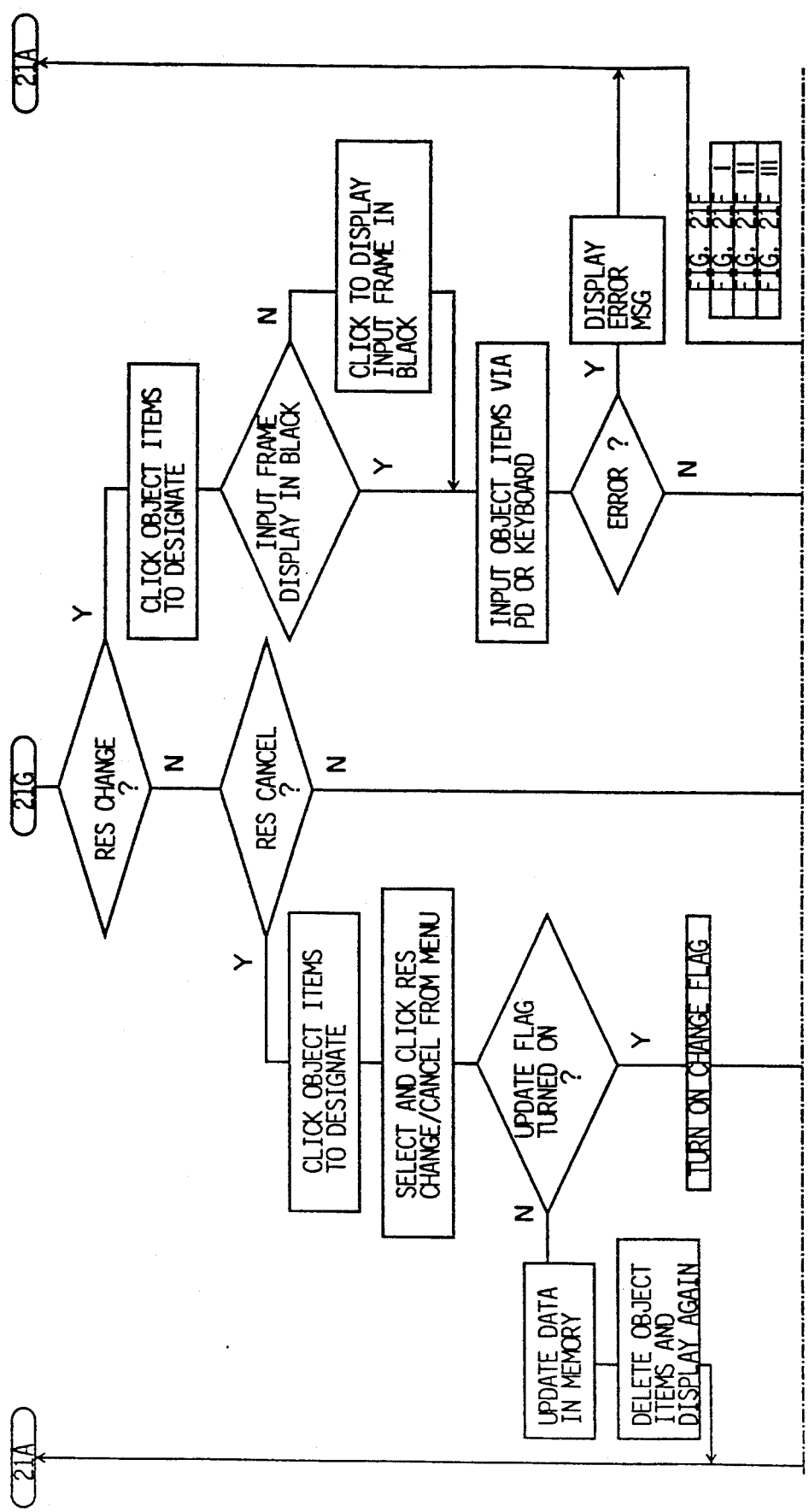
FIG. 21F I

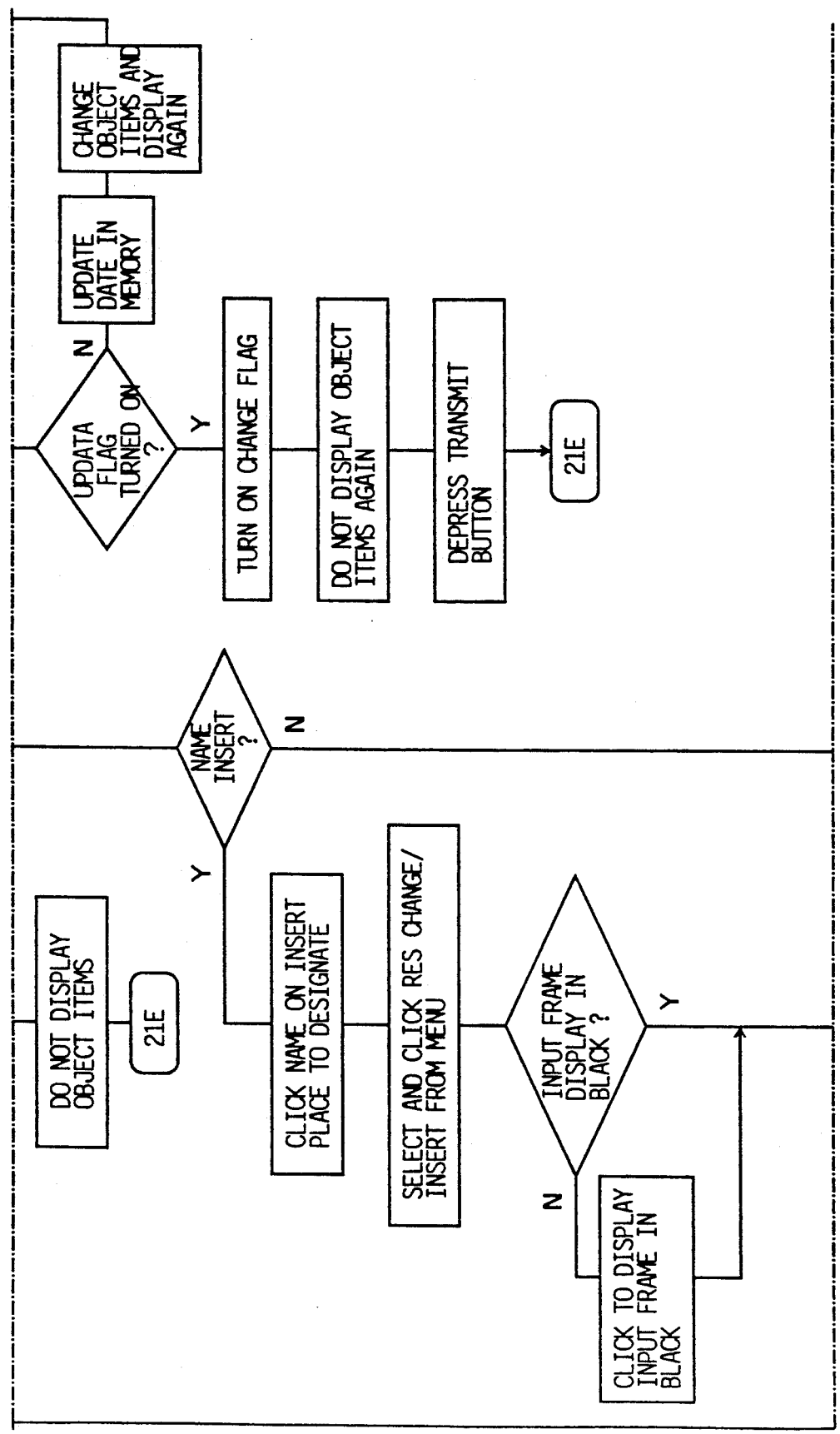
FIG. 21F II

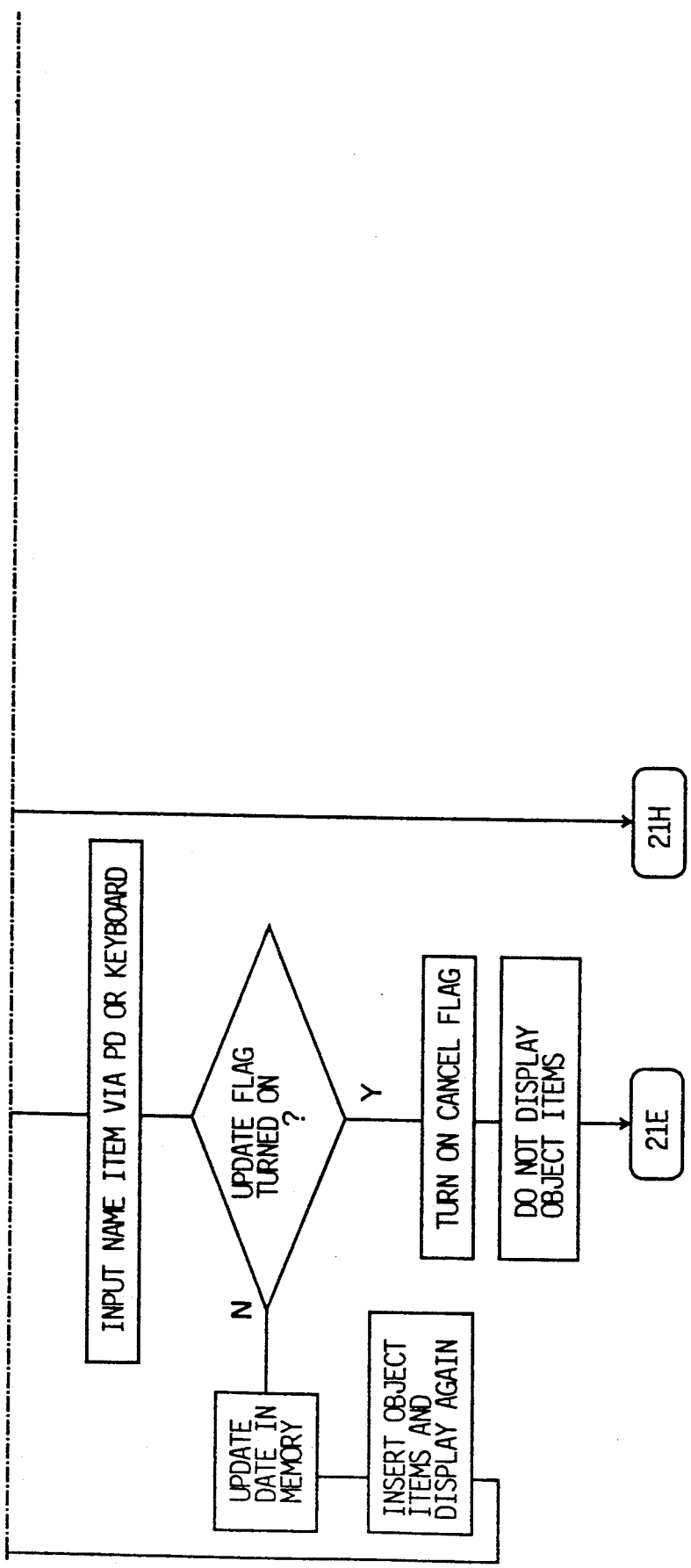
FIG. 21F III

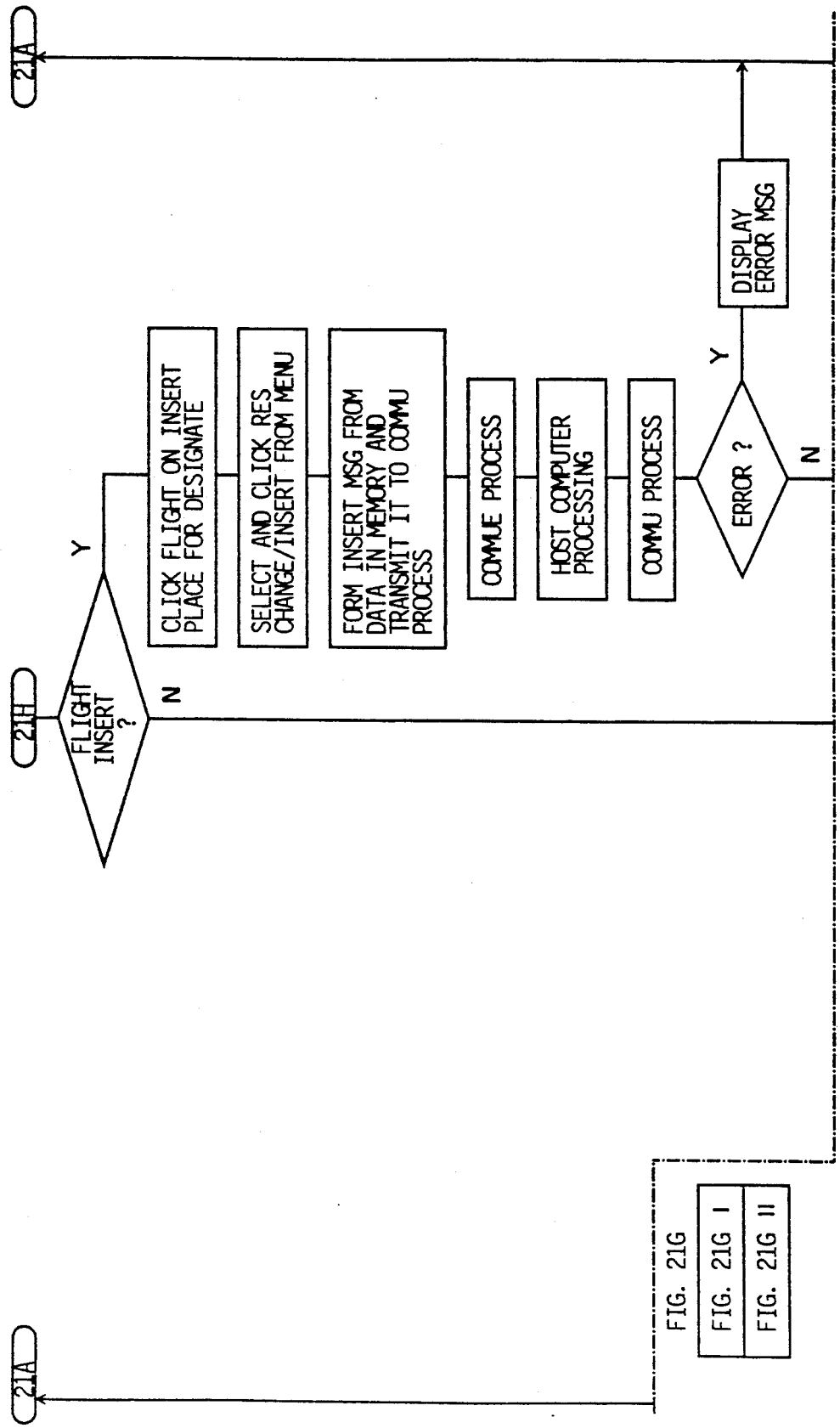
FIG. 21G I

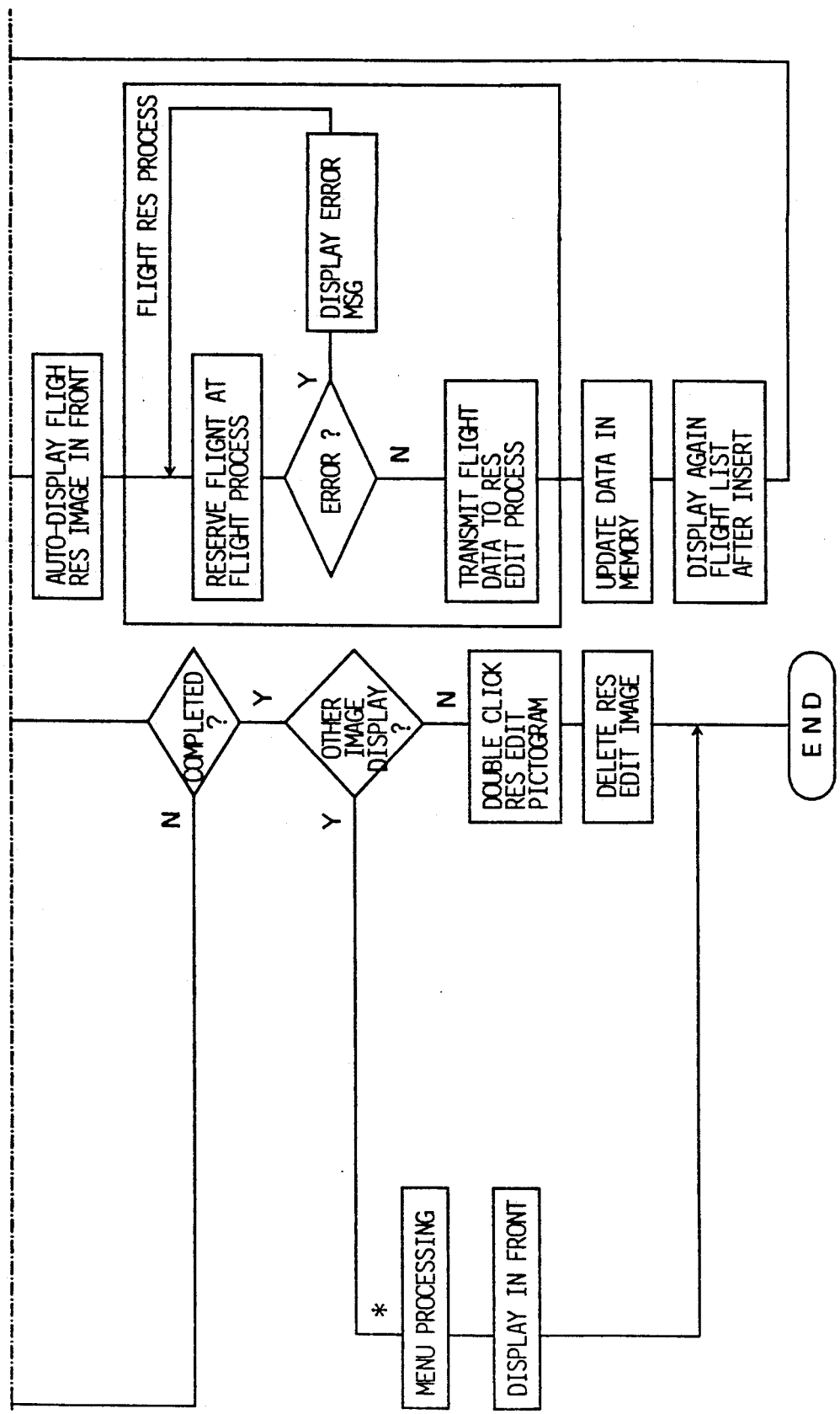
FIG. 21G II

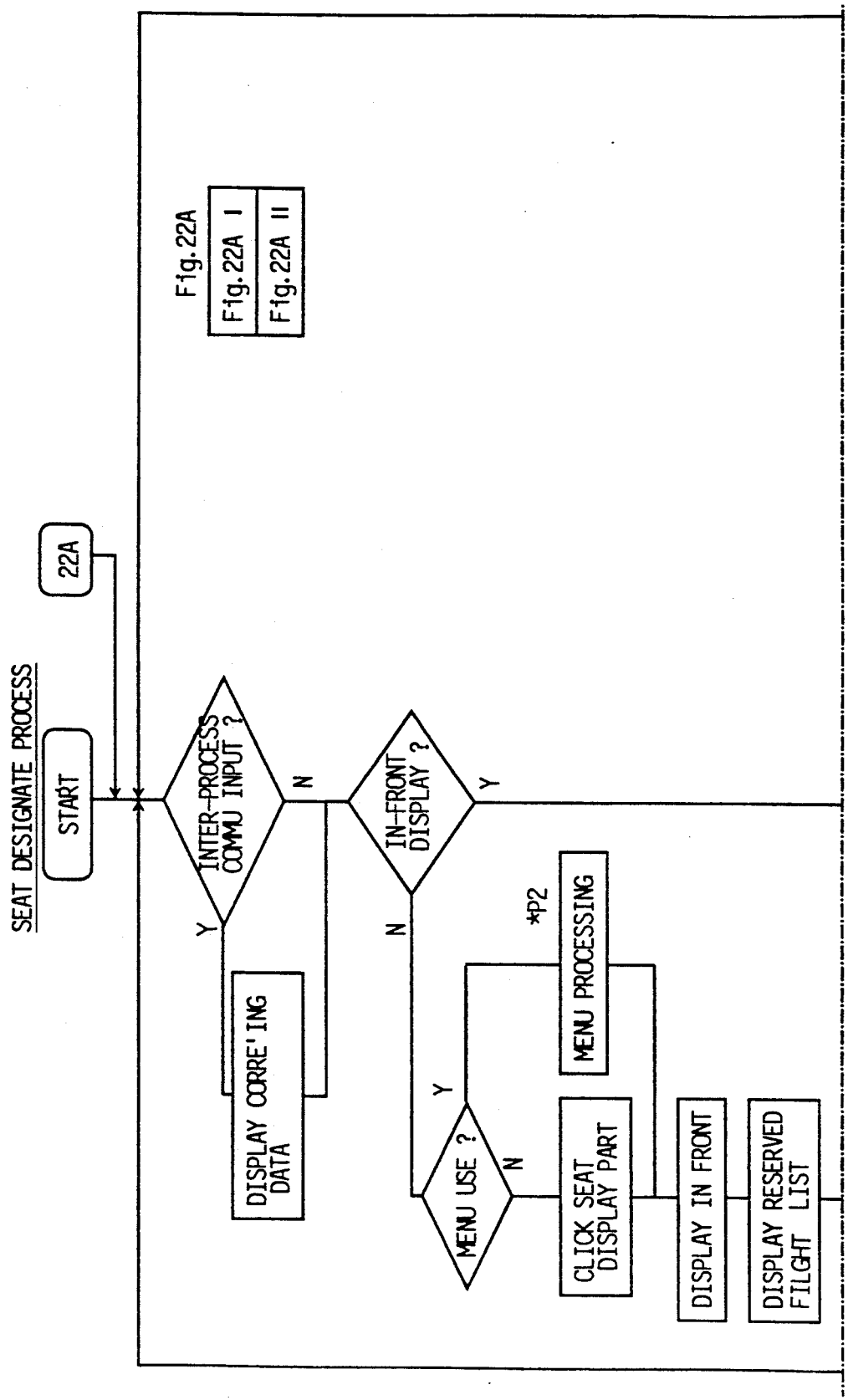
FIG. 22A I

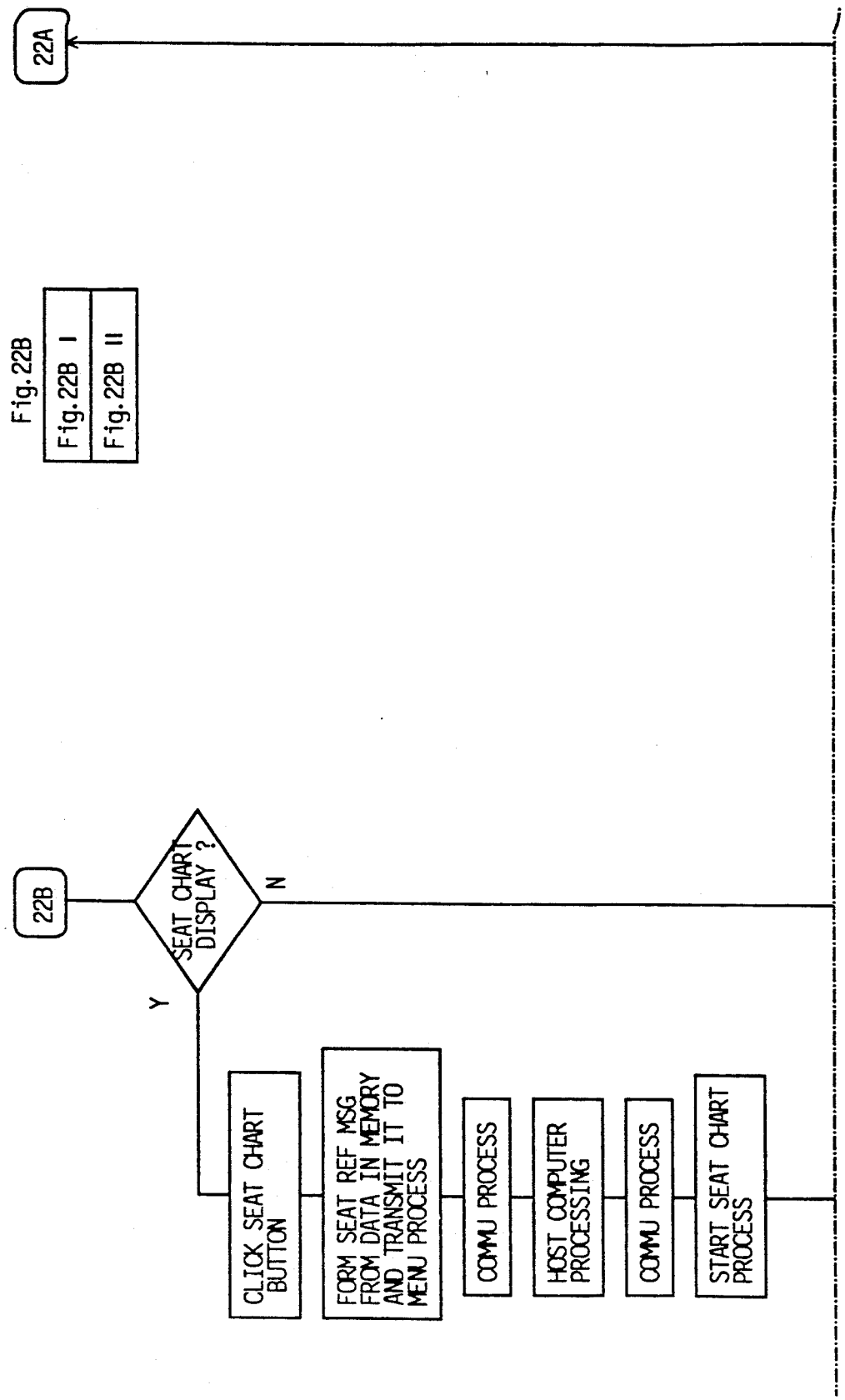

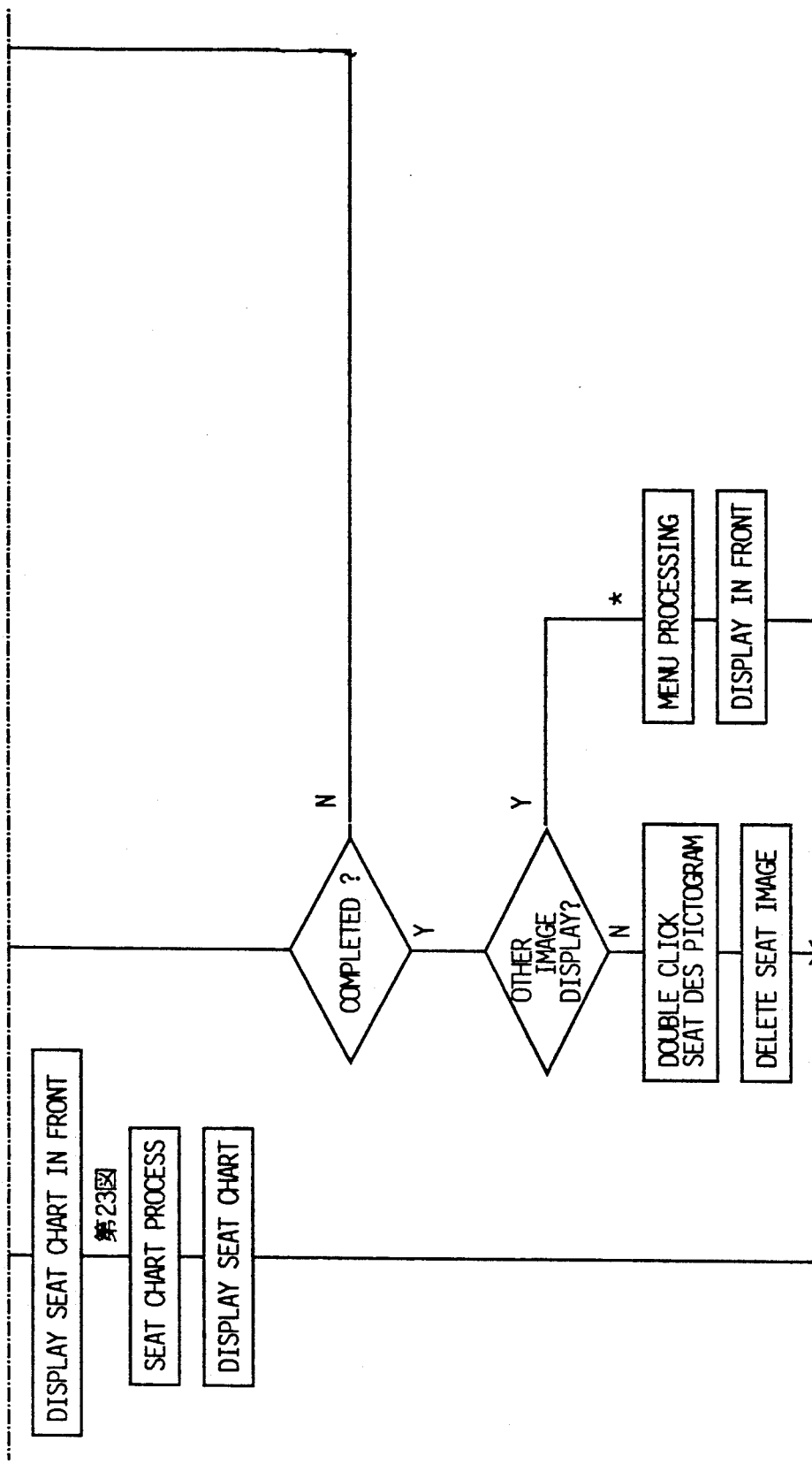
FIG. 22B II

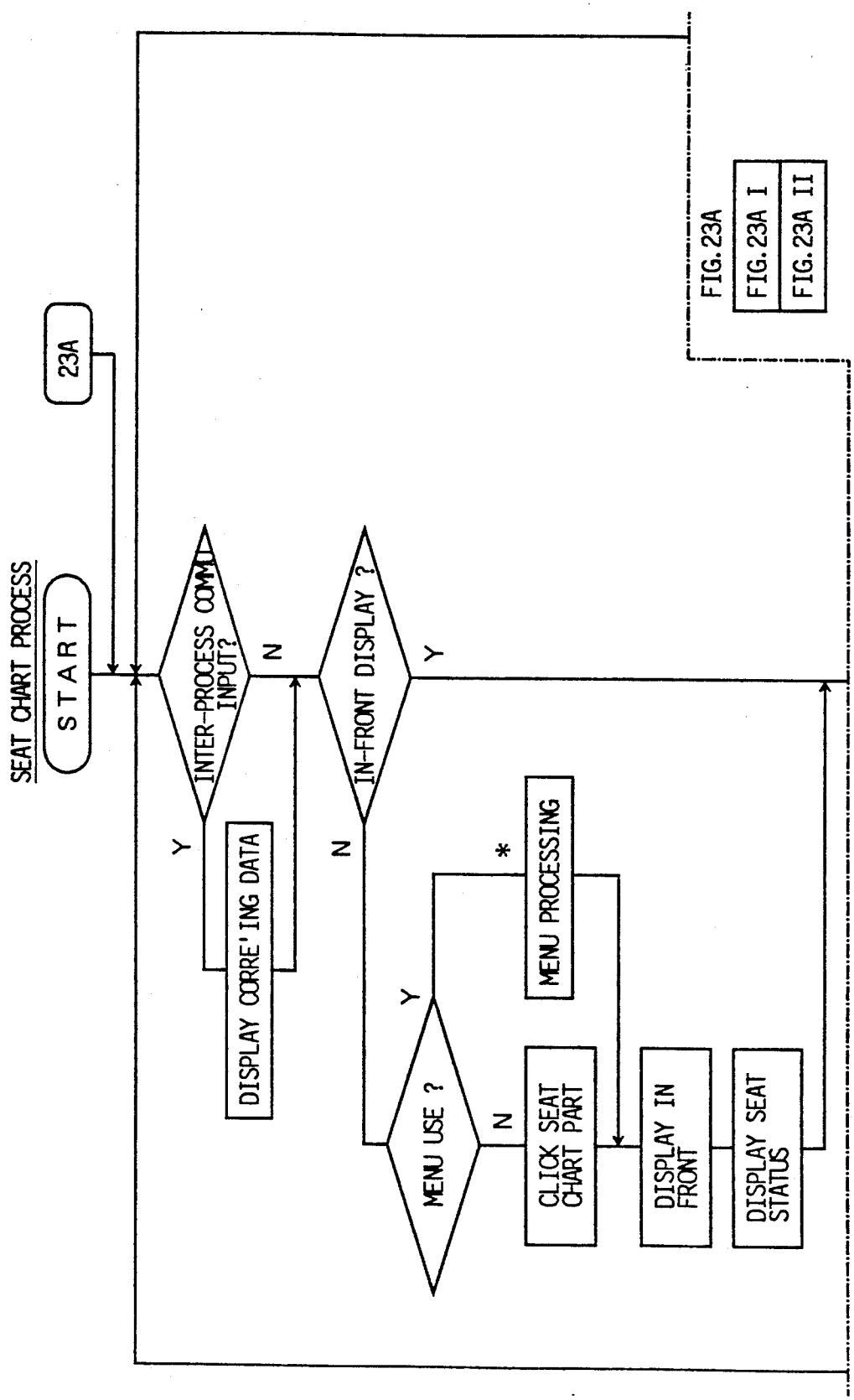

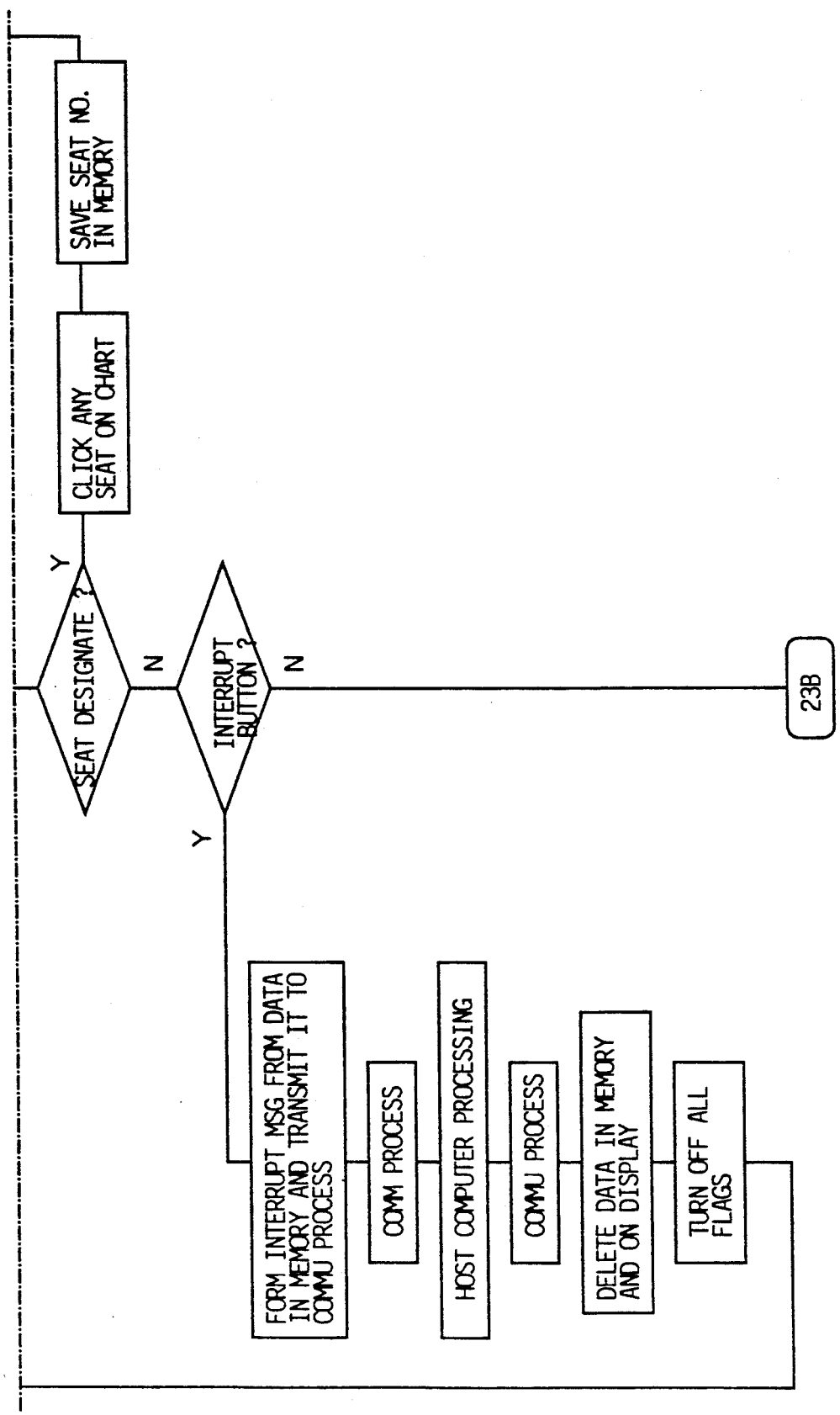

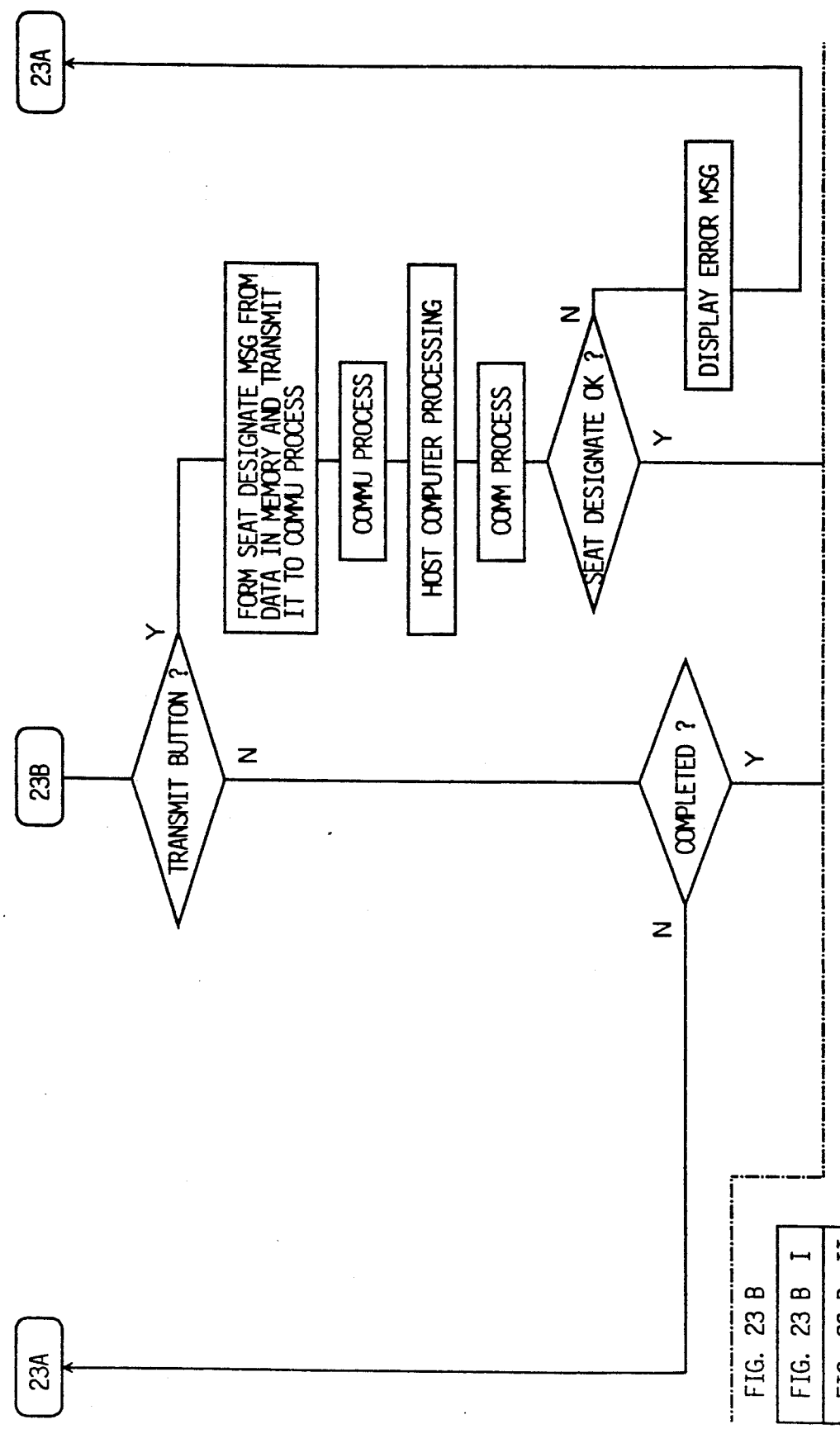
FIG. 23B I

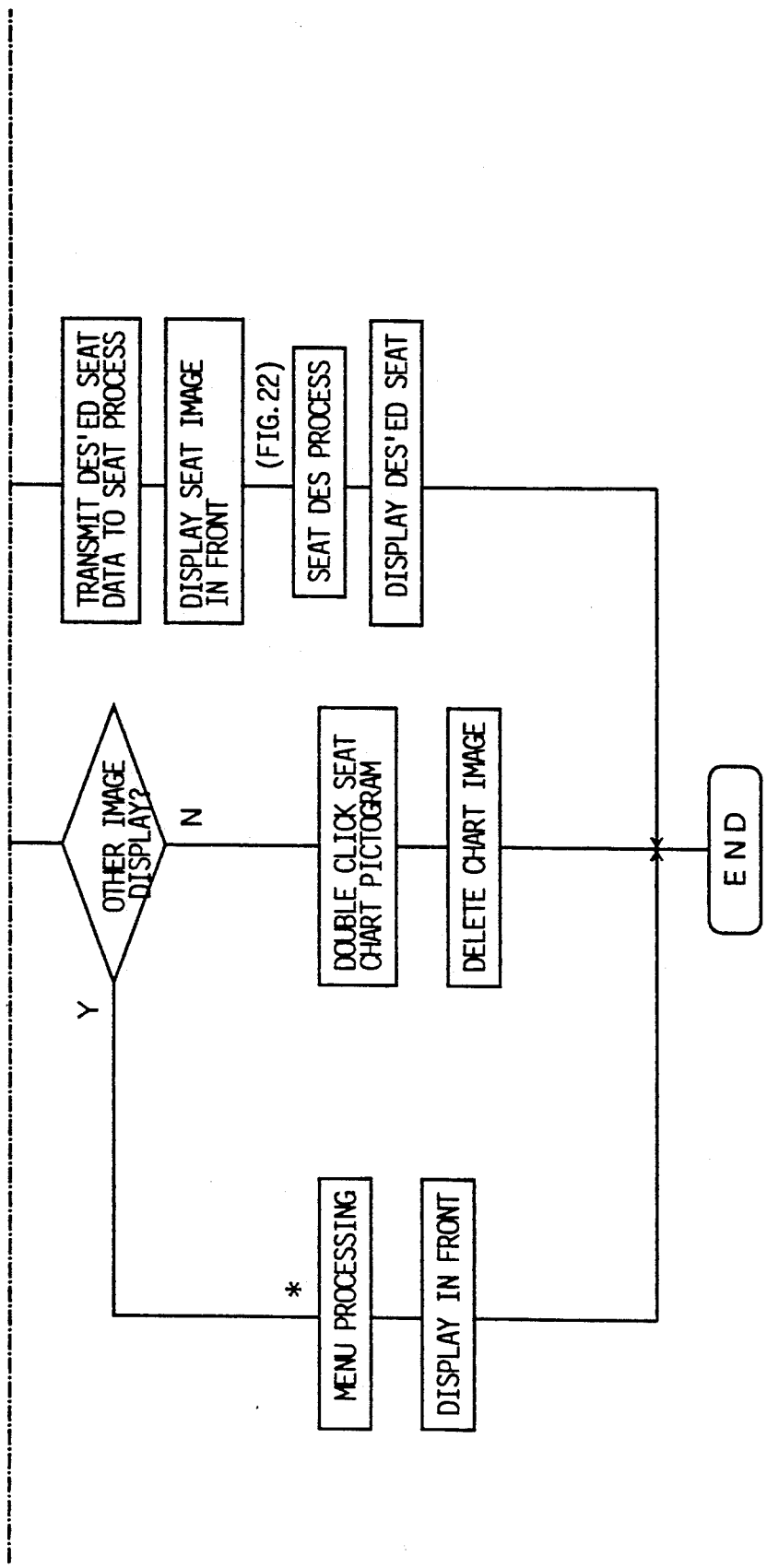
FIG. 23B II

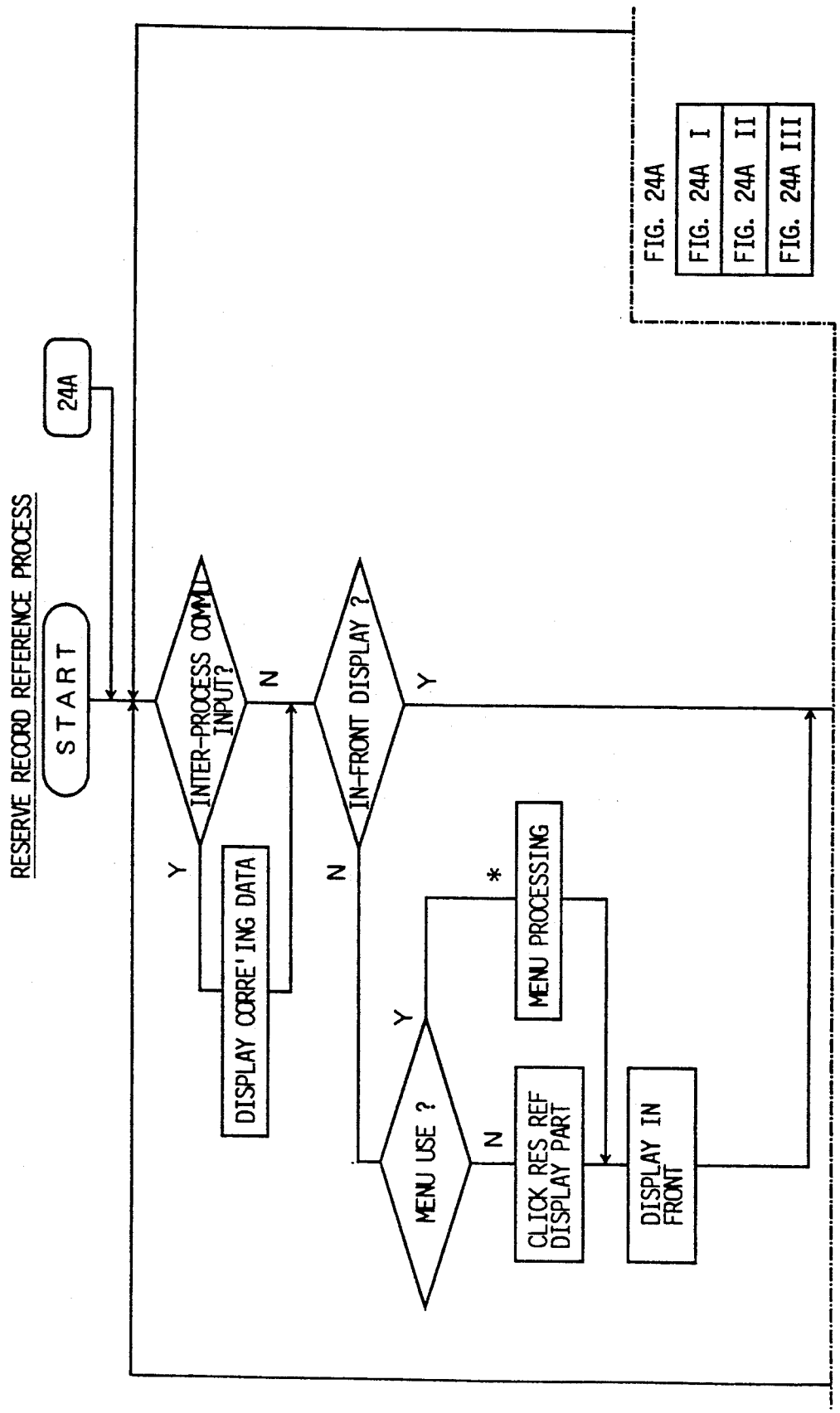

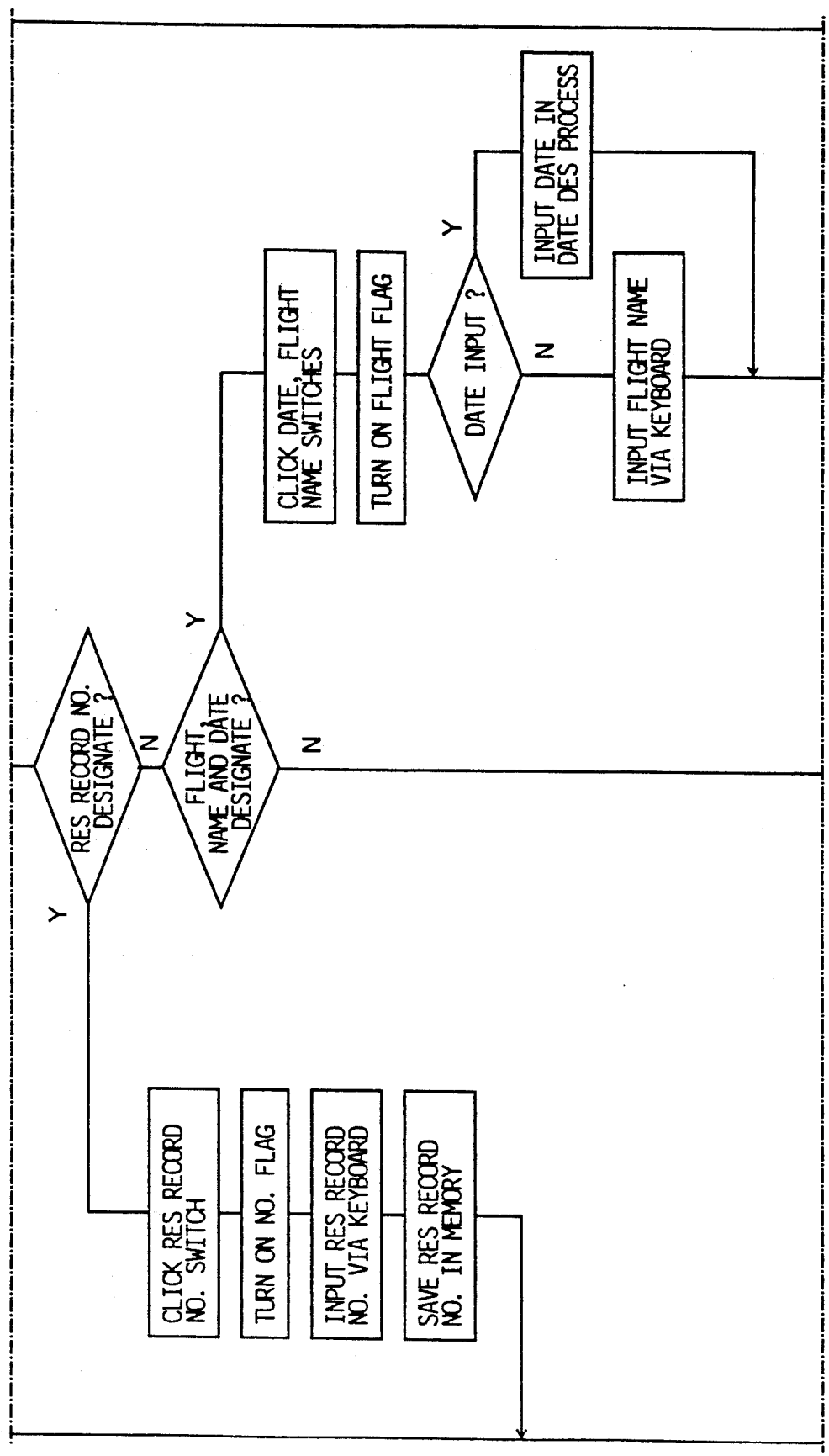
FIG. 24A II

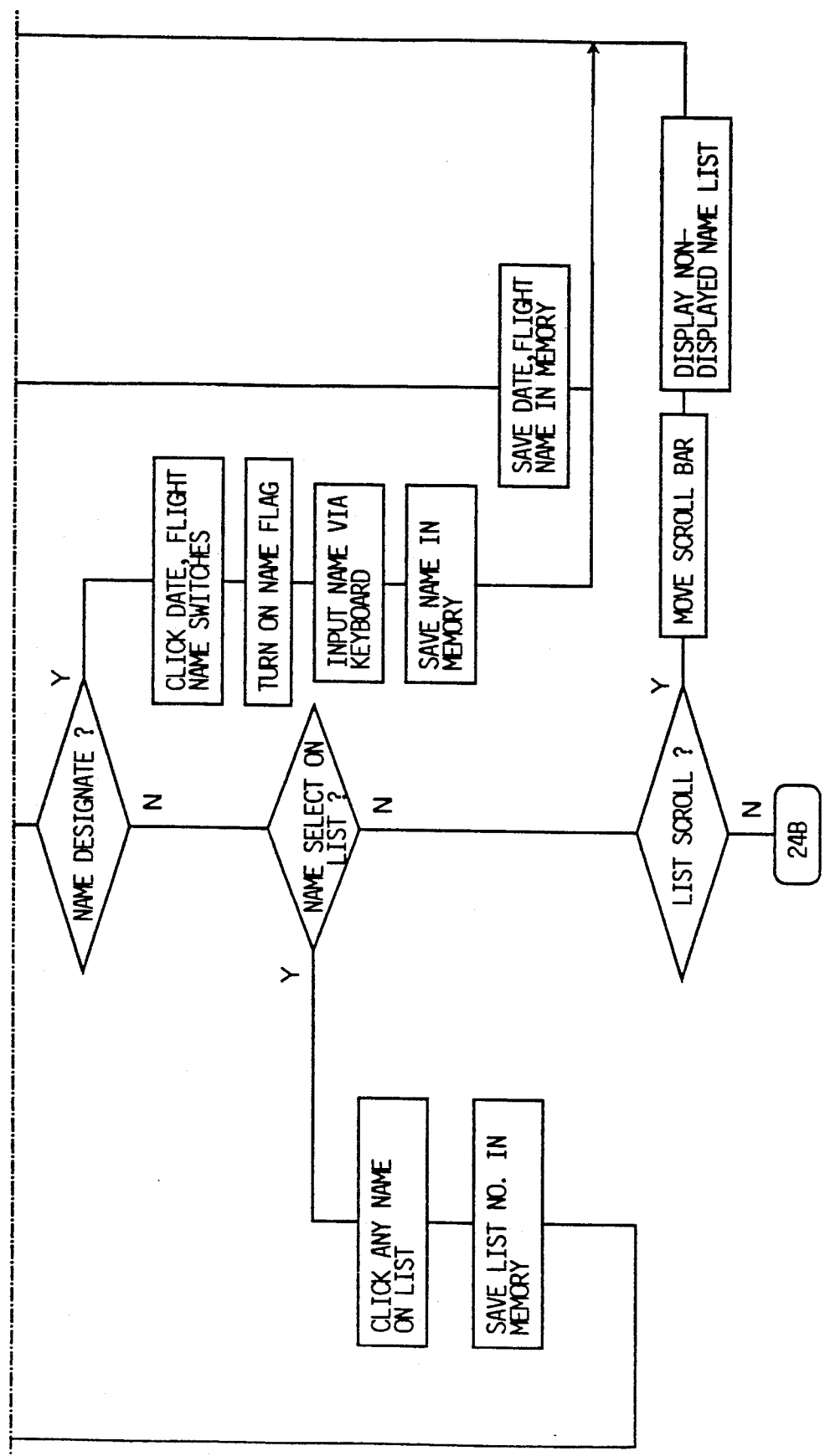
FIG. 24A III

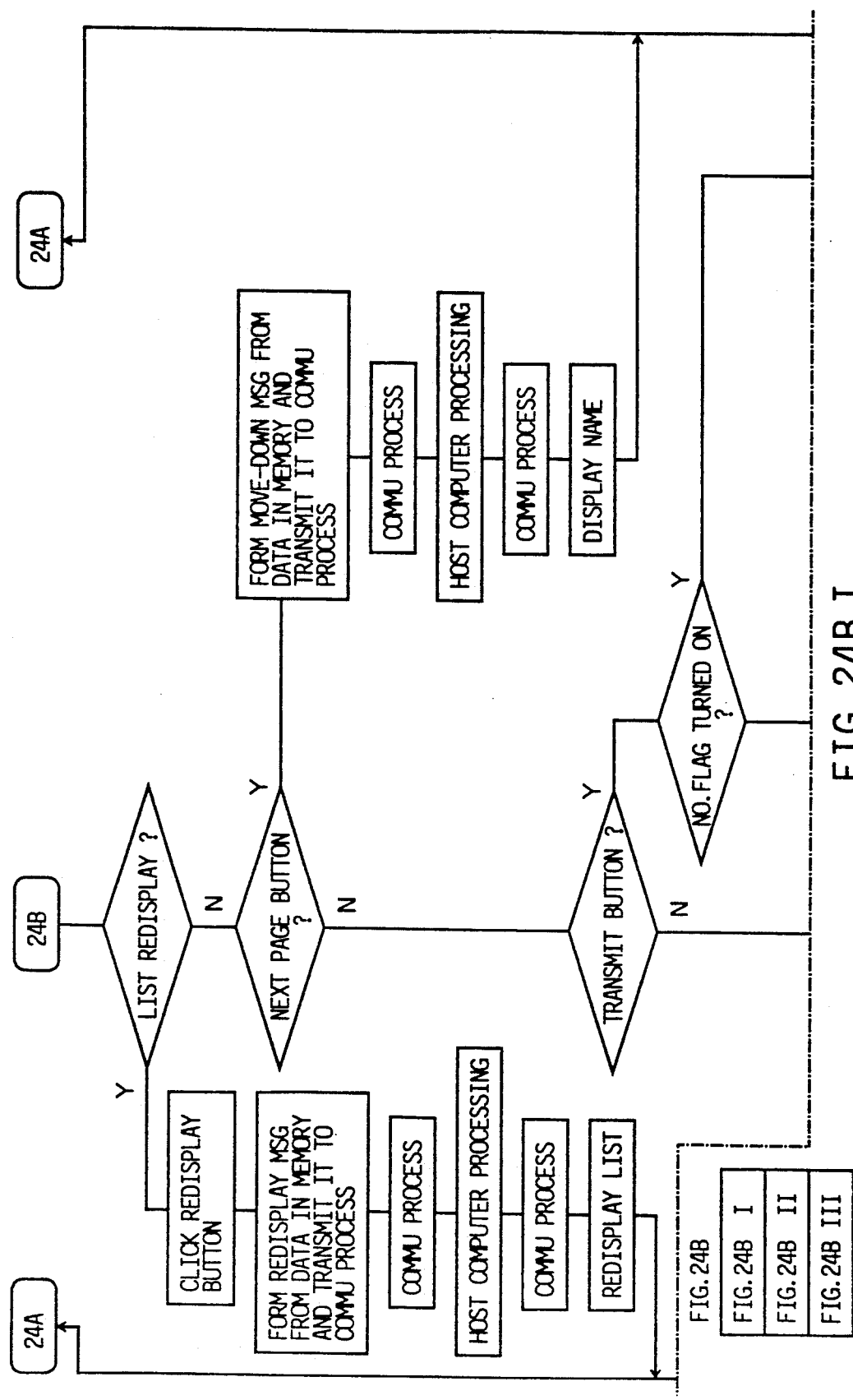
FIG. 24B I

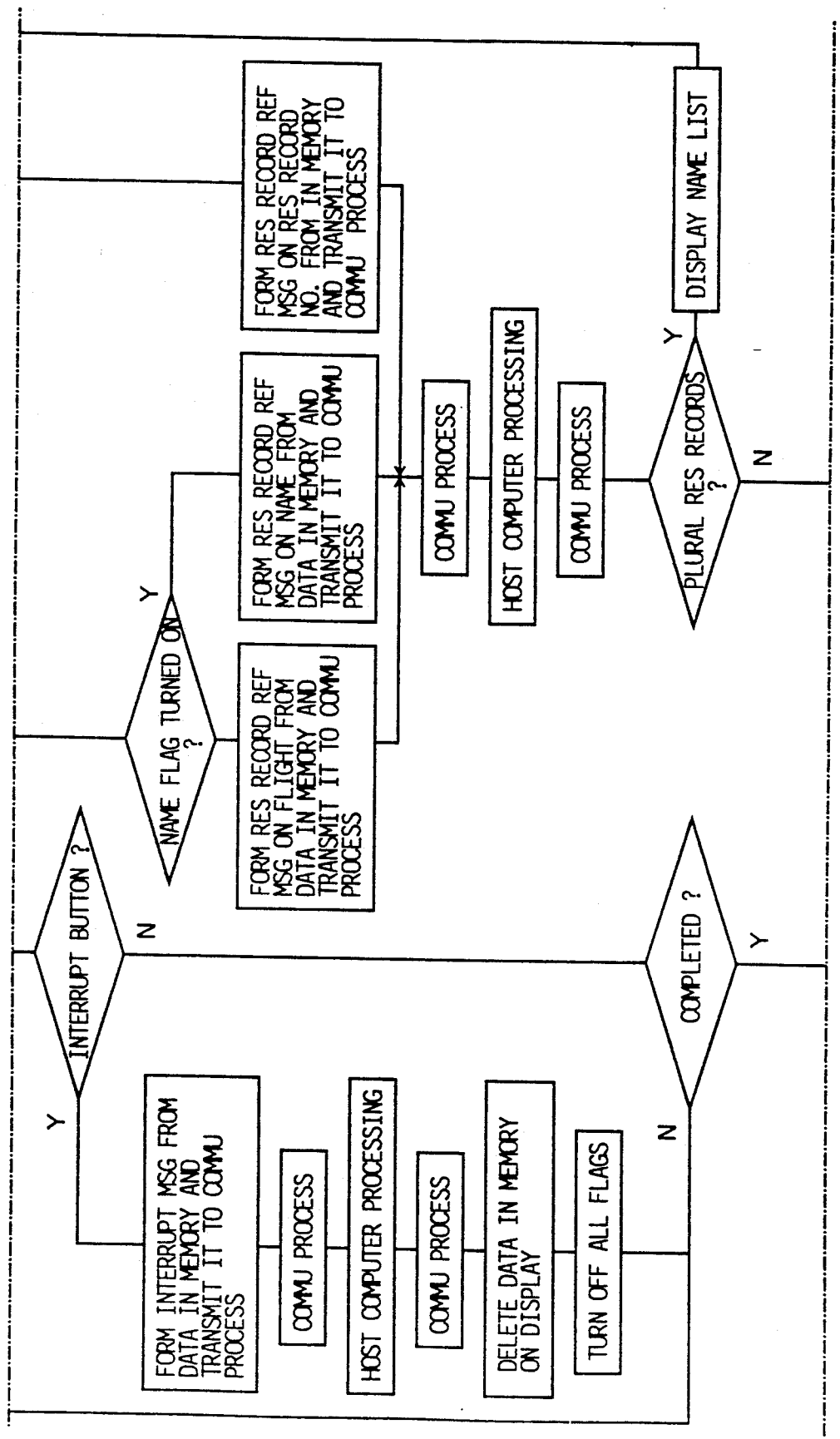
FIG. 24B II

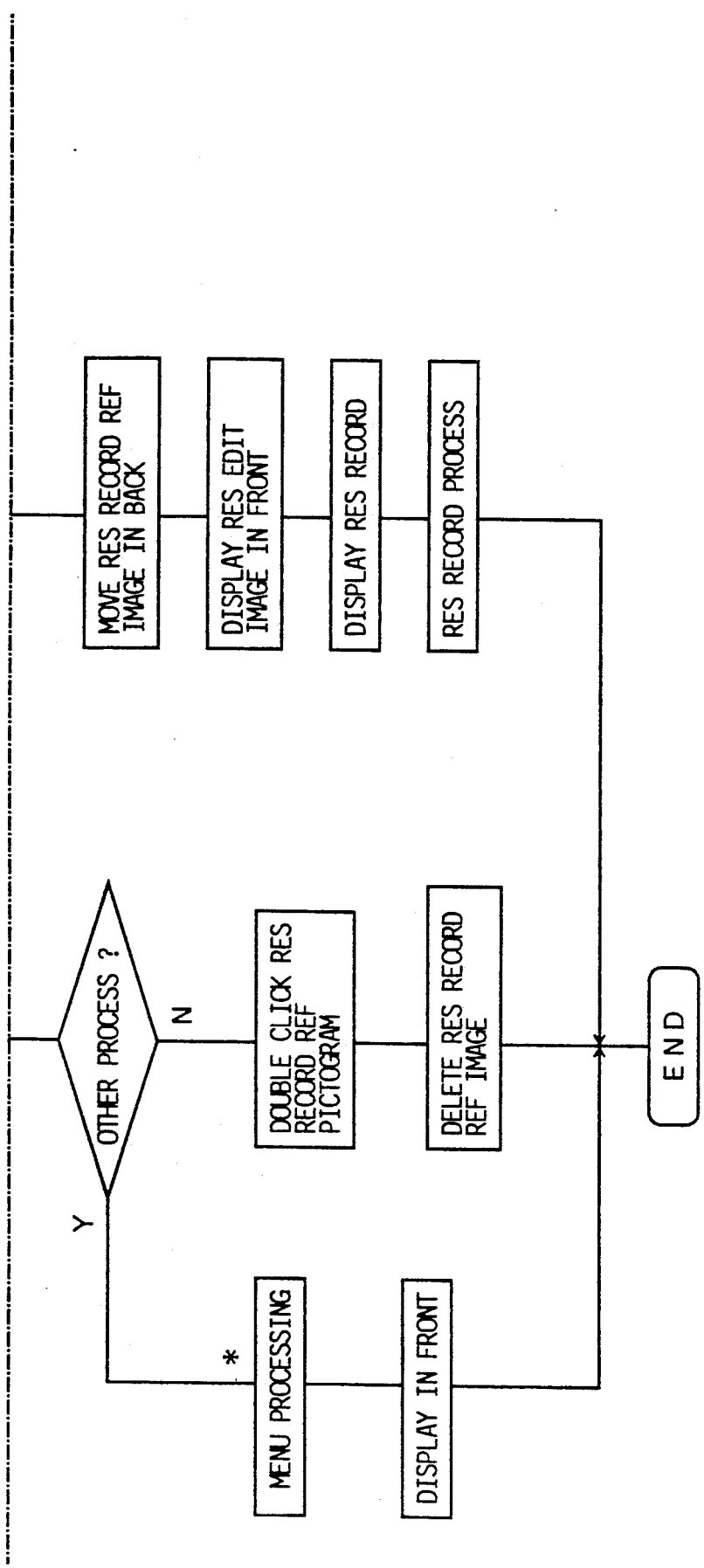
FIG. 24B III

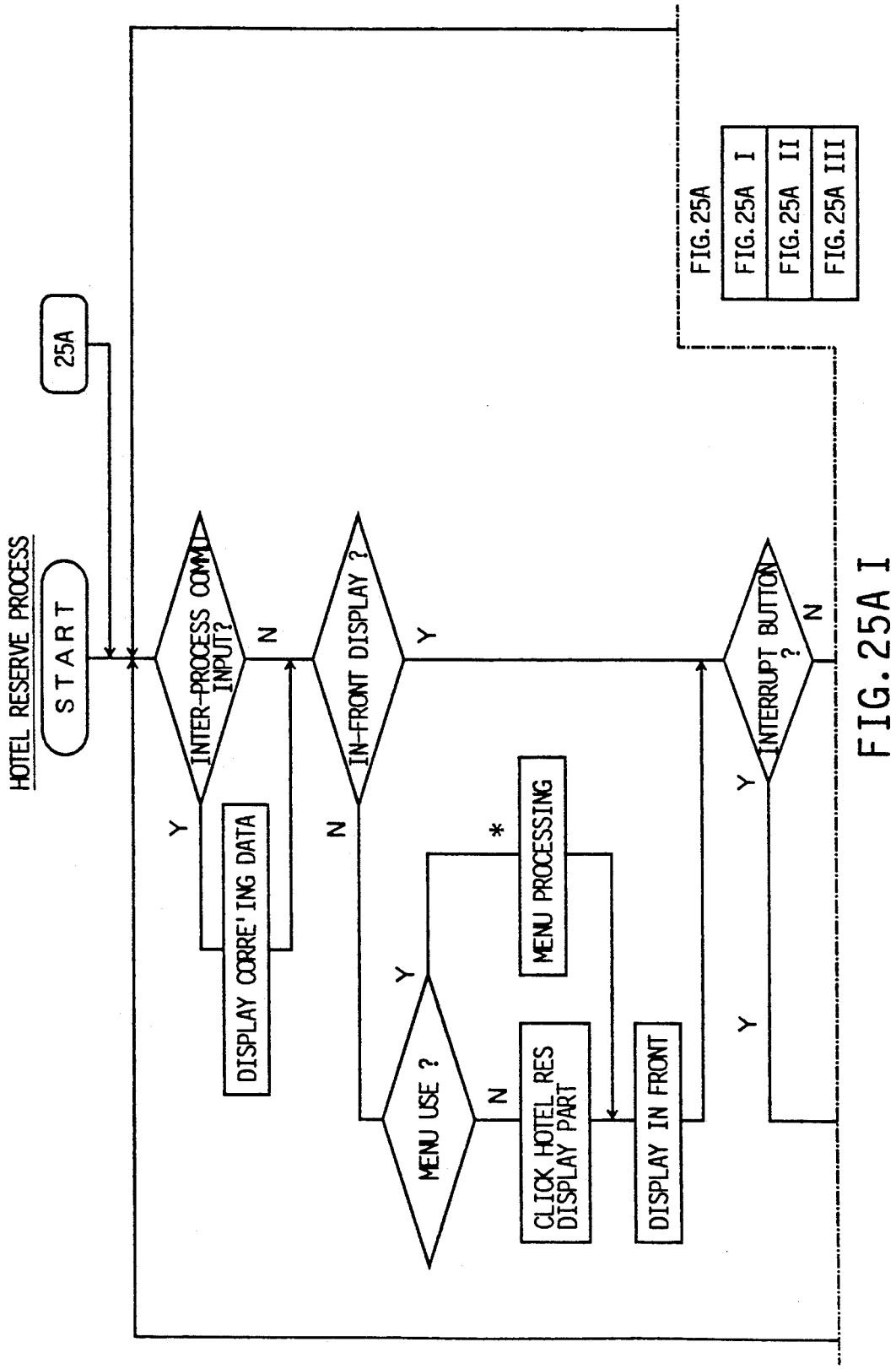

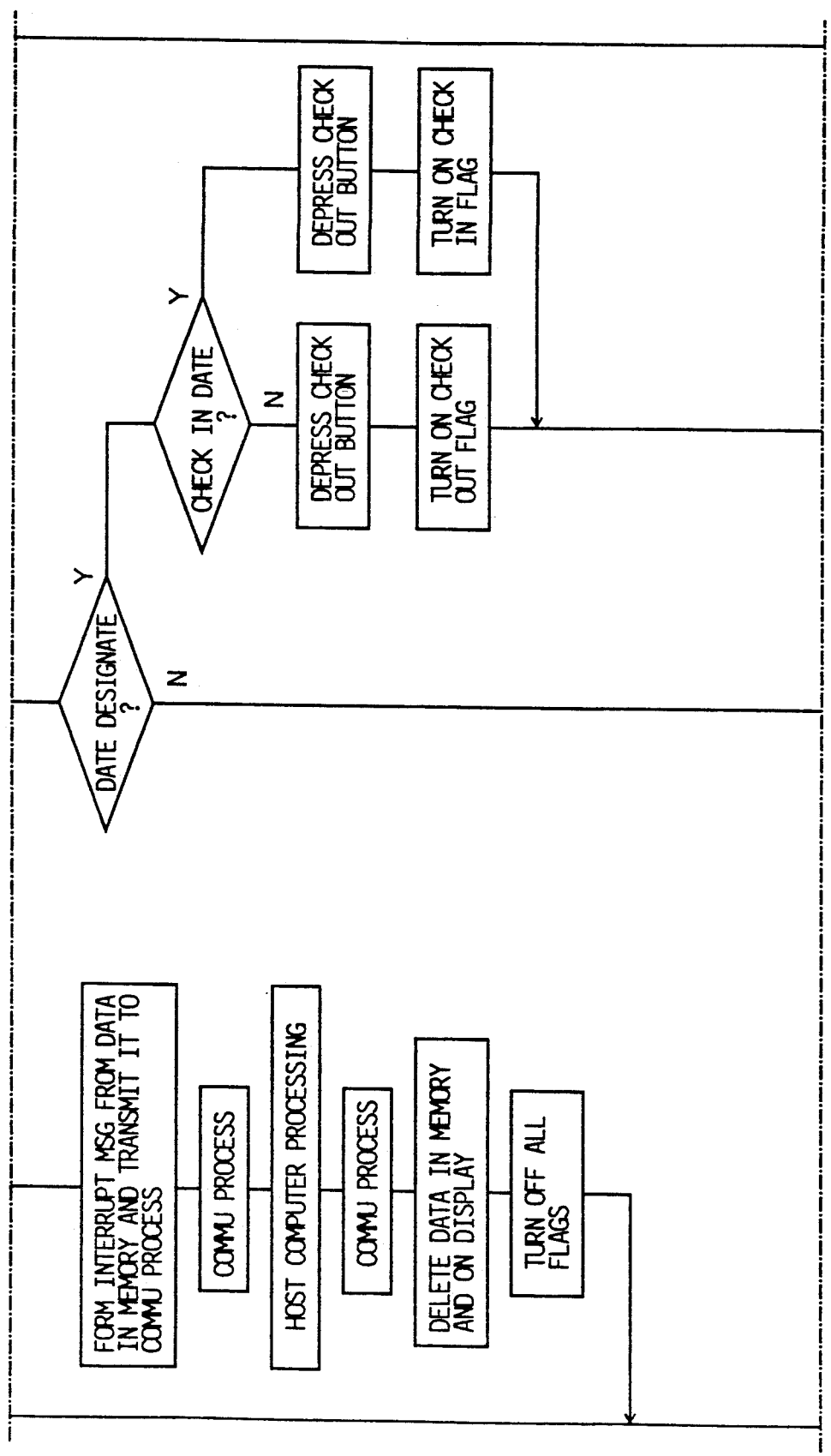
FIG. 25A II

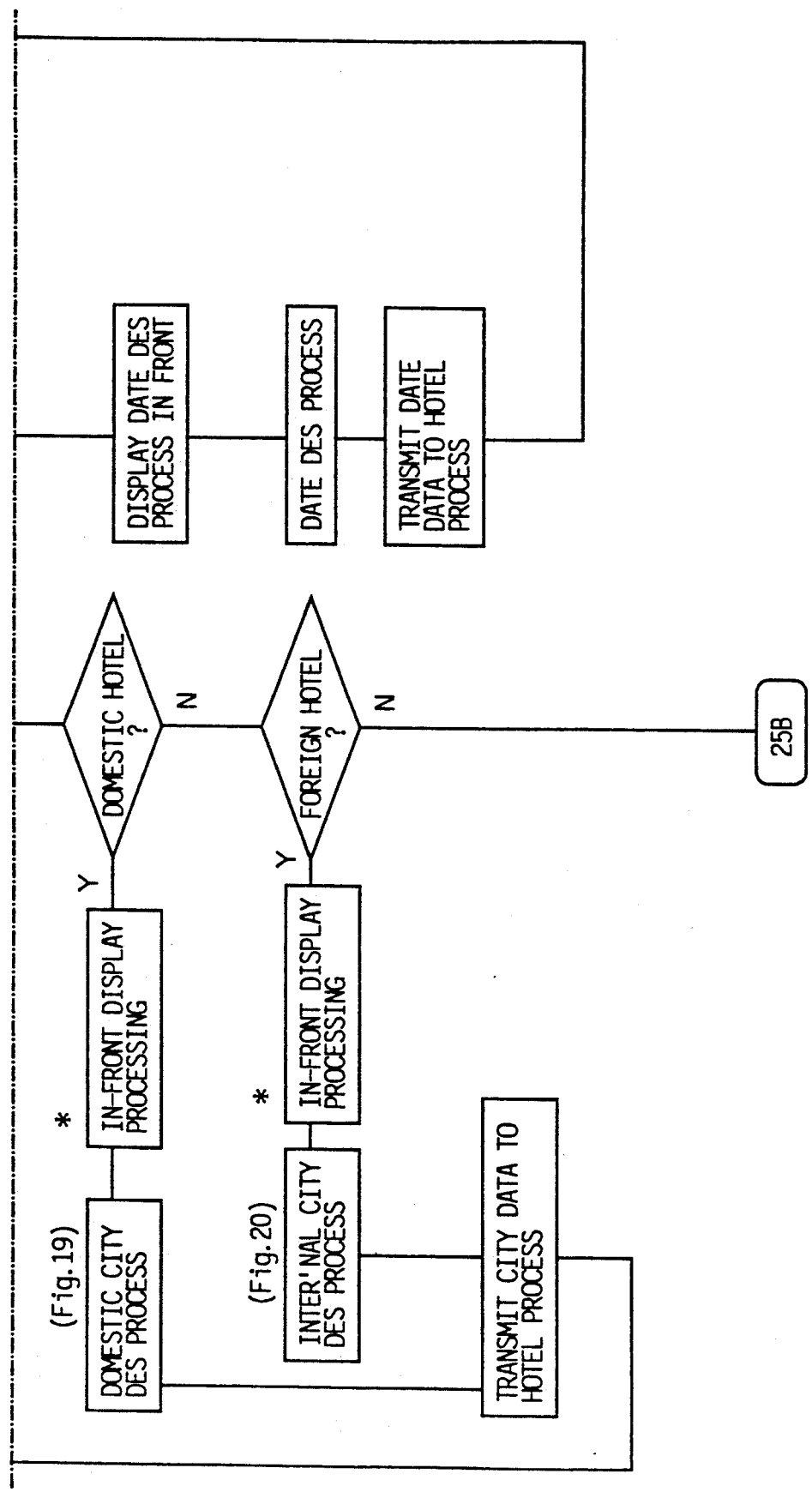
FIG. 25AIII

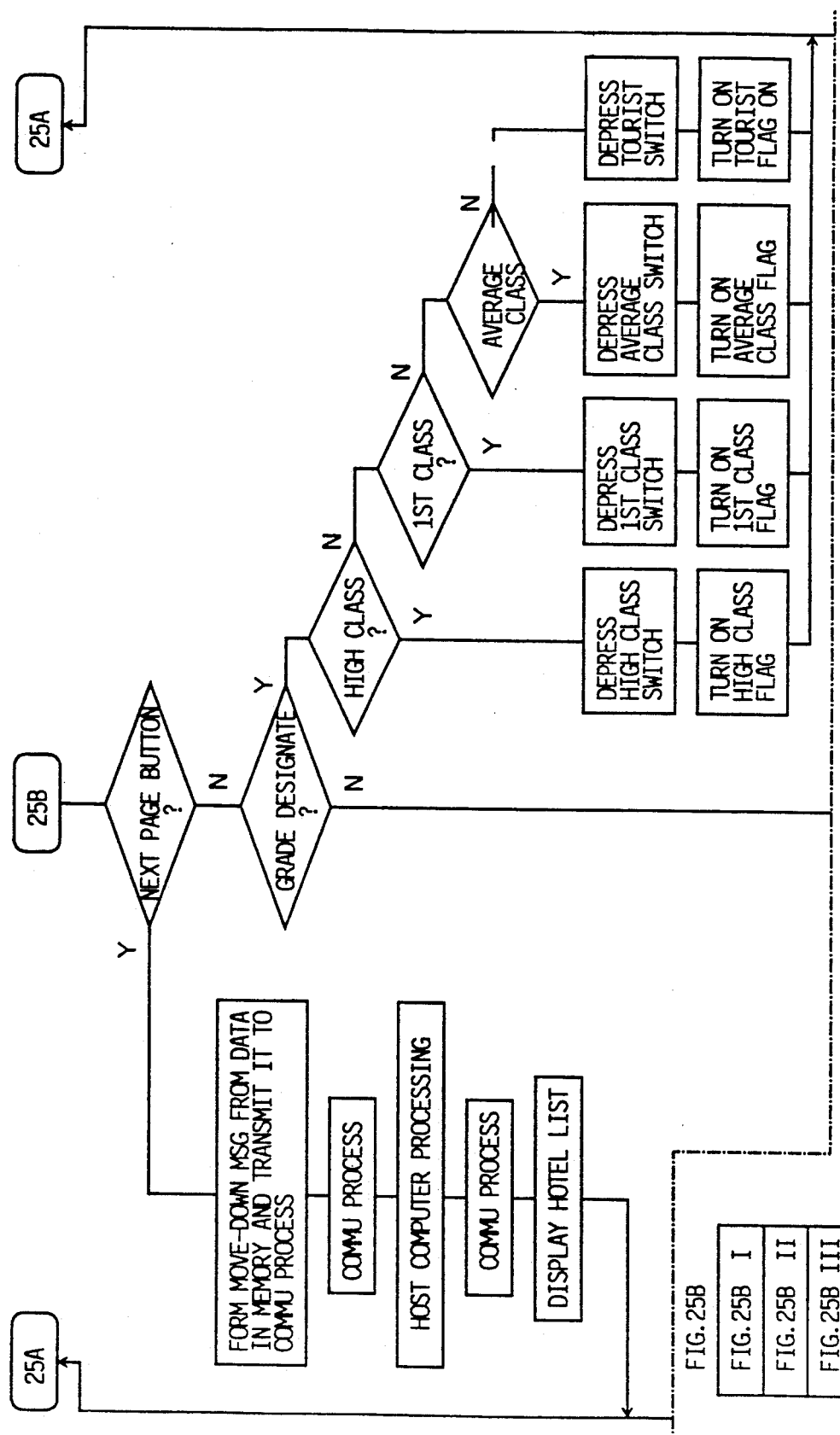
FIG. 25B I

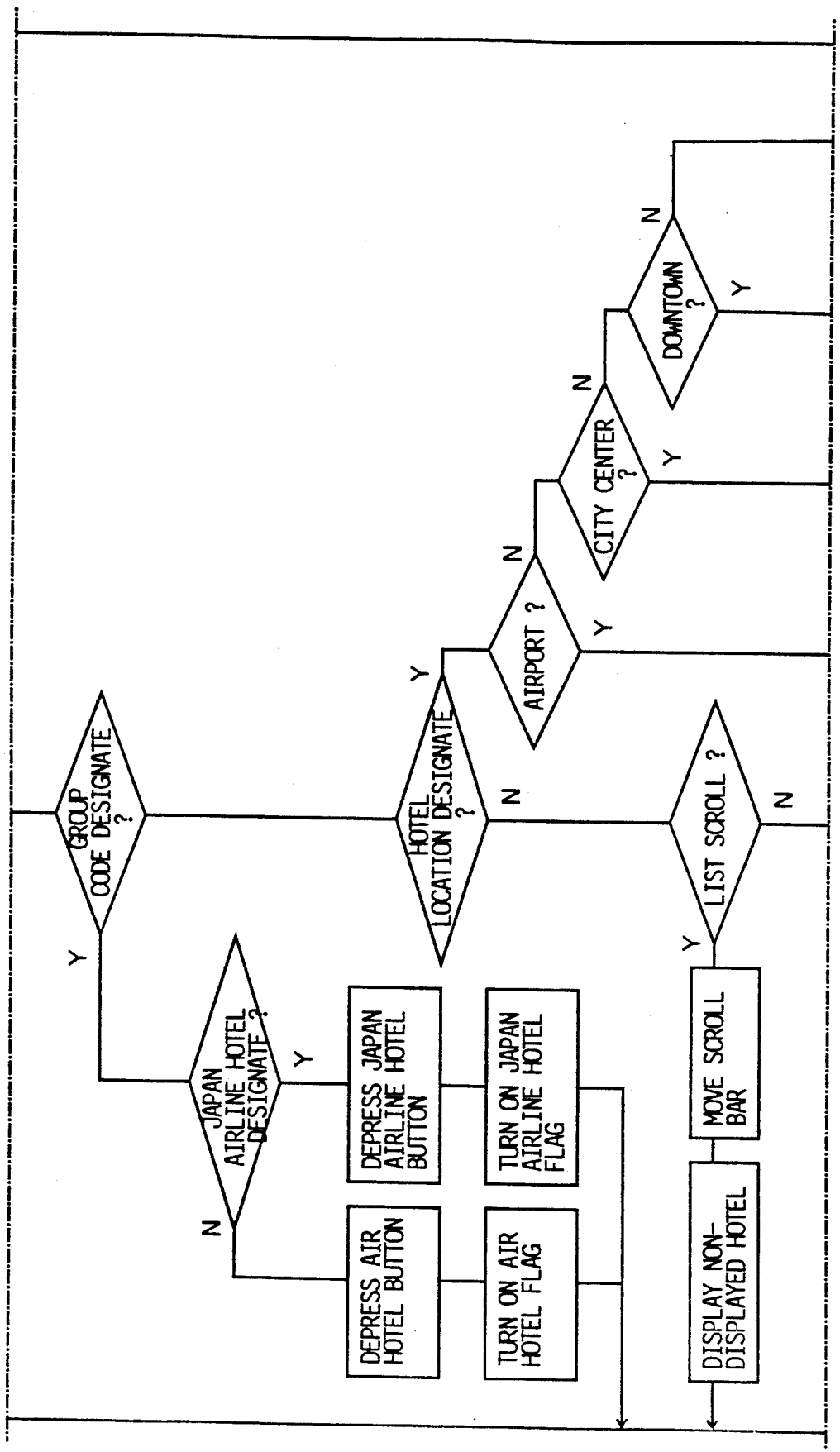
FIG. 25B II

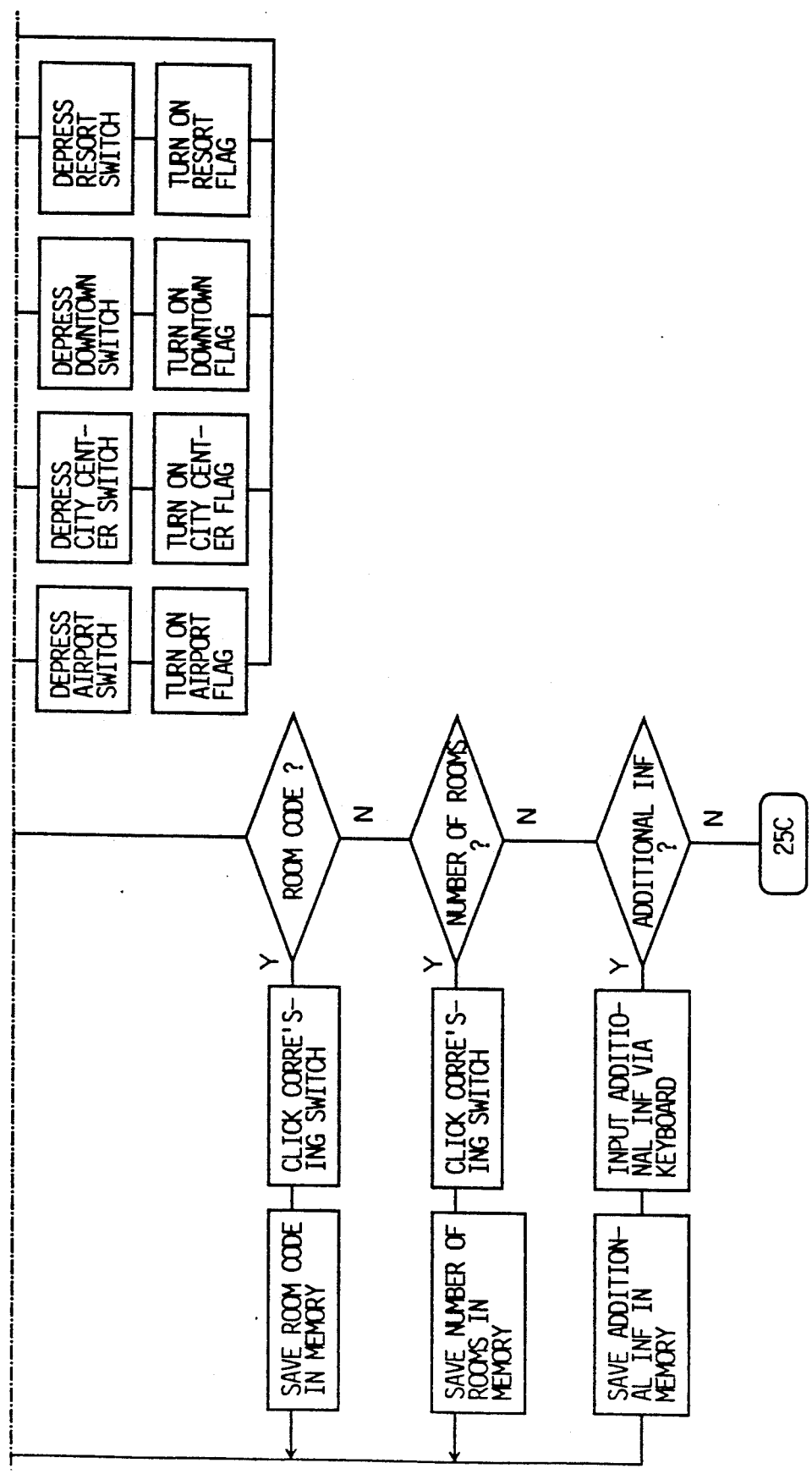
FIG. 25B III

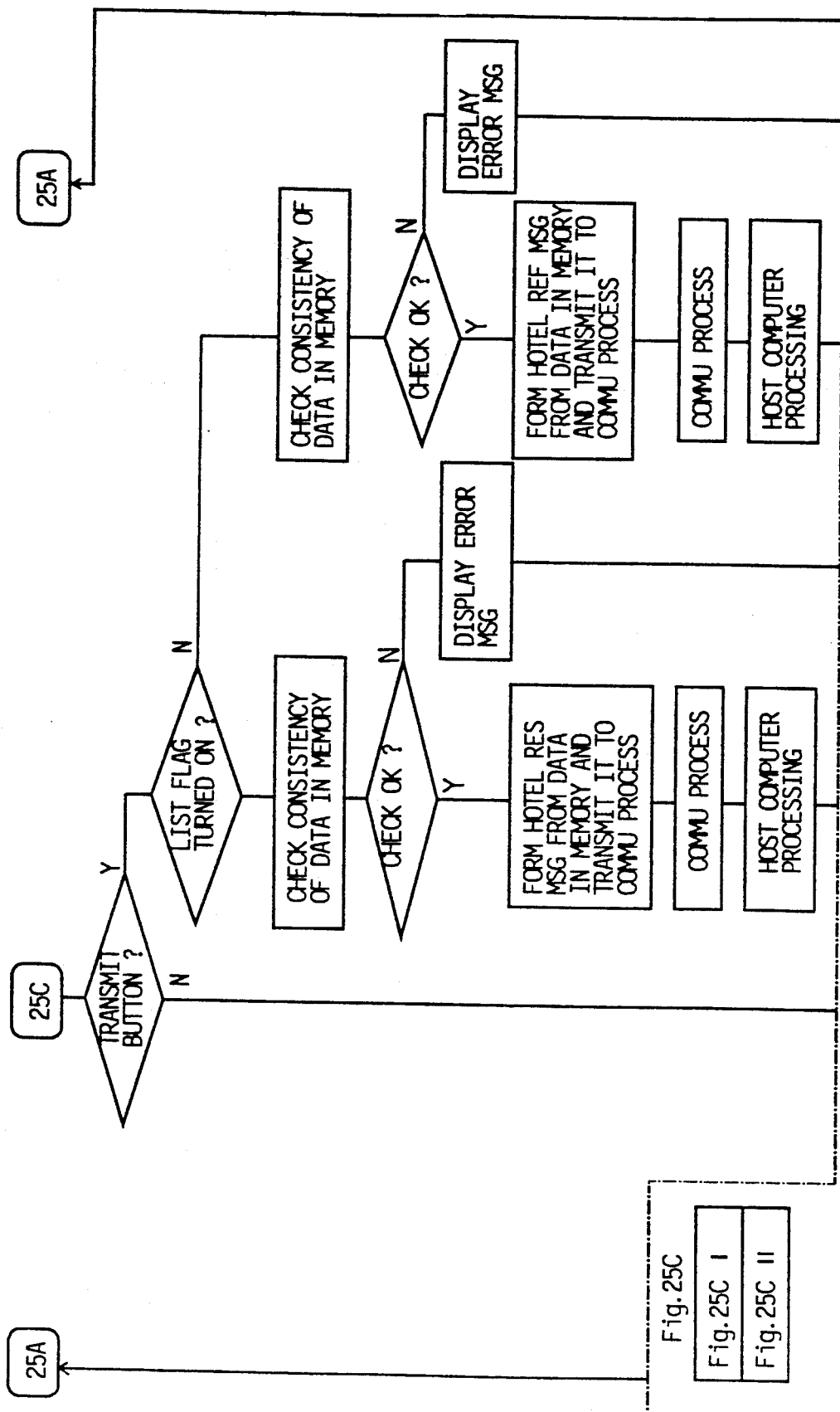
FIG. 25C I

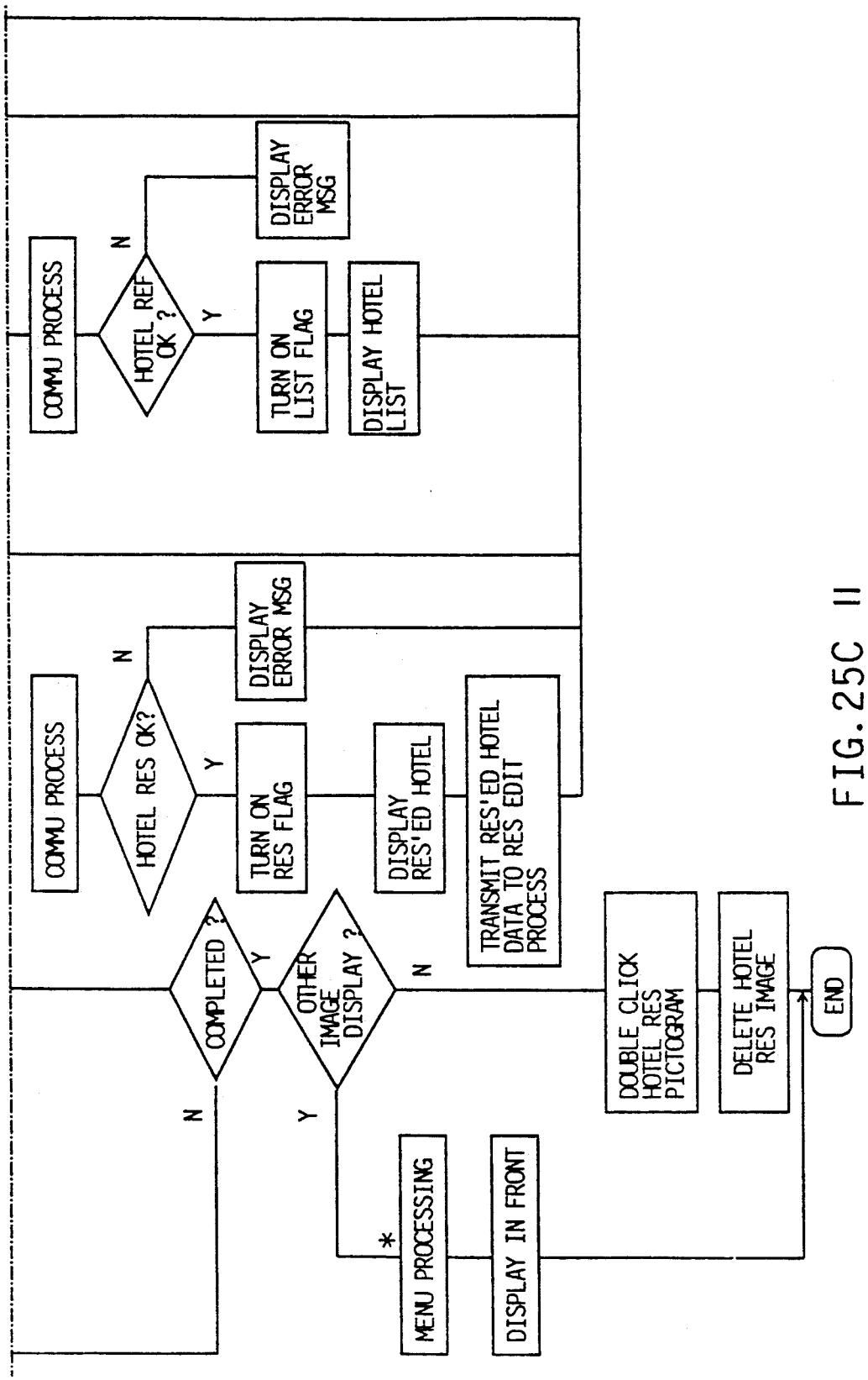
FIG. 25C II

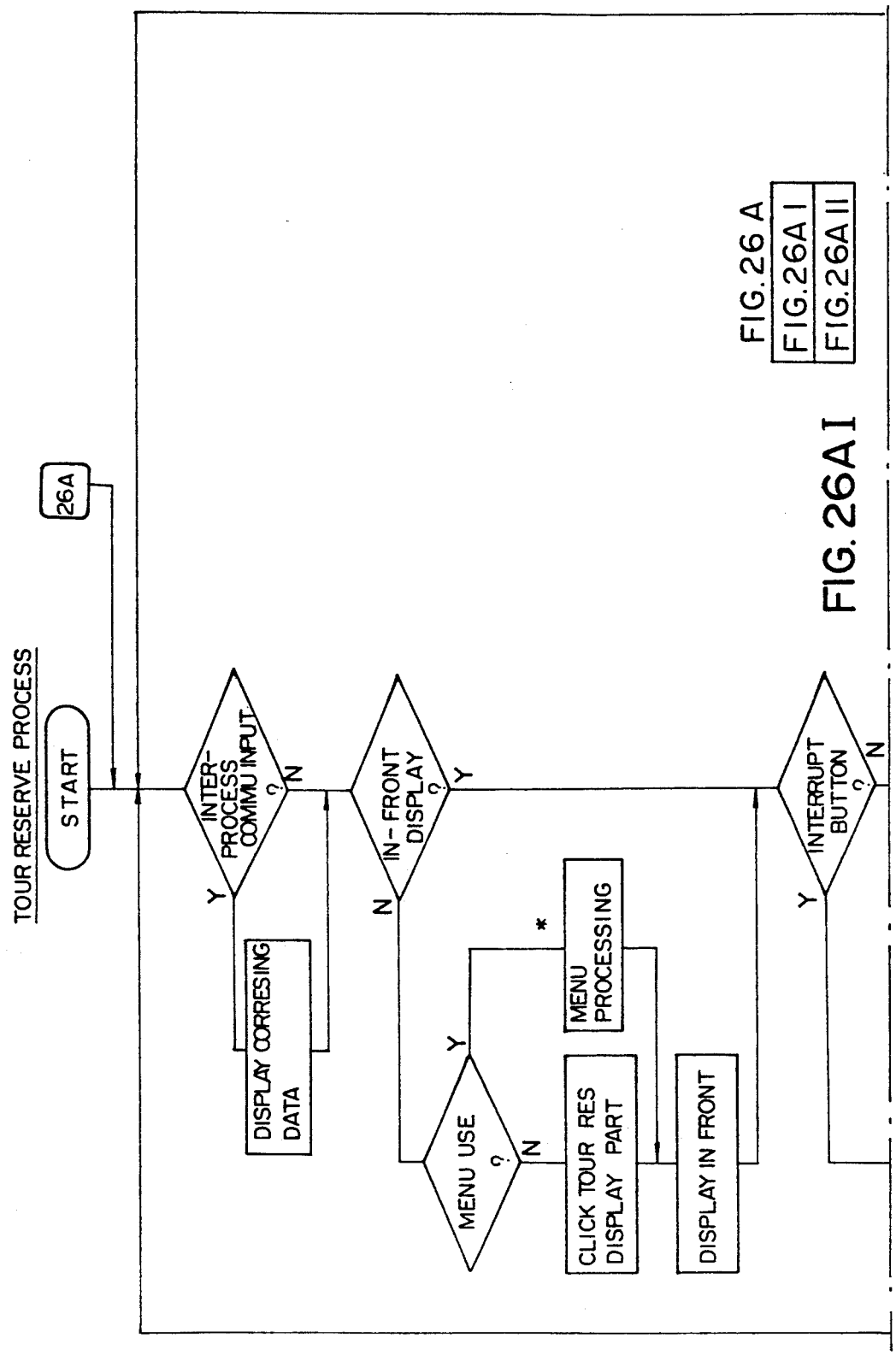

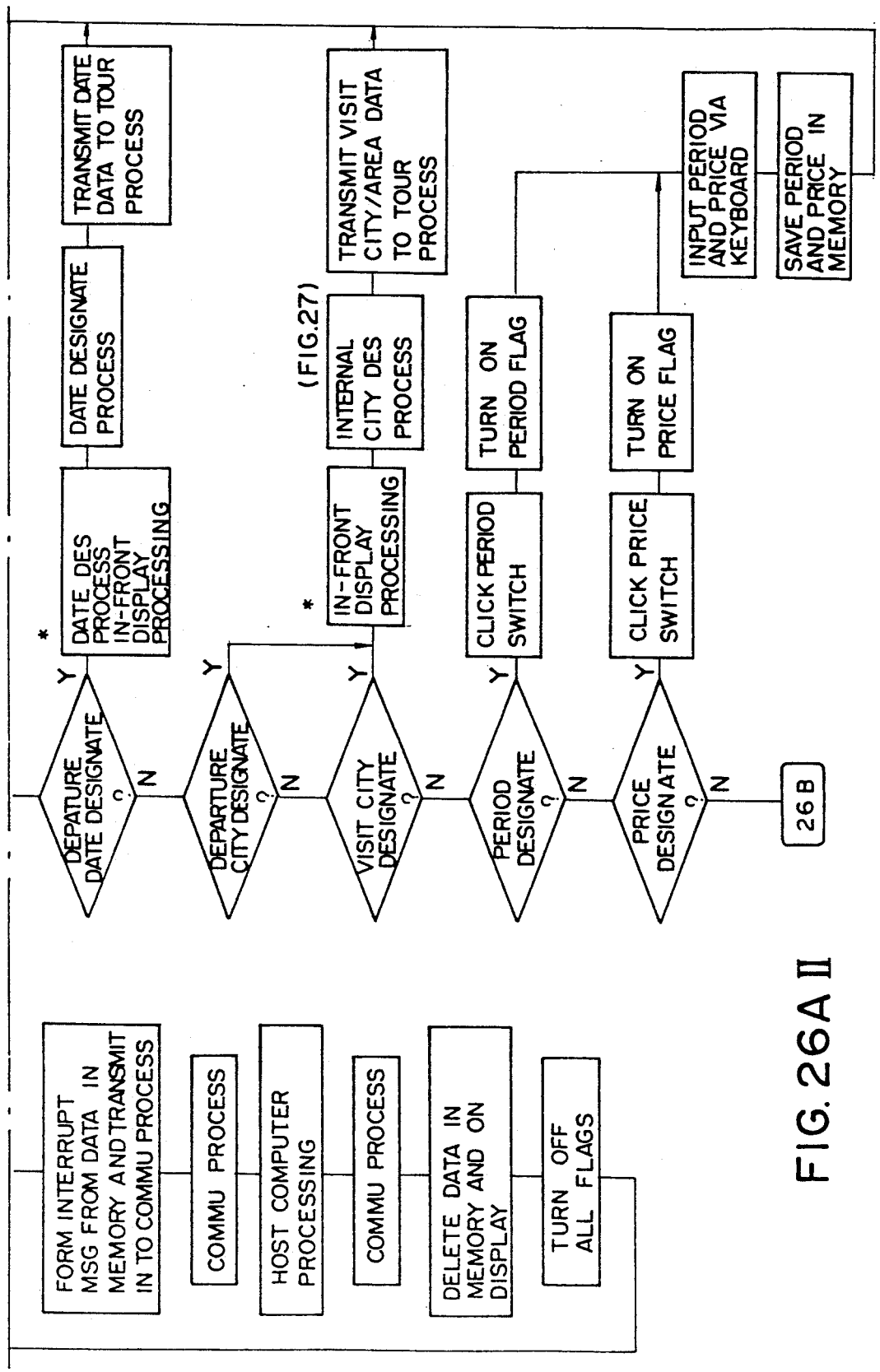
FIG. 26A II

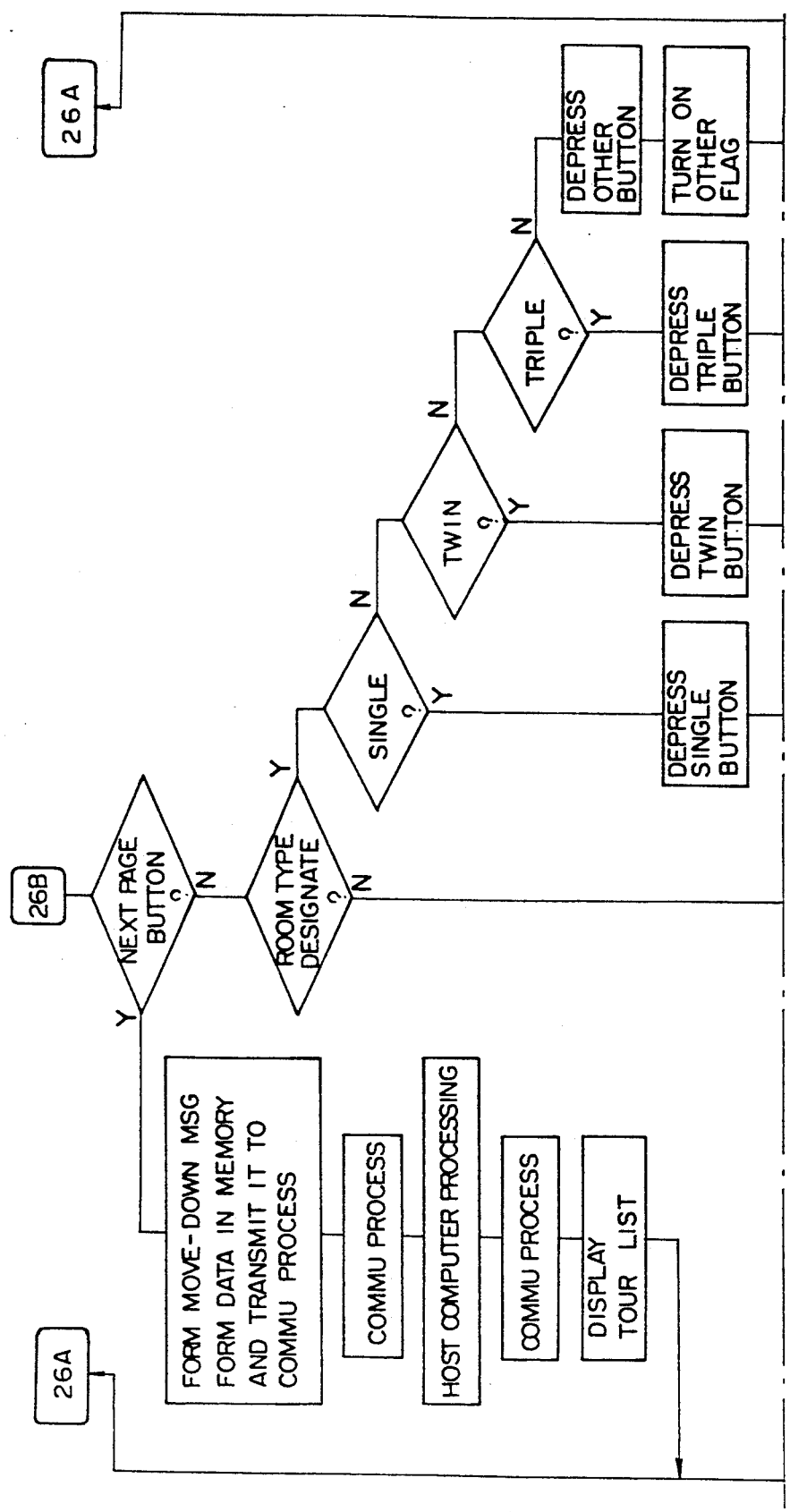

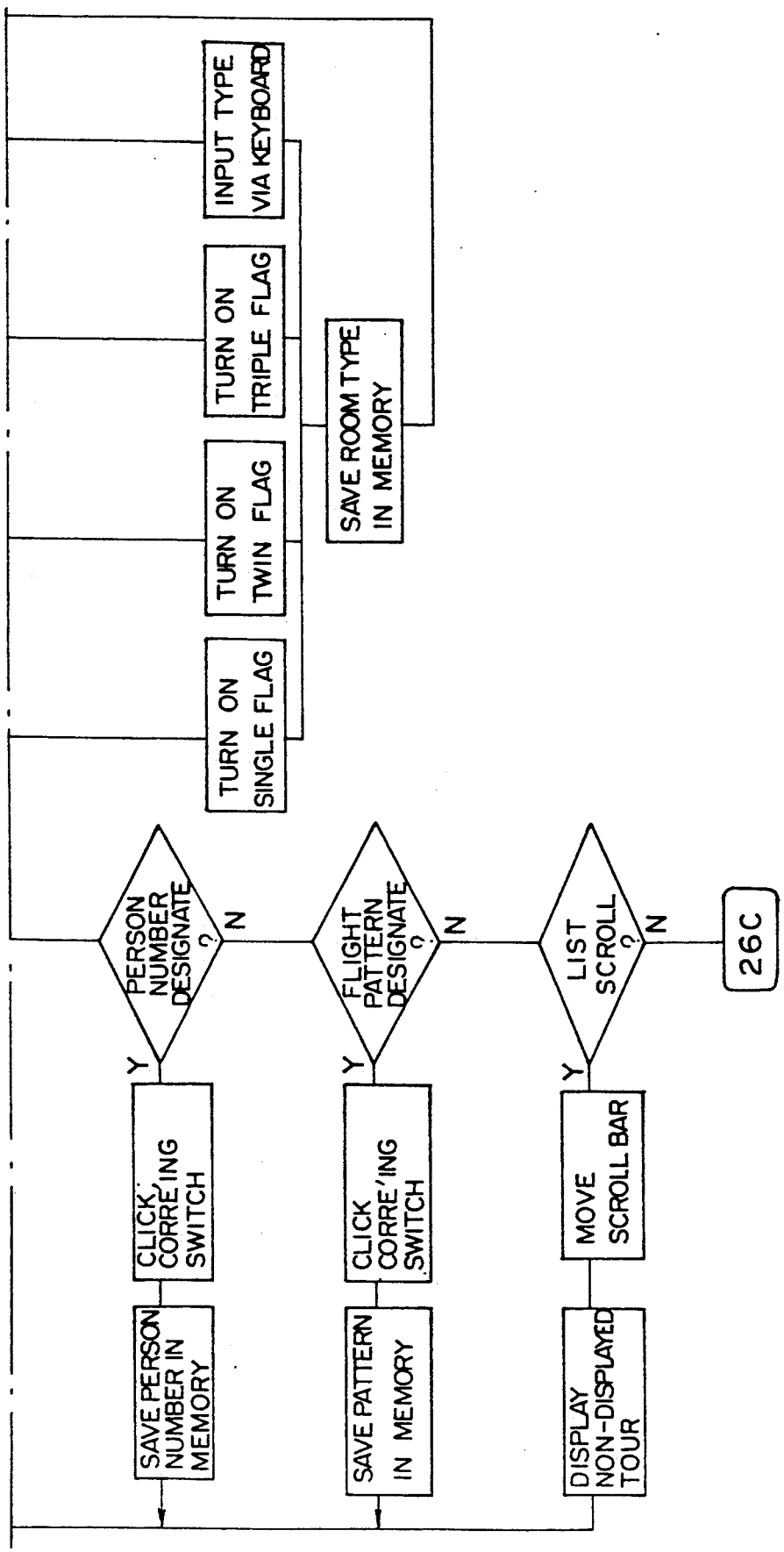
FIG. 26B II

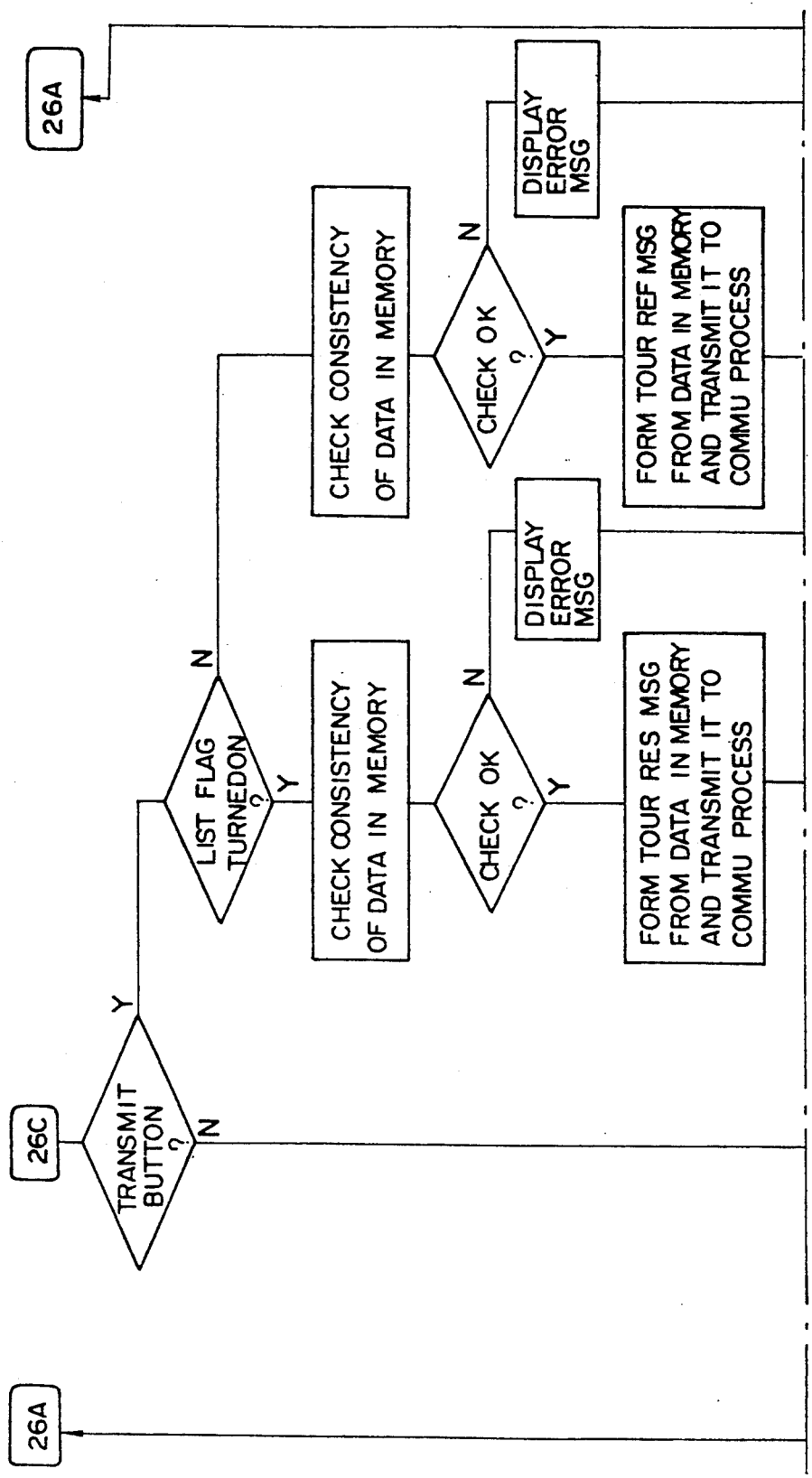

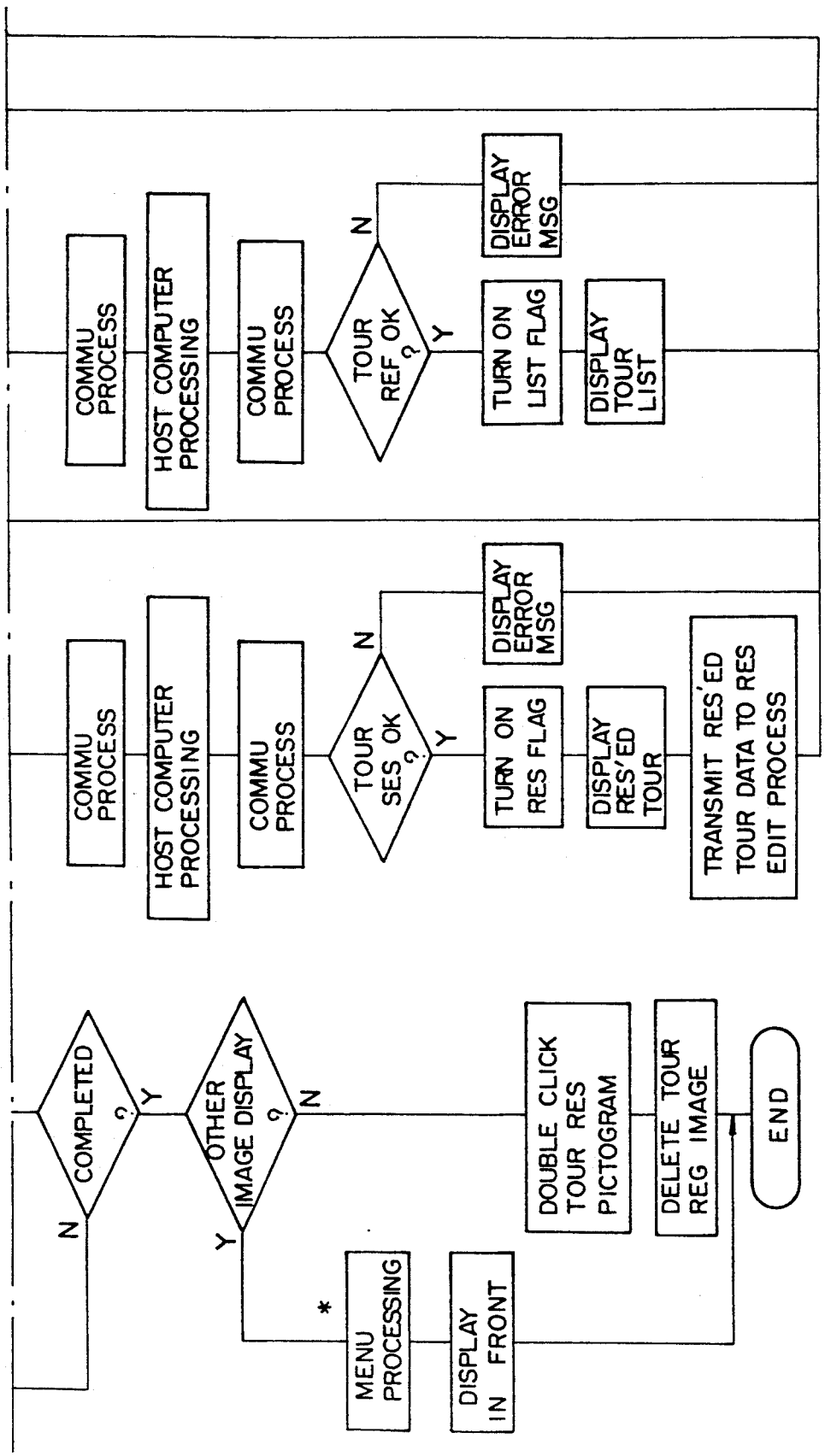
FIG. 26C II

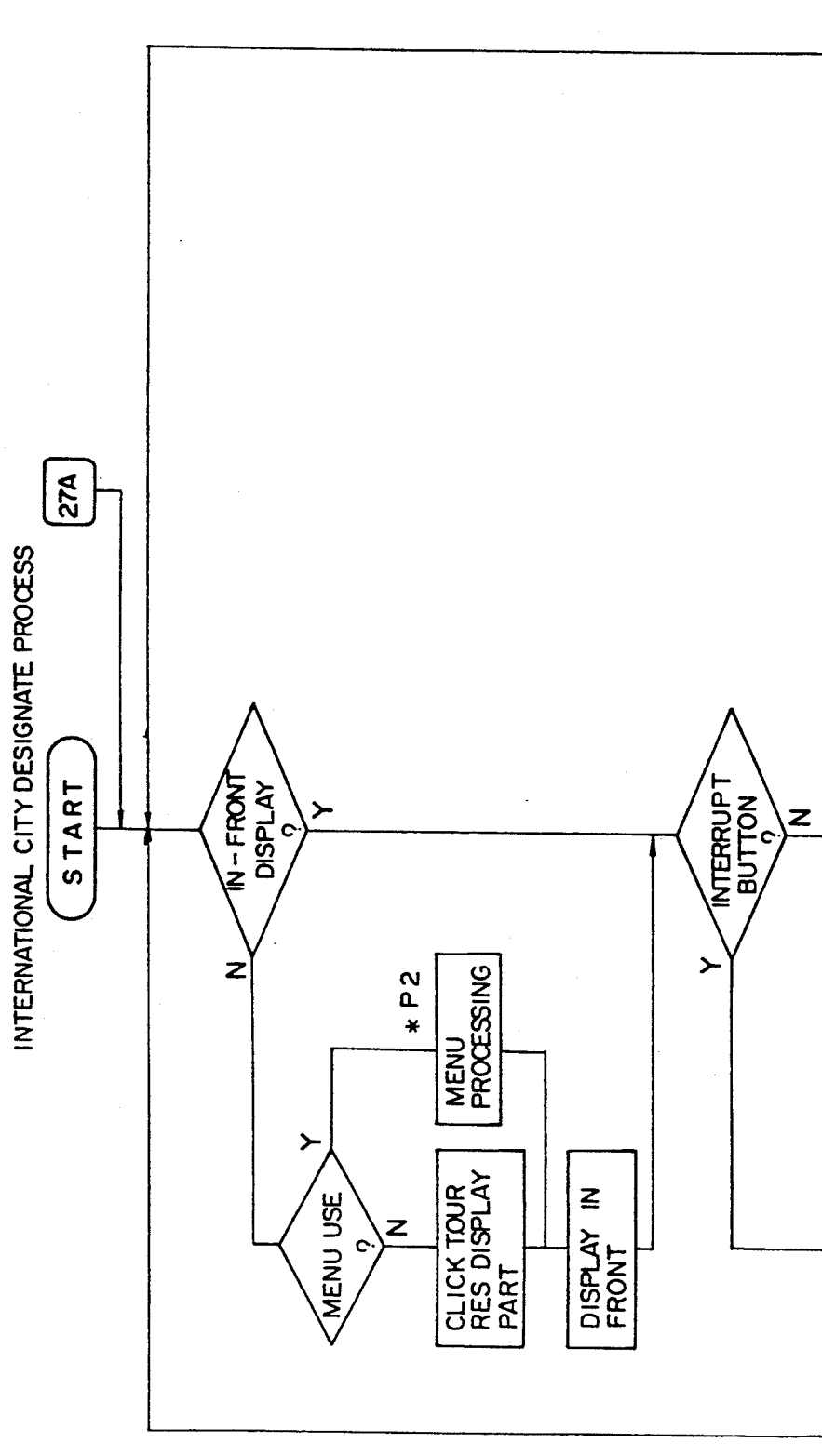

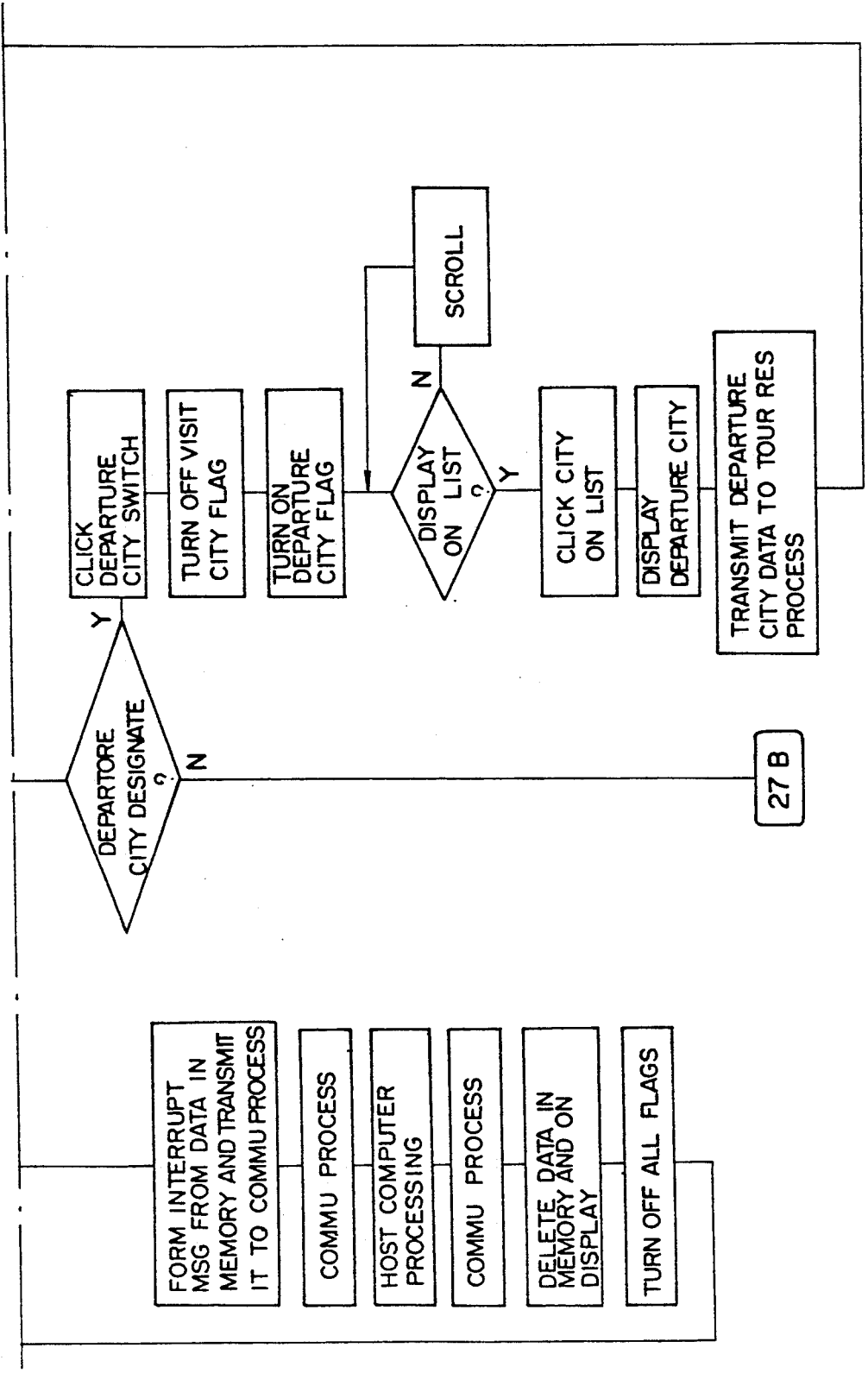
FIG. 27A II

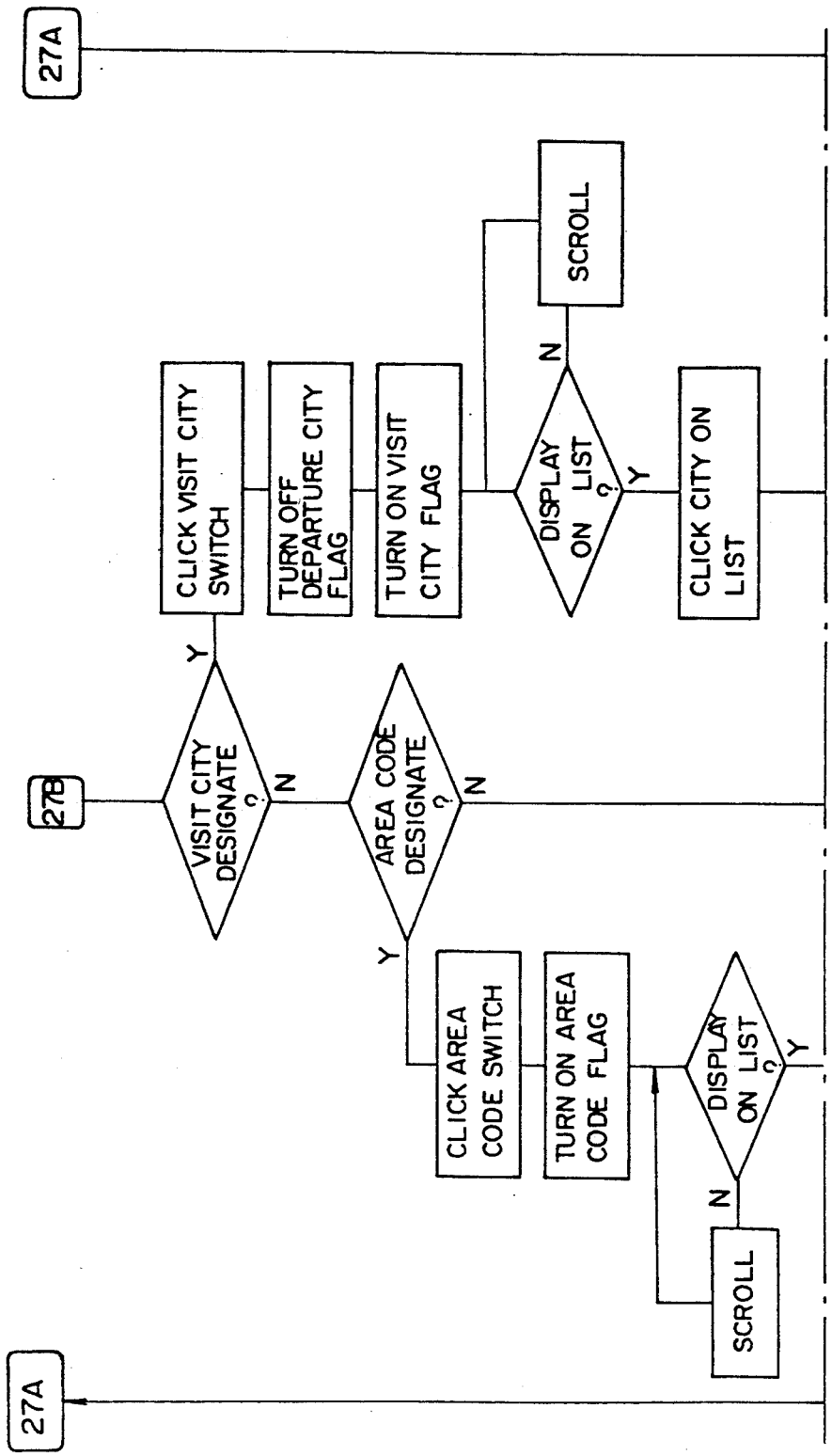
FIG. 27B I

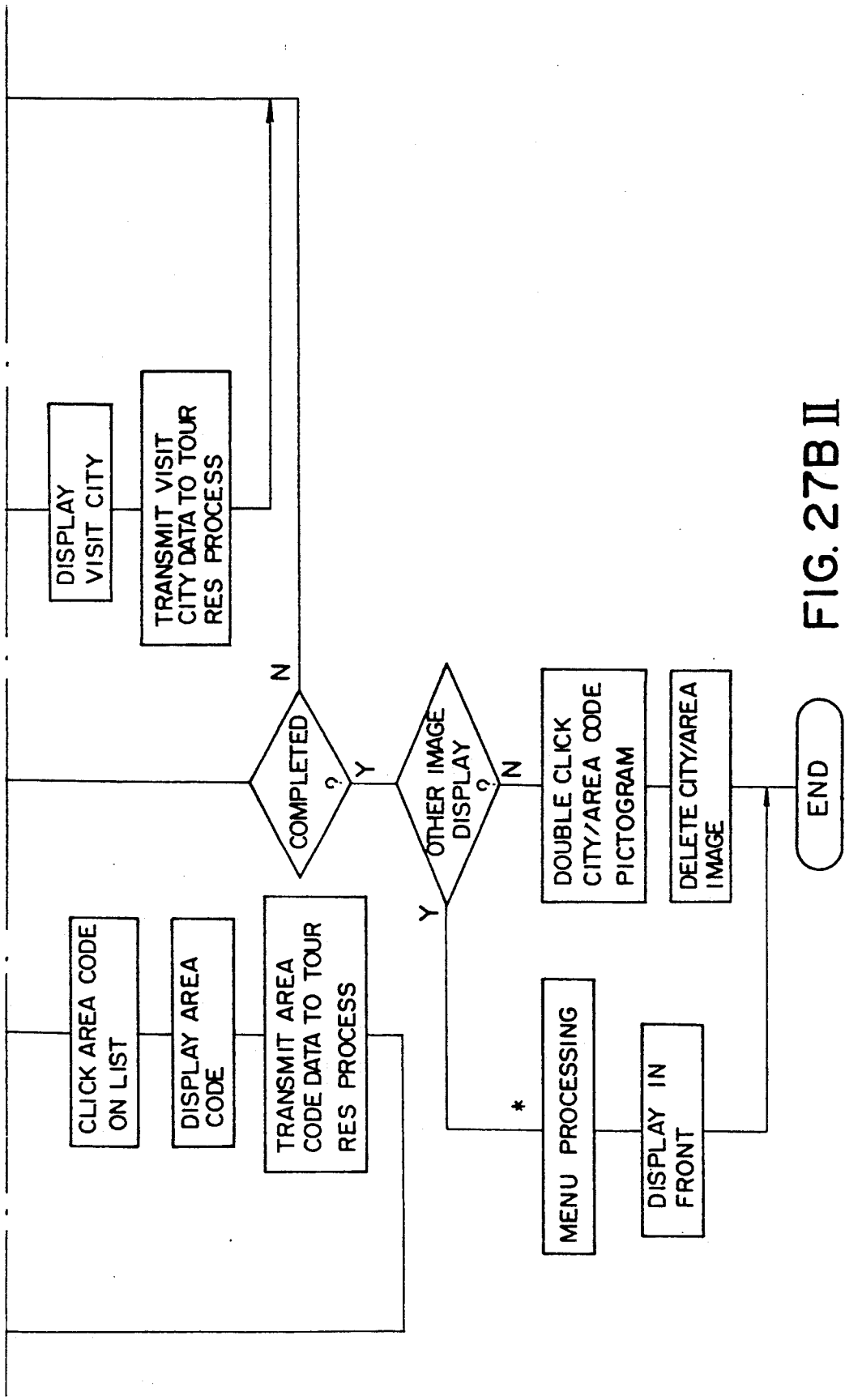
FIG. 27B II

RESERVATION SYSTEM TERMINAL

BACKGROUND OF THE INVENTION

1. Field of the Invention

The present invention relates generally to a reservation system for reserving various tickets of transport facilities, hotels, tours, etc. by means of a computer, more specifically, the invention relates to a reservation system terminal connected to a host computer for controlling reservation business through integration, in order to transmit operator's instructions to the host computer and to display response data returned from the host computer for use by the operator.

2. Description of the Prior Art

Conventionally, the procedure required to acquire a reservation at a reservation system terminal is roughly as follows: (1) an inquiry as to the current reservation status is made of the host computer to check for the presence or absence of vacancy (e.g. unoccupied seats); (2) if unoccupied, a reservation acquisition instruction is transmitted to the host computer; (3) further, some information such as a name, a place where to make contact, etc. are inputted according to the necessity; and finally (4) a reservation record is prepared to complete the reservation procedure. Further, in some simple reservation systems, the reservation procedure can be completed by only the above steps (1) and (2).

In the prior-art reservation system, however, a series of the above-mentioned reservation procedures can be achieved when the operator inputs coded messages in accordance with predetermined formats through a terminal keyboard.

A prior-art flight reservation system now adopted by the Japan Air Line Corporation will be explained in further detail by way of example. When an inquiry is made into the reservation status, (1) the operator first inputs an instruction code indicative of a reservation status reference through a terminal keyboard; (2) a flight section code is inputted; (3) a date code is entered; and (4) a transmit key is depressed, finally.

For instance, when the reservation status referred to is the section between Haneda and Osaka on January 1, a message such as

⌈AS HNDOSA 01 JAN⌋ is inputted through the keyboard. This message is received by the host computer; the host computer informs the terminal of the current unoccupied status of flight numbers between Haneda and Osaka at that day; and the unoccupied flight number list is displayed on a terminal CRT image.

With reference to the displayed image, a reservation acquisition procedure is effected with respect to flight numbers displayed in the list. In this case, all the instructions and information data required for flight reservation such as flight number, class, the number of seats, etc. are inputted as codes in accordance with predetermined formats through the keyboard.

The prior-art reservation system is called entry-oriented system, because all the instructions to the host computer are dependent upon the operators' keyboard operation. In addition, since the messages inputted through the keyboard are coded in accordance with predetermined formats, the entry-oriented system mainly involves the following problems:

(1) The operability or ability to manipulate the system is poor. In more detail, the operator must remember all the instruction codes to be sent to the host computer, the input format, and necessary information codes, etc. In addition, the number of complicated instruction codes and input formats are increased more and more with diversification of the current reservation business. Further, since the prior-art system was originally developed in the U.S.A. and therefore the instructions are coded on the basis of English language, non-English speaking individuals find working the system difficult. As a result, it is practically impossible for unskilled operators to operate the system, and therefore many hours and large expenditures are required to educate and train the operators.

(2) Since all the operational procedure is dependent upon the operator's keyboard operation, a large multitude of key strokes are required for a single reservation processing and therefore the business efficiency is inevitably low. In addition, there exist other problems in that the operator tends to become fatigued, particularly in the eyes, fingers, arms, shoulders, etc.

(3) The intelligence capability of the terminal is not sufficiently put to practical use. A device provided with a high intelligence capability such as a personal computer is usually used as the terminal. However, the prior-art terminal is only used as a man-machine interface function between the operator and the host computer, so that it is impossible to store even the response data transmitted from the host computer or the information inputted by the operator. Therefore, since the response data and the input information obtained at the preceding procedure cannot be used again at the succeeding procedure, the operator must repeat the same operation as at the preceding procedure, thus resulting in a lower business efficiency.

To overcome these problems, conventionally some improvements have been made mainly in the terminal operability and practical use of intelligence capability as follows:

(1) Input guide formats necessary for a reservation procedure are provided within the terminal. The operator calls these guides in sequence according to their necessity for help in inputting the necessary information through the keyboard.

(2) A required number of keys at which various information codes are stored are provided for the terminal.

(3) Some often used input format examples are stored in specific keys, and other formats only for items of different contents are modified before to the terminal.

(4) A display image is divided into a plurality of areas, and some information required for the succeeding procedure is kept in some areas.

In the above-mentioned improvements, however, since the improvements have been made in relation to the entry-oriented systems, in which all the procedure is dependent upon the keyboard operation, the intelligence capability of the terminal is not sufficiently put into practical use, and the above-mentioned problems involved in the prior-art reservation system terminal are basically left unsolved.

SUMMARY OF THE INVENTION

With these problems in mind, therefore, it is the primary object of the present invention to provide a novel object-oriented reservation system by which any procedure required to be executed can be simply selected and any additional necessary information can be simply inputted. The operator also has direct access to or operates a display image by use of a pointing device so as to markedly reduce the work load of the operator, thus basically solving the afore-mentioned problems involved in the prior-art entry-oriented reservation system.

Another object of the present invention is to provide a reservation system terminal that is provided with higher intelligence capability such as a multitask function for simultaneously processing a series of reservation procedure, an automatic information transfer function for automatically transferring necessary information between tasks, a multiwindow function for controlling a plurality of images under overlapping conditions, etc., thus making efficient use of the intelligence capability of the terminal.

To achieve the above-mentioned objects, the first aspect of the present invention provides a reservation system terminal associated with a host computer for processing a reservation status, which comprises:

(A) reserving means for forming a reservation image including a plurality of parts for inputting contents related to predetermined reservation items, inquiring through use of the host computer, a reservation status related to the inputted reservation item contents, selecting any one of a plurality of reservation objects, and requesting, through use of the host computer, a reservation acquisition related to the selected reservation object, respectively;

(B) displaying means for receiving the reservation images formed by said reserving means, and forming and displaying a display image including the formed reservation image;

(C) pointing device means for operating the parts arranged in the image displayed by said displaying means;

(D) part operation detecting means for detecting the part operated by said pointing device means; and (E) host-to-terminal communicating means for transmitting various messages to said host computer and receiving response data from said host computer, and wherein said reserving means selectively executes the following steps of, on the basis of a part pointing operation effected on the reservation image and detected by said part operation detecting means:

(a) displaying the inputted reservation item contents on the reservation image;

(b) forming a reservation status inquiry message for inquiring into a reservation status related to the inputted reservation item contents, transmitting the inquiry message to said host computer via said host-to-terminal communicating means, receiving selectable reservation object information transmitted by said host computer via said host-to-terminal communicating means as response data to the transmitted inquiry message, and displaying the selectable reservation object information list in the reservation image;

(c) displaying the selected reservation object in the reservation image; and (d) forming a reservation request message for requesting a reservation acquisition related to the selected reservation objects, transmitting the formed reservation request message to said host computer via said host-to-terminal communicating means, receiving acquired reservation content information transmitted by said host computer via said host-to-terminal communicating device as response data to the reservation acquisition request, and displaying the acquired reservation contents in the reservation image.

To achieve the above-mentioned object, the present invention provides a method of operating a terminal computer incorporated in a reservation system terminal that is associated with a host computer for processing reservation status and provided with a display unit. The display unit is coupled to the terminal computer to display images and the invention features a pointing device also coupled to the terminal computer to point to visible parts on the displayed image, comprising the steps of:

(A) forming a reservation image including a plurality of parts for inputting contents related to predetermined reservation items, inquiring of the host computer a reservation status related to the inputted reservation item contents, selecting any one of a plurality reservation objects, and requesting of the host computer a reservation acquisition related to the selected reservation object;

(B) forming a display image including the formed reservation image, and transmitting the formed display image to the display unit for display;

(C) detecting a part operated by the pointing device on the displayed image;

(D) if a part pointing operation for inputting the contents of the reservation item is detected, displaying the inputted reservation item contents on the reservation image;

(E) if a part pointing operation for inquiring into the reservation status is detected after the inputted reservation item contents have been displayed, forming a reservation status inquiry message for inquiring the reservation status related to the inputted reservation item contents;

(F) transmitting the formed reservation status inquiry message to the host computer;

(G) receiving reservation status information indicative of selectable reservation objects transmitted from the host computer in response to the inquiry message;

(H) forming a list indicative of the selectable reservation objects on the basis of the reservation status information, and displaying the formed list on the reservation image in relation to a part for selecting the reservation object;

(I) if a part pointing operation for selecting the reservation object is detected after the reservation object list has been displayed, displaying the reservation object selected by the part pointing operation on the reservation image;

(J) if a part pointing operation for requesting the reservation acquisition is detected after the selected reservation object has been displayed, forming a reservation request message for requesting a reservation acquisition related to the selected reservation object;

(K) transmitting the formed reservation request message to the host computer;

(L) receiving reservation acquisition information indicative of the contents of an acquired reservation transmitted from the host computer in response to the reservation request message; and (M) displaying the acquired reservation contents on the reservation image on the basis of the acquired reservation information.

BRIEF DESCRIPTION OF THE DRAWINGS

FIGS. 2A(I,II) and 2B(I,II) are functional block diagrams of the embodiment shown in FIG. 1;

FIG. 3 is an illustration showing a flight number reservation image;

FIG. 4 is an illustration showing a date designation image;

FIG. 7 is an illustration showing a reservation edit image;

FIG. 8 is an illustration showing a previous seat designation image;

FIG. 10 is an illustration showing a reservation record reference image;

FIG. 11 is an illustration showing a hotel reservation image;

FIG. 12 is an illustration showing a tour reservation image;

FIGS. 14A to 14E are illustrations showing menu images;

FIG. 15(A,B) is a flowchart for assistance in explaining the reservation edit process in the initial startup condition;

FIGS. 19A(I,II) and 19B(I,II) are flowcharts for assistance in explaining the place name/area designation process when a domestic city designation image is opened on the flight number reservation image;

FIGS. 20A(I,II) and 20B(I,II,III) are flowcharts for assistance in explaining the place name/area designation process when an international city designation image is opened on the flight number reservation image;

FIGS. 23A(I,II) and 23B(I,II) are flowcharts for assistance in explaining the seat chart process;

FIGS. 24A(I,II,III) and 24B(I,II,III) are flowcharts for assistance in explaining the reservation record reference process when a flight number reservation record is referred to;

FIGS. 25A(I,II,III), 25B(I,II,III) and 25C(I,II) are flowcharts for assistance in explaining the hotel reservation process;

FIGS. 26A(I,II), 26B(I,II) and 26C(I,II) are flowcharts for assistance in explaining the tour reservation process;

FIGS. 27A(I,II) and 27B(I,II) are flowcharts for assistance in explaining the place name/area designation process when the international city designation image is opened on a tour reservation image.

DETAILED DESCRIPTION OF THE PREFERRED EMBODIMENTS

Figure 1:
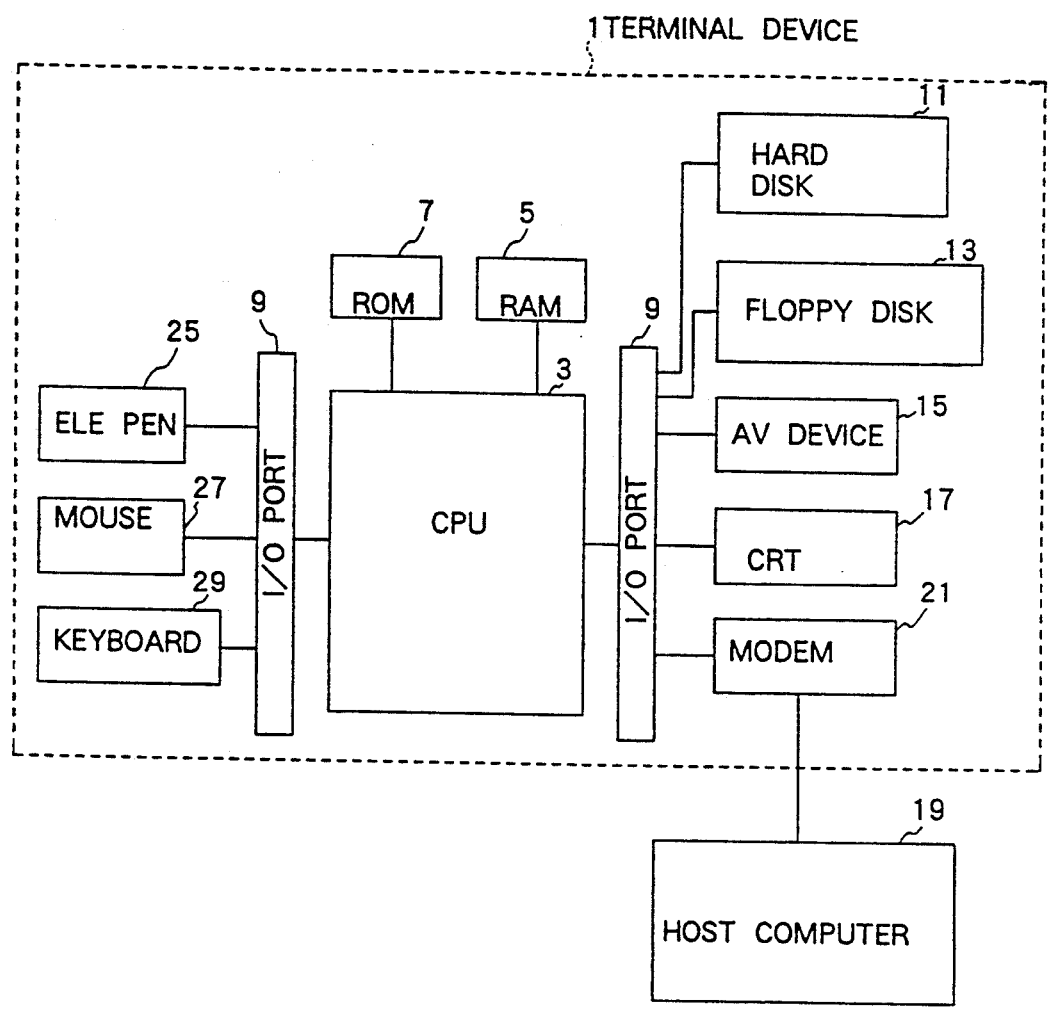
FIG. 1 is a block diagram showing a hardware configuration of an embodiment of the reservation system according to the present invention.

In the detailed description to follow, any reference to the figure numbers listed in the left hand column below are to be considered to also include a reference to the corresponding figure components listed in the right hand column and appearing in the drawing sheets appended hereto.

| | |
|---|---|
| 2A | 2AI and 2AII |
| 2B | 2BI and 2BII |
| 17A | 17AI and 17AII |
| 17B | 17BI and 17BII |
| 17C | 17CI and 17CII |
| 19A | 19AI and 19AII |
| 19B | 19BI and 19BII |
| 20A | 20AI and 20AII |
| 21A | 21AI and 21AII |
| 21B | 21BI, 21BII and 21BIII |
| 21C | 21CI, 21CII and 21CIII |
| 21D | 21DI and 21DII |
| 21F | 21FI, 21FII and 21FIII |
| 21G | 21GI and 21GII |
| 22A | 22AI and 22AII |
| 22B | 22BI and 22BII |
| 23A | 23AI and 23AII |
| 23B | 23BI and 23BII |
| 24A | 24AI, 24AII and 24AIII |
| 24B | 24BI, 24BII and 24BIII |
| 25A | 25AI, 25AII and 25AIII |
| 25B | 25BI, 25BII and 25BIII |
| 25C | 25CI and 25CII |
| 26A | 26AI and 26AII |
| 26B | 26BI and 26BII |
| 26C | 26CI and 26CII |
| 27A | 27AI and 27AII |
| 27B | 27BI and 27BII |
| 28 | 28I and 28II |

FIG. 1 is a block diagram showing a hardware configuration of a preferred embodiment of the reservation terminal according to the present invention. A terminal (device) 1 is a personal computer in practice, which is composed of a CPU 3, a RAM 5, a ROM 7 for loading a system program, and I/O ports 9 for connecting various peripheral units such as a hard disc until 11 for loading application programs, a floppy disk unit 13 for loading optional application programs, an AV (audio/-visual) unit 15 (e.g. an optical disk deck or video deck), a CRT 17 for displaying images, a MODEM 21 for communicating with a host computer 19 via communication lines, a pointing device such as an electronic pen 25, a mouse 27, etc., and a keyboard 29 for inputting various information not inputted through the pointing device.

Further, it is preferable that the operation system (OS) loaded in the terminal device 1 satisfies the following requirements:

(1) Multiwindow and multitask processing are both enabled in real time fashion time.
(2) Operability is excellent and the operating method is standardized.
(3) Information signals can be inputted mainly through pointing devices.
(4) Processing speed is high.
(5) Many languages may be processed.

(6) Data, software and hardware are compatible with those of many makers or manufacturers.

(7) Software is high in development efficiency.

Operation systems such as UNIX, OS/2 and BTRON seem to satisfy the above requirements. However, BTRON (Business-The Realtime Operating System Nucleus) can be considered as being optimum because the above requirements (1), (2), (5) and (6) can be more perfectly satisfied.

FIGS. 2(A) and (B) are functional block diagrams showing an integrated reservation system terminal for reserving flight numbers, hotels and tours by way of example, which is configured as shown in FIG. 1.

With reference to these diagrams, an operator can manipulate the terminal with pointing devices (PD) such as the electronic pen 25, the mouse 27, and the keyboard 29. The major operations can be executed by use of the PD 30; however, some operations such as proper noun (name, place where to make contact, etc.) information entry is executed through the keyboard 29, because such information is difficult to input through the PD 30. By use of the PD 30, the cursor position is movable on an image displayed on the CRT 17. A number of picture images can be displayed on the CRT 17, on each of which various parts (referred to as buttons, switch selectors, scroll selectors, etc.) and tag (or index) window images (representative of real window images) are arranged, as described later in further detail. Each function corresponding to each part is previously determined. When the operator moves the cursor to any given tag image or part by operating the pointing device 30 and further the PD 30 is clicked once in the case of parts and twice in the case of tag images, absolute coordinates of the current cursor position on the image are detected by a position detection block 31, and further the functions corresponding to each part or tag image on which the cursor is located are discriminated on the basis of the detected absolute, coordinates by a function discrimination block 33. Hereinafter, the operation wherein the cursor is located on a tag image and then the PD 30 is clicked twice is referred to as "a tag image is double clicked or double tag image clicks" and the operation wherein the cursor is located on a part and then the PD 30 is clicked once is referred to as "a part is (once) clicked or single part click".

In response to the discriminated result of the function discrimination block 33, an image control block 119 controls the display on the CRT 17. In more detail, the image control block 119 is provided with multiwindow processing function such that the arrangement of various image windows are controlled on the basis of the above-mentioned discriminated result in order to multidisplay a plurality of images given through various processing as described later. In practice, since a plurality of window images are arranged in overlapping condition, although the outermost image arranged in front of the overlapped images (referred to as in-front image or displays) can be seen all over the image, only a part offset from the in-front image can be seen in the case of other inner images arranged in back (referred to as in-back images or displays). Therefore, the operator can operate or have an access to tag images and parts displayed in a complete image or in a visible partial portion of in-back images by use of the PD 30. Here, the tag image has an index function in process. When double tag image clicks are discriminated, the image control block 119 arranges a process window corresponding to the discriminated tag image as an in-front image. (Further, if the corresponding process is not yet started, the process is simultaneously started.) When a visible part of the in-back image is clicked, the image control block 119 displays the clicked image as the in-front image.

An image display block 121 includes a bit map graphic mechanism for multidisplaying a plurality of images on the CRT 17 in accordance with the window arrangement order determined by the image control block 119.

Within the AV device 15, there are arranged optical disks or video tapes for recording color movies (motion pictures) to introduce hotels or tours. As described later, when a tag image of the movie display process is double clicked, the image control block 119 activates the AV device 15 to playback the designated hotel or tour movie and further transmit information for controlling the movie display to the image display block 121, so that the playbacked movie can be displayed in the outermost window as an in-front image.

In the terminal device provided with multiwindow and multitask processing functions, a plurality of independent processes can be executed in parallel fashion. These processes are flight number reservation process, date designation process 37, place name/area designation process, reservation edition process, previous seat designation process, seat chart display process, reservation record reference process, hotel reservation process, motion picture display process, tour reservation process, etc. Each of these processes is provided with a function for forming each specific image. These images are multiwindow processed by the image control block 119 and then multidisplayed on the CRT 17.

The function is provided such that information inputted by the operator or from the host computer can be transmitted to other process, where necessary. This function is shown in FIG. 2(A) as an inter-process communication block 123, and can be realized by storing information required for plural processes in a memory area used in common for these processes. The inter-process communication block 123 is functioning at all times as the background operation of each process.

In addition to the above-mentioned processes, there are provided host-to-terminal communication process 125, menu control process 32, color arrangement control process 34, etc.

The host-to-terminal communication process 125 transmits messages in the various processes to the host computer 19 and returns the related response data from the host computer 19 to the process. In other words, this process enables normal communications between the terminal 1 and the host computer 19. This host-to-terminal communication process 125 always exists as an independent process in the background of the various process, which is operated when the independent process transmits messages to the host computer 19.

The menu control process 32 is started when a menu button (not shown) provided for the PD 30 is depressed. This process 32 transmits a menu image as described later to the image control block 119 so that the image control block 119 displays the menu image as the in-front image. Since a number of function items are displayed on this menu image, any required function can be selected by the clicking operation.

The color arrangement control process 34 is started when "color arrange" is clicked on the menu image, to control the image control block 119 so that the colors of the in-front image, background and parts can be changed. When the color arrangement is appropriately selected, it is possible to divert or relax the operator himself or herself.

The above-mentioned process will be described hereinbelow in detail, respectively with reference to FIGS. 3 to 14.

The flight number reservation process is the one for performing the reservation procedure of flight numbers, and is provided with various functions shown by a flight number reservation image display block 35, a reservation status inquiry message transmit/receive block 41, a reservation status display block 43, a reservation message transmit/receive block 45, and a reservation result display block 47.

Figure 5:
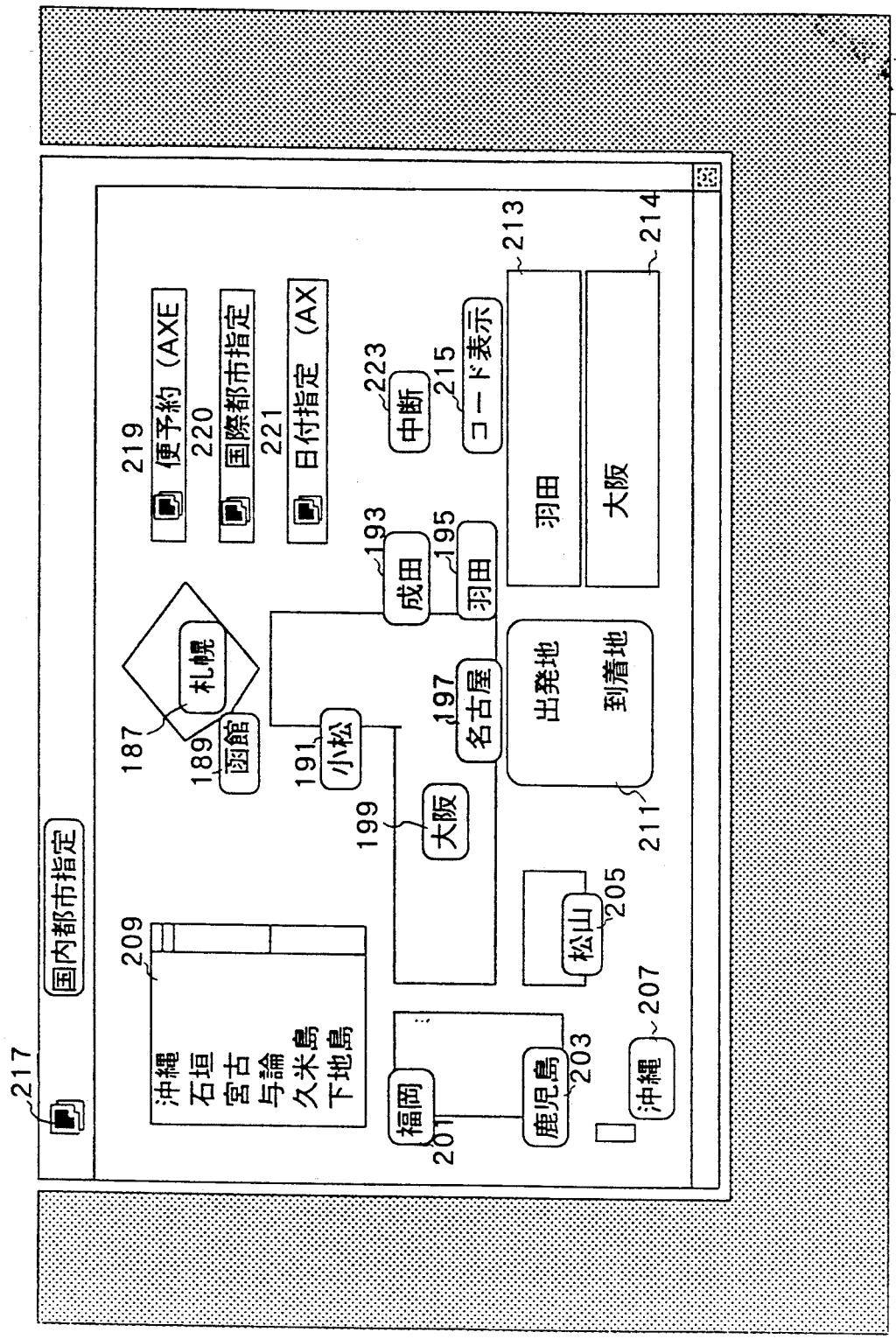
FIG. 5 is an illustration showing a domestic city designation image.
Figure 6:
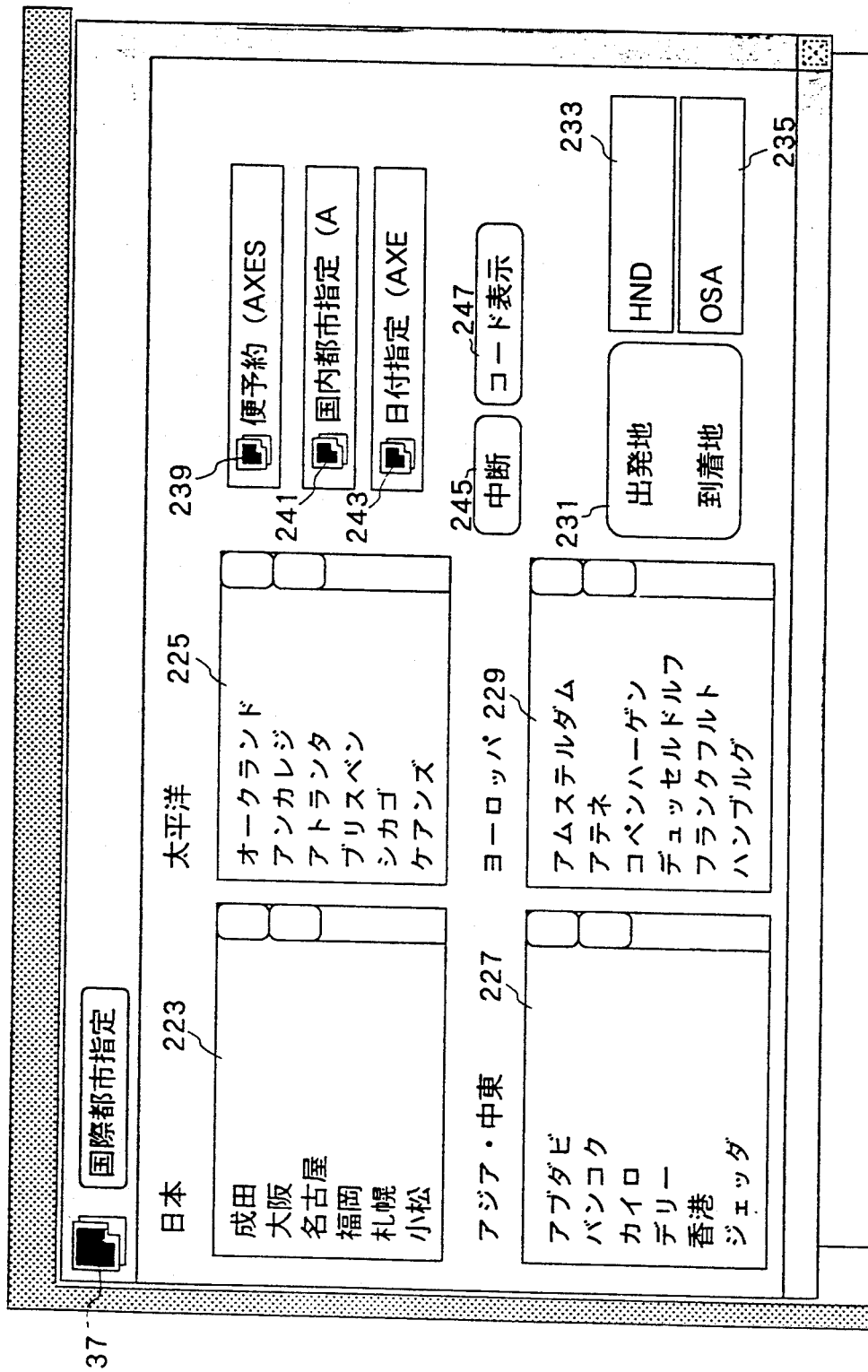
FIG. 6 is an illustration showing an international city designation image.

The flight number reservation image display block 35 forms a flight number reservation image as shown in FIG. 3 and sends the image to the image control block 119. At the header position of this flight number reservation image, a pictogram 131 (referred to as "flight number reservation pictogram") is arranged. When the double clicks of this flight number reservation pictogram 131 is discriminated, the flight number reservation process 35 is suspended, and the flight number reservation image window is deleted by the image control block 119. The flight number reservation image includes three tag images of a domestic city designation tag image 133, an international city designation tag image 135 and a date designation tag image 137. In general, a tag image has an index function for representing a process, as already explained. When a pictogram within a tag image is double clicked (referred to as "a tag image is double clicked"), the process corresponding to the tag image is started and the corresponding image is displayed in front. Therefore, when the date designation tag image 137 is double clicked, the date designation process 37 is started, so that a date designation image as shown in FIG. 4 is sent to the image control block 119 to display the date designation image in front. When the domestic city designation tag image 135 is double clicked, the place name/area designation process 39 is started and a domestic city designation image as shown in FIG. 5 or an international city designation image as shown in FIG. 6 is sent to the image control block 119 to display the domestic city designation image or the international city designation image in front.

In the date designation process 37, a data can be designated on the date designation image. In the place name/area designation process 39, a section between the departure and the arrival can be designated on the domestic or international city designation image. The date and section designated at these processes are automatically transmitted to the flight number image display block 35 via the inter-process communication block 123. On the flight number reservation image as shown in FIG. 3, there are arranged data boxes 139, 141 and 143 in which a date is displayed and section boxes 145 and 147 in which a flight section is displayed. Further, a box indicates generally a part in which an input date (letter or numeral) is displayed. In these date boxes 139, 141 and 143, the today's date is initially displayed in default of data. However, when a desired date is given via the inter-process communication block 123, the designated date is displayed in these boxes. Further, a designated flight section given via the inter-process communication block 123 is displayed in the departure and arrival boxes 145 and 147. Further, a succeeding day button 149 and a preceding day button 151 are additionally arranged. Here, the button generally indicates a part for requesting a predetermined operation at the process. When the succeeding day button 149 or the preceding day button 151 is clicked, a date displayed in the date boxes 139, 141 and 143 is changed to a succeeding or preceding day. Therefore, when a date close to today can be displayed by using the succeeding button 149 and the preceding button 151 without dependence upon the date designation image process 37. Further, a succeeding flight number button 153 is provided for the flight section. Therefore, when this button 153 is clicked, the two displays in the departure box 145 and the arrival box 147 are reversed, so that this operation is convenient when going and returning flight numbers are reserved in sequence.

After the date and section have been designated, when a transmit button 155 is clicked, the reservation status inquiry message transmit/receive block 41 forms a reservation status inquiry message of the designated date and section and sends it to the host-to-terminal communication process 125. This host-to-terminal communication process 125 transmits this message to the host computer 19. In response to this reservation status inquiry message, the host computer 19 returns the reservation status data indicative of vacant seat flight numbers to the host-to-terminal communication process 125, and then to the reservation status inquiry message transmit/receive block 41. After having determined the received data to be correct data, the reservation status inquiry message transmit/receive block 41 gives the received data to a reservation status display block 43.

After having transformed the reservation status data into an understandable language (e.g. Japanese language), the reservation status display block 43 gives the transformed data language to a reservation image block 35. Thereupon, a list of vacant seat flight numbers is displayed in Japanese language in a reservation status scroll selector 171 in the flight number reservation image. The reservation status data sent from the host computer 19 at a time usually correspond to those written on a single page of the reservation status scroll selector 171. Therefore, there exists the case where it is impossible to transmit all the data indicative of all the vacant seat flight numbers at a time. In this case, a succeeding page button 159 in the flight number reservation image is clicked. Then, the remaining data transmit request is given to the host computer 19 in the same route as described above, so that reservation status data on the succeeding page can be transmitted from the host computer 19. In general, the scroll selector displays a list of letter data. This list can be scrolled by moving the PD 30 along bars displayed on the right side of the image. Further, when one data in the list is clicked, the clicked data can be inputted. Therefore, whenever the reservation status scroll selector 171 is scrolled, the list not seen on the succeeding page becomes visible. Further, when one of the vacant seat flight numbers on the list is clicked, the clicked flight number is designated as a reserved object.

In this connection, where a flight number required to be reserved is determined at the beginning, it is unnecessary to inquire the reservation status. In this case, if the flight number designation button 161 is clicked, the flight number is displayed in box 163. When a flight number code is inputted through the keyboard 29, the flight number is displayed in the flight number box 163, so that the flight number designation can be completed.

In the flight number reservation image, there are arranged a class switch selector 153 for selecting a boarding class and a seat number switch selector 154 for selecting the number of seats. In general, in the switch selector, a plurality of switches are arranged so as to correspond to a plurality of data to be selected. Therefore, a switch is clicked, a data corresponding to the clicked switch can be designated. "Y" is initially designated in the class switch selector 153 in default, and "1" is initially designated in the seat number switch selector 154 in default. However, when another switch is clicked, another class or another number of seats can be designated. After being designated, the switch of the designated class or the number of seats is displayed in a different color than that for the non-designated switches. Further, when "other" is designated in the class switch selector 153, a class input box 162 appears. Here, when any given class code is inputted through the keyboard 29, the inputted class code is displayed in the class input box 162, so that any given class can be designated.

Further, in the flight number reservation image, there are provided an ARNK button 165 and an OPEN button 167 for designating specific reservation modes. When the ARNK button 165 is clicked, ARNK reservation can be designated. When the OPEN button 167 is clicked, a company code input box 169 appears. In this case, when any given airline (i.e. aviation company) code is inputted through the keyboard 29, the inputted airline code is displayed in the company code input box 169, so that open reservations for the displayed airline can be designated.

As described above, after details of the date, section, class, the number of seats, etc. have been designated, when the transmit button 155 is clicked, a message panel (not shown) for confirming whether the flight number reservation is desired or not on the flight number reservation image is displayed in front. Therefore, when the confirmation button in this panel is clicked, the reservation message transmit/receive block 45 forms a message for reserving the designated details and sends the formed message to the host-to-terminal communication process 125 to transmit the formed message to the host computer 19. When data indicative of reservation acquisition is returned from the host computer 19, this data is sent to the reservation message transmit/receive block 45 via the host-to-terminal communication process 125. After checking to ensure that the received data is not erroneous data, the reservation message transmit/receive block 45 transmits the data to the reservation result display block 47.

The reservation result display block 47 transmits the analyzed result of the received data, that is, the acquired reservation contents to a reservation edition image display block 51 via the inter-process communication block 123, and simultaneously displays a reservation acquisition and a succeeding operation instruction in Japanese, for instance a in the message box 172 on the flight number reservation image.

Further, an interrupt button 157 is provided on the flight number reservation image. When this interrupt button 157 is clicked, all the processing so far executed are all disregarded; all the data display is deleted on the image; and an interrupt message is transmitted to the host computer 19 via the host-to-terminal communication process 125. In response to the interrupt message, the host computer 19 deletes the reservation acquired by the processing already executed up to now.

The date designation process 37 will be described in detail hereinbelow. This process 37 forms the date designation image as shown in FIG. 4 and sends it to the image control block 119. The window size of this date designation image is a little smaller than that of the flight number reservation image shown in FIG. 3.

In the date designation image, there is provided a calendar switch selector 173 representative of the current month and a calendar switch selector 175 representative of the next month. When either one of the calendar switch selectors 173 and 175 (or data package options) is clicked, the date data (or data package) corresponding to the clicked switch is sent to the flight number reservation image display block 35 via the inter-process communication block 123, and displayed in the date boxes on the flight number reservation image in the same way as described already.

In the date designation image, there are arranged a date designation pictogram 177 for deleting the date designation image (the date designation process 37 is interrupted), a flight number reservation tag image 179 for displaying the flight number reservation image in front, a domestic city designation tag image 181 for displaying the domestic city designation image in front, an international city designation tag image 183 for displaying the international city designation image in front, and an interrupt button 185 for interrupting all the above-mentioned designations.

The place name/area designation process 39 will be described hereinbelow in detail.

This process 39 forms the domestic city designation image as shown in FIG. 5 and the international city designation image as shown in FIG. 6, and sends these images to the image control block 19. The window size of each of these domestic and international city designation images is also a little smaller than that of the flight number reservation image as shown in FIG. 3.

In the domestic city designation image as shown in FIG. 5, there are provided main airport buttons 187 to 207 (or data package options) arranged on a domestic map, an airport scroll selector 209 representative of all the domestic airport lists, a departure/arrival switch selector 211 for selecting a departure airport or an arrival airport, and departure and arrival boxes 213 and 214 for displaying departure and arrival airport, respectively. After a departure or arrival airport has been selected by the switch selector 211, when any one of the main airport buttons 187 to 207 or any one of the airport names in the scroll selector 209 is clicked, the airport name is displayed in the departure box 213 or the arrival box 214. Simultaneously, the selected airport data (or data package) is sent to the flight number reservation image display block 35 via the inter-process communication block 123 to display the airport data in the departure box 145 or the arrival box 147 in the flight number reservation image. Further, when a code display button 215 is clicked, an airport name displayed in each box is changed into a code display composed of three alphabetic letters.

Further, in the domestic city designation image, there are provided a domestic city designation pictogram 217 for deleting the domestic city designation image, a flight number reservation tag image 219 for displaying the flight number reservation image in front, an international city designation tag image 220 for displaying the international city designation image in front, a date designation tag image 221 for displaying the date designation image in front, and an interrupt button 223 for transmitting an interrupt message.

In the international city designation image as shown in FIG. 6, there are provided scroll selectors 223 to 229 (or data package options) which display the essential city/international airport lists classified according to areal groups in the world, a switch selector 231 for selecting one of departure and arrival, and boxes 233 and 235 for displaying a departure place name and an arrival place name, respectively. The scroll selectors 223 to 229 are used to designate flight sections in the reservation of international flight numbers or in the designation of cities for tour reservations. Further, when one of the scroll selectors 223 to 229 is scrolled, another area list including Hawaii, North America, South America, etc. (not shown) can be displayed. This area list is used to designate areas instead of cities when tours are reserved.

Additionally, in the international city designation image, there are provided an international city designation pictogram 237, a flight number reservation tag image 239, a domestic city designation tag image 241, a date designation tag image 243, an interrupt button 245 and a code display button 247. The detailed description of the functions of these parts is omitted herein, because of substantially the same as the similar parts provided in other images.

Further, as described later, the date designation image, the domestic city designation image and the international city designation image can be used when hotels or tours are reserved or when the reservation record is required, in addition to the flight number reservation. In these cases, data representative of dates, sections, cities, etc. are given to a reservation record reference image display block 71, a hotel reservation image display block 87, a tour reservation image display block 103, etc. via the inter-process communication block 123 to display these data in predetermined boxes, respectively.

The reservation edition process will be described hereinbelow. In this process, information about passengers who acquired reservations such as names, places where to make contact, etc. are inputted to write out change, add, and delete these reservation records. This reservation edition process includes various functions represented by a reservation edition image display block 51, a reservation item input/output block 53, a reservation record preparation message transmit/receive block 55, and a reservation record display block 57. Further, at the initial conditions after the terminal has been started, only the reservation edition process is automatically started, and the other processes can be started when each tag image is clicked on the reservation edition image as explained below.

The reservation edition image display block 51 forms a reservation edition image as shown in FIG. 7 and sends it to the image control block 119. This reservation edition image includes a flight number reservation tag image 251, a hotel reservation tag image 253, a tour reservation tag image 255, a reservation reference tag image 257, a previous seat reservation tag image 259, and a movie tag image 261. When either one of these tag images is double clicked, the process corresponding to the double clicked tag image is started (at the initial condition when the terminal is activated), and the image corresponding to the process is displayed in front. Since this reservation edition image window is determined to be the largest size among other images, even if any other image is displayed in front, a part of the reservation edition image (at least the header position at which a reservation edition pictogram 246 is indicated) is always visible. Therefore, whenever clicked, it is possible to display the reservation edition image in front.

The reservation contents acquired at each reservation process are transmitted to the reservation edition image display block 51 via the inter-process communication block 123. These reservation contents are listed on and displayed by a reservation content scroll selector 295 in the reservation edition image.

In the reservation edition image, there are provided a scroll selector 271 as a part for inputting reservation items, a name input box 273, an age input 275, a sex distinction switch selector 277, an infant button 279, a contact place (where to make contact), ranking switch selector 281, two contact place input boxes 283 and 285, two contact place sort switch selectors 287 and 289, a passenger (or applicant) name input box 291, and a personal relationship switch selector 293. These parts are controlled by the reservation item input/output block 53 according to the operation of the keyboard 29 or the PD 30. In more detail, when the name input box 273 is clicked, this box is displayed by a thick black frame. Subsequently, if a passenger name is inputted through the keyboard 29, the name is displayed in the name input box 273. Thereafter, age input box 275 is displayed by a thick black frame. Subsequently, if an age is inputted through the keyboard 29, the age is displayed in the age input box 275. When the sex distinction switch selector 277 and the infant button 279 are clicked, respectively, the sex distinction of the passenger and the infant passenger are designated. All the passenger information designated as described above is listed and displayed by the passenger scroll selector 271. Further, when one of the contact place boxes 283 and 285 is clicked, the clicked box is displayed by a thick black frame. Subsequently, if a telephone number is inputted through the keyboard 29, the input telephone number is displayed in the contact place input box displayed by a thick black frame. Since two place input boxes 283 and 285 are arranged, two contact places can be designated. When the contact place switch selectors 287 and 289 are clicked, two sorts of contact places can be designated. The contact place switch selector 281 is used to change the place where to make contact. When clicked, the place boxes required to be changed is selected. After the passenger (or applicant) input box 291 has been clicked, if a passenger (or applicant) name is inputted through the keyboard 29, the name is displayed in the box 291. When the personal relationship select switch 293 is clicked, the personal relationship between the applicant and the passenger can be designated.

After all the reservation items have been designated as described above, when a transmit button 297 is clicked, a confirmation panel (not shown) is displayed in the reservation edition image in the same way as in the flight number reservation. When a confirmation button arranged therewithin is clicked, the reservation record preparation message transmit/receive block 55 prepares a reservation record with respect to the designated reservation items, and the message for modification or addition where necessary and sends the prepared record to the host computer 19 via the host-to-terminal communication process 125. When data indicative of reservation record preparation completion is returned from the host computer 19, the data is inputted to the reservation record preparation message transmit/receive block 55 via the host-to-terminal communication process 125. The reservation record preparation message transmit/receive block 55 transmit the data (if not erroneous) to the reservation result display block 47. The reservation result display block 47 analyzes the input data, and displays a message indicative of the reservation record preparation on the reservation edition image. Thereafter, when a completion button 299 is further clicked, a completion message indicative of the reservation record preparation completion is sent to the host computer 19 via the same route as described above. Since data indicative of a reservation record number are returned from the host computer 19, this reservation record number is displayed in a reservation record number box 263 on the reservation edition image. Further, when a transmit button is not clicked but only a completion button 299 is clicked, the communications between the host computer 19 and the terminal are executed collectively. Further, when a previous seat designation process as described later is started, the above-mentioned reservation contents and reservation record number are transmitted from the reservation result display block 47 to a previous seat designation image display block 59 (described later) via the inter-process communication block 123.

In the reservation edition image, there are additionally provided a reservation edition pictogram 246 for deleting the reservation edition image, preparation date boxes 265 and 267 for displaying the reservation record preparation date, an available period box 269 for displaying the available period of the reserved record, an interrupt button 301 for transmitting an interrupt message, a confirmation button 302 for transmitting a reference message to confirm the reservation contents, etc.

Further, it is also possible to change, delete and add the reservation record by use of the reservation edition image, in addition to the reservation record preparation. In these cases, however, it is necessary to select a function item of change, delete, or add, respectively on the menu image.

The previous seat designation process will be described hereinbelow. In this process, a seat of the reserved flight number can be designated. The process includes the functions shown by a previous seat designation image display block 59, a designation item input/output block 61, and a seat status transmit/receive block 63.

The previous seat designation image display block 59 forms a previous seat designation image as shown in FIG. 8 and sends it to the image control block 119. This image includes a passenger scroll selector 311 and a reserved flight number scroll selector 313. The passenger scroll selector 311 displays a list of the passenger names transmitted from the reservation edition process, and the reserved flight number scroll selector 313 displays a list of the reserved flight numbers transmitted from the same reservation edition process.

Prior to the seat designation, an inquiry as to the seat designation status is first made. In this case, generally one passenger and one reserved flight number are selected by click operation from the passenger scroll selector 311 and the reserved flight number scroll selector 313, and then the seat chart button 307 is clicked. Therefore, since the seat chart display process is started and data indicative of the selected passenger and the reserved flight number are transmitted to the seat chart display process, the seat status transmit/receive block 63 prepares an inquiry message of the seat designation status about the selected and reserved flight number and sends it to the host computer 19 via the host-to-terminal communication process 125. When data indicative of the seat designation status are returned from the host computer 19, the data are transmitted to the seat status transmit/receive block 63 via the host-to-terminal communication process 125. The seat status transmit/receive block 63 transmits the received data (if not erroneous) to the previous seat designation image display block 59. The previous seat designation image display block 59 further transmit the received seat designation status data to the seat chart display process.

Figure 9:
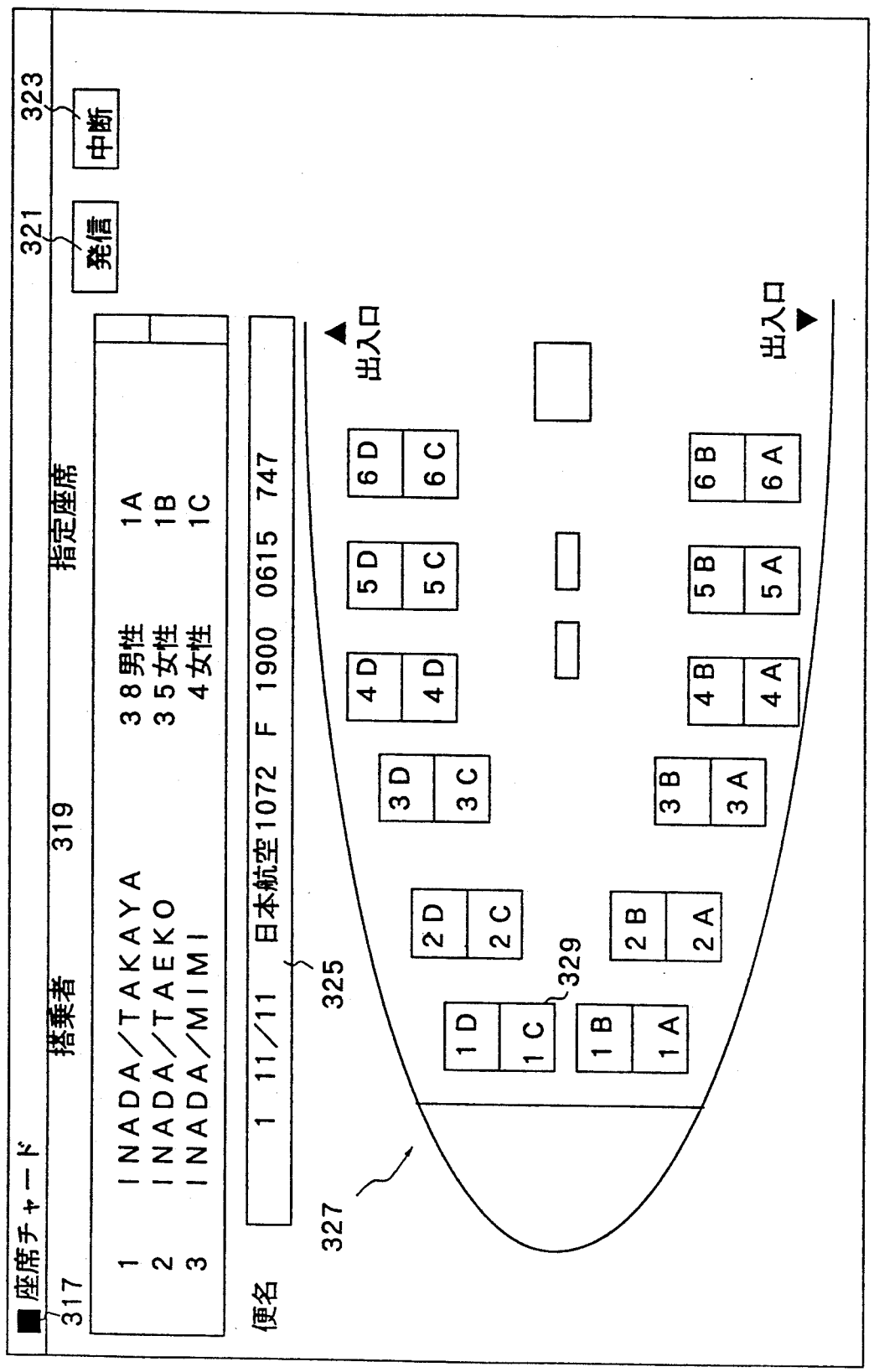
FIG. 9 is an illustration showing a seat chart image.

As described later, when the seat chart display process is started, a seat chart image as shown in FIG. 9 is displayed in front to allow the operator to designate a seat on this image. Data indicative of the designated seat are sent to the seat designation image display block 59 via the inter-process communication block 123. The seat designation image display block 59 displays the flight number whose seats are designated, the passenger names, and the designated seat numbers on the previous seat scroll selector 315.

In the seat designation image, there are additionally provided a seat designation pictogram 305 for deleting the seat designation image, and an interrupt button 309 for transmitting an interrupt message.

The seat chart display process will be described hereinbelow. The process is provided with functions shown by a seat chart image display block 65, a seat designation message transmit/receive block 67 and a seat designation result display block 69.

The seat chart image display block 65 forms a seat chart image as shown in FIG. 9 and sends it to the image control block 119. In this image, there are provided a passenger/designated seat scroll selector 319 for displaying a list of passengers and the designated seats and a flight number box 325 for displaying the flight number. The above-mentioned selected names and flight number transmitted from previous seat designation process are displayed on the seat designation scroll selector 319 and the flight number box 325, respectively. Simultaneously, a seat chart 327 of the airplane model used for the reserved flight number is also displayed.

In the seat chart 327, seat buttons 329 indicative of seats, respectively are arranged. In these seat buttons, the occupied seats are displayed in color different from that of the unoccupied seat on the basis of the seat designation status data transmitted from the previous seat designation process. Further, various information useful or required for seat selection decision (e.g. smoking seats, non-smoking seats, doorway positions) is displayed in different colors and letters so as to be distinguishable.

To designate a seat, a seat button 329 within the seat chart 327 is clicked and then a transmit button 321 is clicked. Then, since a confirmation panel is displayed in front in the same way as in the flight number reservation, when the confirmation button is clicked, the seat designation message transmit/receive block 67 prepares a message indicative of the seat designation for the clicked seat button (329) number, and sends it to the host computer 19 via the host-to-terminal communication process 125. When data indicative of the seat designation completion are returned from the host computer 19, the data are transmitted to the seat designation message transmit/receive block 67 via the host-to-terminal communication process 125. The seat designation message transmit/receive block 67 gives the received data (if not erroneous) to the seat designation result display block 69. The seat designation result display block 69 analyzes the received data; displays the designated seat number in the passenger/designated seat scroll selector 319 on the seat chart image 327; changes the color of the designated seat button 329 in the seat chart 327; displays a message indicative of seat designation completion in Japanese; and transmit the received data to the previous seat designation image display block 59 via the interprocess communication block 123.

In the seat chart image, there are additionally provided a seat chart pictogram 317 for deleting this image and interrupt button 323 for transmitting an interrupt message.

The reservation record reference process will be described hereinbelow. This process is the one for referring to the previously prepared reservation record, and provided with various functions shown by a reservation record reference image display block 71, a reservation item input/output block 73, a reservation record list display block 81, a reservation reference message transmit/receive block 83, and a reservation record display block 85.

The reservation record reference image display block 71 forms a reservation record reference image as shown in FIG. 10 and sends it to the image control block 119. In this image, there are provided a reference method select switch 333, a reservation record number designation box 334, a name designation box 335, a flight number designation box 337 and two designation boxes 339 and 341 as parts for designating the reservation record contents required for reference. These parts are controlled by the reservation item input/output block 73 according to the operation through the PD 30 and the keyboard 29. In more detail, when the reference method select switch 333 is clicked, the method is selected as to whether the reservation record is referred to on the basis of reservation record number or another item. When a reservation record number is selected, the reservation record designation box 334 is displayed by a thick frame. Subsequently, when a reservation record number is inputted through the keyboard 29, the input number is displayed in the reservation record designation box 334. Further, when a date, a flight number or a name is selected and further when a name designation box 335 or a flight number designation box 337 is clicked, the clicked box is displayed by a thick frame. Subsequently, when a passenger name or a flight number is inputted through the keyboard 29, the inputted item is displayed in the corresponding box shown by a thick frame. In the case of the date designation boxes 339 and 341, when the date designation tag image 351 is doubled clicked, the date designation image as shown in FIG. 4 is displayed in front. Therefore, if the date is designated on this image, the designated date data are transmitted via the inter-process communication block 123 and then displayed in the date designation boxes 339 and 341. Further, it is unnecessary to designate all the three items of passenger name, flight number and date, because the reserved record can be referred to by only a passenger name or both a passenger name and a date.

After the reservation items have been designated as described above, when the transmit button 343 is clicked, the reservation record reference message transmit/receive block 83 forms a message indicative of a reservation record reference as to the designated reservation item, and sends it to the host computer 19 via the host-to-terminal communication process 125. The response data from the host computer 19 are transmitted to the reservation record reference message transmit/record block 83 via the host-to-terminal communication process 125. When a plurality of reservation record numbers are included in the response data, the reservation record reference message transmit/record block 83 transmit the response data to the reservation record list display block 81. The reservation record list display block 81 displays a plurality of passenger names (or both passenger names and dates) in the reservation record in the reservation record candidate scroll selector 349 as a list on the reservation record reference image.

When a passenger name of one reservation record is clicked in a list of the reservation record candidate scroll selector 349 and further the transmit button 343 is clicked, the reservation record reference message transmit/receive block 83 forms a reservation record reference message of the clicked reservation record number and sends it to the host computer 19.

When the reference is made on the basis of a reservation record number at the beginning; when one reservation record is designated from the list and then the reference is made again; or when there exists only one reservation record corresponding to the designated name or flight number, only a single reservation record data is included in the response data from the host computer 19. In this case, therefore, the reservation record reference message transmit/receive block 83 transmits the received response data to the reservation record display block 85. The reservation record display block 85 transmits the data to the reservation edit image display block 51 via the inter-process communication block 123, and simultaneously controls the image control block 119 to display the reservation edit image in front. As a result, the reservation record contents are displayed on the reservation edit image. The reservation record can be changed, cancelled or added on this reservation edit image.

In the reservation record reference image, there are provided a reservation record reference pictogram 311 for deleting this image, an interrupt button 345, a succeeding page button 353 and a redisplay button 347 for transmitting a message of displaying above list again.

The hotel reservation process will be described hereinbelow. This process is the one for reserving hotels and includes various functions shown by a hotel reservation image display block 87, a hotel reservation status inquiry message transmit/receive block 93, a reservation status display block 95, a reservation message transmit/receive block 99 and a hotel reservation result display block 101. These functions are basically the same as the similar functions of the flight number reservation process, except that there are some different points due to difference in reserved object between hotel and flight number. Therefore, only the different points are explained hereinbelow.

The hotel reservation image display block 87 forms a hotel reservation image as shown in FIG. 11. In this image, the following peculiar parts for hotel reservation are provided. A city input box 357 displays a city name where hotels exists. This hotel designation can be performed by displaying the afore-mentioned domestic or international city designation image in front. An IN/OUT switch selector 371 is a parts for selecting any one of check-in date designation and check-out date designation. A designated check-in or check-out date is displayed in date boxes 373, 375, 377 and 379. These designations can be made on the afore-mentioned date designation image displayed in front. Room code/number select switches 381 and 391 are used to designate any one of room types and the number of rooms. The left side select switch 381 is used to designate single bed rooms, and the right side select switch 391 is used to designate double bed rooms. Room code select switches 383 and 393 are used to select a room type (charge). When "other" is selected with respect to the room type, since room type boxes 384 and 394 appear, the operator can input any given room type code through the keyboard 29. Room number boxes 385 and 395 are used to display the number of rooms designated through the keyboard 29. In these boxes, "1" is initially set in default of the number of rooms. Increment/decrement buttons 387, 389, 397 and 399 are used to increase or decrease the number of designated rooms. Location switch selector 401 is used to select an environment at which hotels exist. Sort select switch 403 is used to select a sort of hotel, and grade select switch 405 is used to select a grade of hotel. Other requirements for hotel can be inputted through the keyboard 29 and displayed in an additional information input box 407.

Among the above-mentioned items, when a city name and a date are designated at the minimum and further the transmit button 359 is clicked, the hotel reservation status inquiry message transmit/receive block 93 inquires the hotel reservation status of the designated items to the host computer 19. The reservation status data are returned from the host computer 19 to the reservation status display block 95, so that the hotel names, grades, room types (room charge), etc. are displayed as a list in a hotel list scroll selector 409.

When a required hotel is selected within the hotel list scroll selector 409 and further the transmit button 359 is clicked, a confirmation panel is displayed. By clicking a confirmation button therewithin, the reservation message transmit/receive block 99 transmits the reservation message to the host computer 19. The response data are sent from the host computer 19 to the hotel reservation result display block 10 to display a message of reservation acquisition in a message box 411. Simultaneously, since the response data are sent to a reservation edit image display block 51, the reserved hotel contents are displayed in the reservation content scroll selector 295 located at the lower part of the reservation edit image. To allow this display to be visible, the vertical dimension of the hotel reservation image is smaller (by that of the reservation content scroll selector 295) than the reservation edit image. Further, the vertical dimension of the tour reservation image (described hereinbelow) is also made smaller in the same way.

The tour reservation process will be described hereinbelow. This process is basically the same as the flight number reservation process and similar to the above-mentioned hotel reservation process. Only the different points are explained hereinbelow.

A tour reservation image display block 103 forms a tour reservation image as shown in FIG. 12. In this image, the following peculiar parts are provided. A departure/period/price switch selector 415 is used to select any one of the days departure, the period of tour, and the price of tour. Date boxes 417 and 419 display a designated day of departure. This departure day can be designated on the date designation image. A period box 421 displays a designated period of tour and a price box 427 displays a designated price of tour. These designations can be made through the keyboard 29. Increment/decrement buttons 423 and 425 increase or decrease the period of tour. Increment/decrement buttons 429 and 431 increase or decrease the price of the tour. City select switches 433 and 451 are used to select any one of -a plurality of departure cities and up to a maximum of four visit cities. A departure city box 433 displays a designated departure city. Four visit city boxes 437, 439, 453 and 455 display the designated visit cities. These designations can be made in the international city designation image. A room type switch selector 457 is used to select a room type. When "other" is selected, since a room type box 459 appears, a desired room type code can be entered through the keyboard 29. A person number box 461 displays a number of designated tourists inputted through the keyboard 29. The number of tourists is initially set at "1" in default. Increment/decrement switches 463 and 465 increase or decrease the number of tourists. A flight pattern switch selector 467 is used to select any one of three flight patterns. When "other" is selected, since a flight pattern box 469 appears, a desired flight pattern can be set through the keyboard 29. An additional information box 471 is used to input additional information such as special requirements through the keyboard 29.

Among the above-mentioned items, when the day of departure and the visit cities are designated at the minimum, it is possible to inquire into the reservation status by clicking the transmit button 441. The reservation status that is returned from the host computer 19 is displayed in a tour list scroll selector 473. In this list, tour codes, tour names, hotels, rooms, meals, flight patterns, prices, etc. are displayed.

When a desired tour is selected from the tour list and then the transmit button 441 is clicked, a reservation message is transmitted to the host computer 19. When response data are returned from the host computer 19, a message of reservation acquisition is displayed in a message box 475, and the response data are transmitted to the reservation edit image display block 51.

Figure 13:
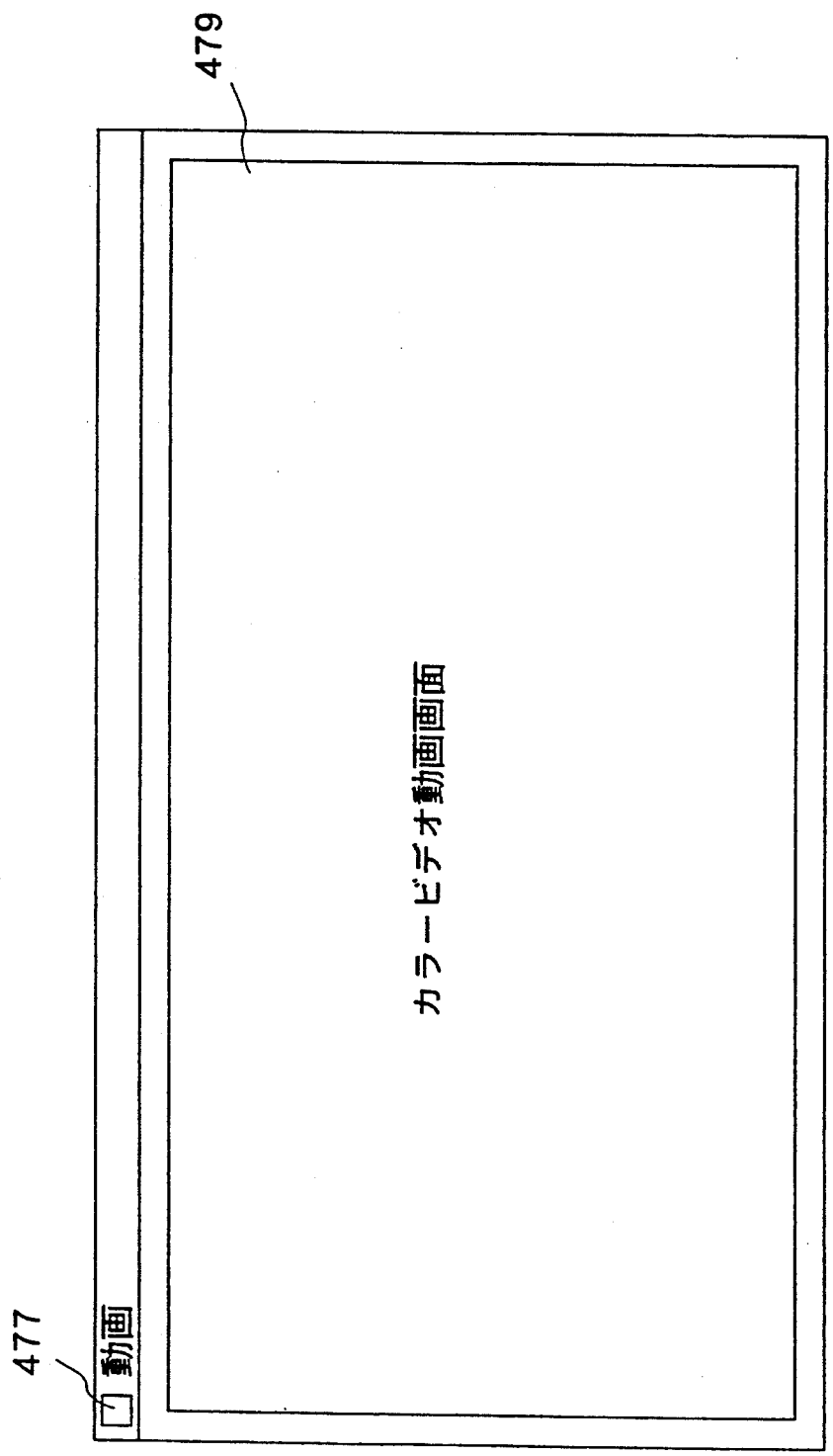
FIG. 13 is an illustration showing a motion picture display image.
Figure 16:
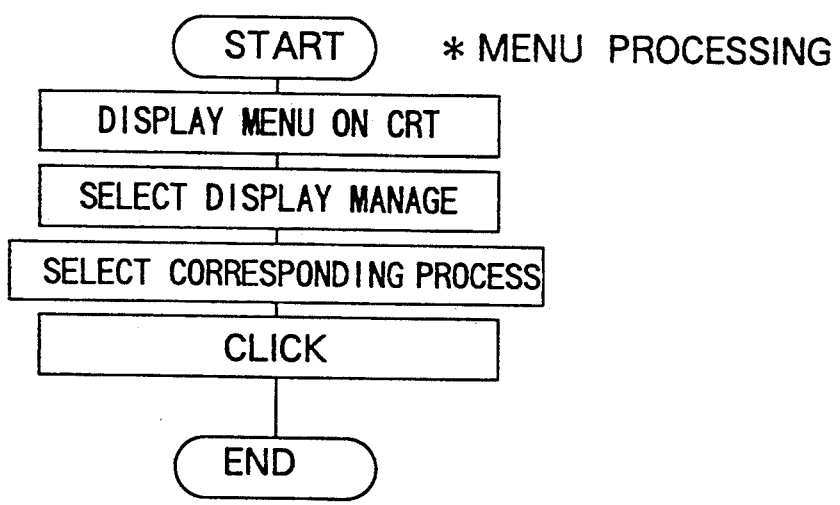
FIG. 16 is a flowchart for assistance in explaining the menu control process when "Display management" is clicked on the menu image.

Motion picture display process 97 will be explained hereinbelow. After a desired hotel or tour has been selected from the hotel or tour list in the hotel or tour reservation image, when a visible part of the reservation edit image is clicked, the reservation edit image is displayed in front. Subsequently, when a motion picture (movie) tag image 261 in the reservation edit image is clicked, the motion picture process 97 is started. To this motion picture process 97, a hotel or tour code selected just now is transmitted via the inter-process communication block 123. The motion picture process 97 sends the selected code and a motion picture display image as shown in FIG. 13 to the image control block 119. This image control block 119 controls the AV device 15 to playback the hotel or tour motion picture corresponding to the selected code, so that the motion picture display image is arranged in front and further the corresponding motion picture is displayed in a motion picture area 479 within the motion picture display image. In this case, where some display modes such as image division, mosaic processing, picture standstill, etc. have previously been selected in a menu image (described later), the image control block 119 controls the motion picture so as to be displayed in the selected display mode. The motion picture display image can be deleted when a motion picture pictogram 477 is double clicked.

Finally, the menu control process 32 will be explained hereinbelow. This process is started when the menu button of the PD 30 is depressed. The process menu images as shown in FIG. 14A and transmits these to the image control block 119 so that the menu image is displayed in front according to the cursor position. In this image, there are displayed a plurality of items (called parent items) such as "Reservation", "Change", "Execution", "Supplementary devices", "Color arrangement", "Display management" etc. When either one of these parent items is clicked, some items (called child items) are displayed on the side of the parent item as shown in FIGS. 14B-14D. Some major parent items will be explained hereinbelow in more detail.

FIG. 14B shows an example of display obtained when the parent item "Reservation" has been clicked. The child items are arranged in the order of "Next flight number", "Transmit", "Interrupt", and "Completion". When each of the child items is clicked, each corresponding operation can be executed in almost the same way as when the next flight number button, transmit button, interrupt button, and completion button displayed in the process image displayed just behind this menu image are clicked, respectively.

FIG. 14C shows an example of display obtained when the parent item "Change" is clicked. In this case, "Delete" and "Insert" are displayed as child items. For instance, in the case where this menu image is on the reservation edit image, if a reservation item required to be deleted is clicked in the reservation image and thereafter the child item "Delete" is clicked, it is possible to delete the reservation item. Further, when the passenger scroll selector 271 or the reservation content scroll selector 295 is clicked in the reservation content scroll selector 295 is clicked in the reservation edit image and thereafter the child item "Insert" is clicked, it is possible to add the passengers or reservation by use of the reservation edit image.

FIG. 14D shows an example obtained when the parent item "Color arrangement" is clicked. In this case, the color arrangement control process 34 is started to form a panel as shown in FIG. 14D. The formed panel is displayed on the lower right side of the CRT image, for instance. In this panel, there are provided 16 background color samples in boxes 481 and 483 and 16 color depth (shade) samples in boxes 487. When any desired color sample and color depth sample are clicked, a selected background color is displayed in an area 485. Here, if a confirmation button 491 is clicked, the color of the background image is changed into the selected background color for practical color confirmation. Subsequently, when a completion button 493 is clicked, the color of the background image is fixed to the selected background color. However, when a delete button 489 is clicked, this panel is deleted.

FIG. 14E shows an example of child items obtained when "Display management" is clicked. The process names whose window is currently open are arranged in order as child items. When either one of these process names is clicked, the image control block 119 displays the clicked process image in front. This function is convenient for displaying any required small image in front as when the small image is not visible behind a large image and further there exists no tag image representative of the required small image in the large image.

FIGS. 15 to 27 show flowcharts showing a series of reservation procedure processed in each of the above-mentioned processes, which are provided for assistance in clearly understanding the function and the operation of an embodiment of the reservation system terminal according to the present invention.

When the terminal is turned on, the reservation edition process is first started automatically. This reservation edition process will be described with reference to FIG. 15.

When data are inputted through the inter-process communications, the inputted data are displayed on the reservation edition image. When the reservation edition image is not displayed in front, the reservation edition can be selected in the menu processing (see FIG. 16). Or else, when a visible part of the reservation edition image is clicked, the reservation edition image can be displayed in front. During the in-front display of the reservation edition image, when each tag image displayed on the edition image, when each tag image displayed on the reservation edition image (e.g. flight number reservation, reservation record reference, previous seat, hotel, tour, motion picture, etc.) is double clicked, a process corresponding to the clicked tag image is started, and its started process image is displayed in front. Under these conditions, the operator has access to the process displayed in front.

Figure 17B:
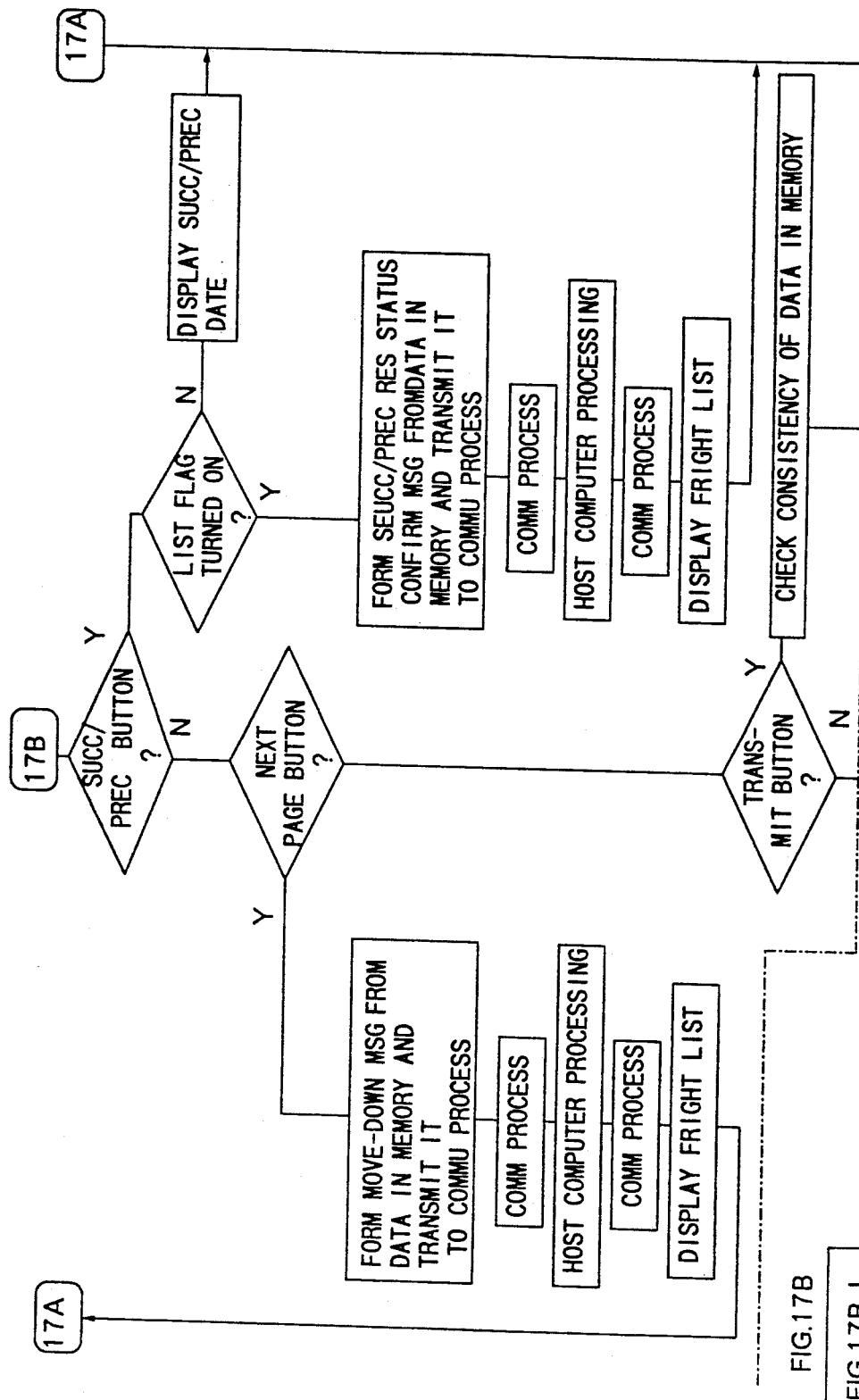
FIGS. 17A(I,II) 17B(I,II) and 17C(I,II) are flowcharts for assistance in explaining the flight number reservation process.

The flight number reservation process will be explained with reference to FIGS. 17A, B and C. When the flight number reservation image is not displayed in front, the flight number reservation image can be displayed in front by selecting the flight number reservation process in the menu processing, clicking a visible part of the flight number reservation image, or double clicking the flight number reservation tag image displayed on the reservation edition image, as already described. During the in-front display of the flight number reservation image, when each tag image of the date designation, domestic city designation or the international city designation is double clicked, the process corresponding to the double-clicked tag image (FIG. 18, 19 or 20) is started and displayed in front on the image. Date data and city data are inputted in the date designation process, the domestic city designation process or the international city designation process are transferred to the flight number reservation process through inter-process communications and then displayed on the flight number reservation image. When various buttons on the flight number reservation image are clicked, various operations corresponding to the clicked buttons can be executed such as inputted data display, message transmission to the host computer, response data reception from the host computer, the received data display, etc. all described already. When the flight number reservation pictogram is double clicked, the flight number reservation image can be deleted.

Figure 18A:
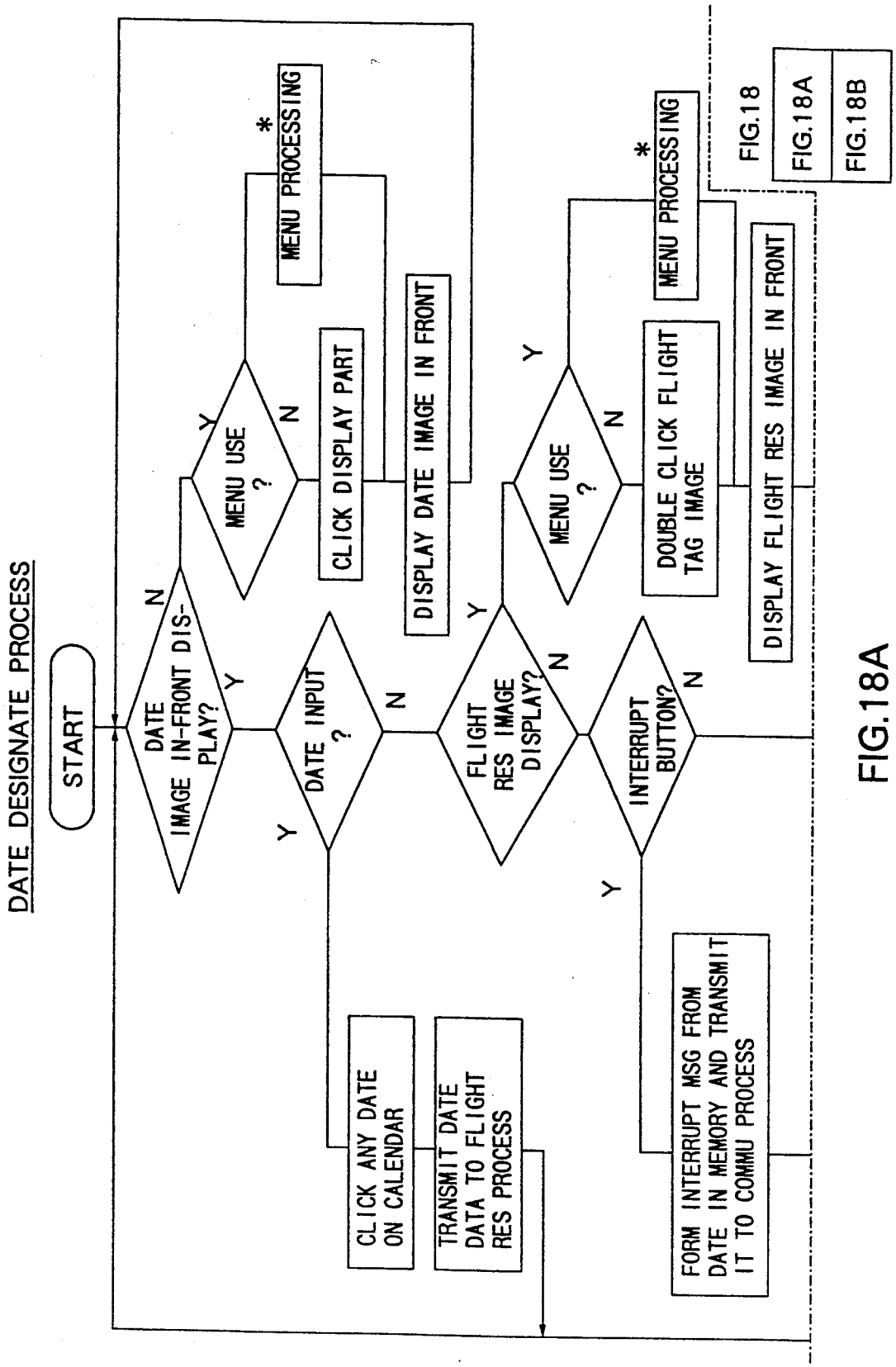
FIG. 18(A,B) is a flowchart for assistance in explaining the date designation process when a date designation image is opened on a flight number reservation image.
Figure 18B:
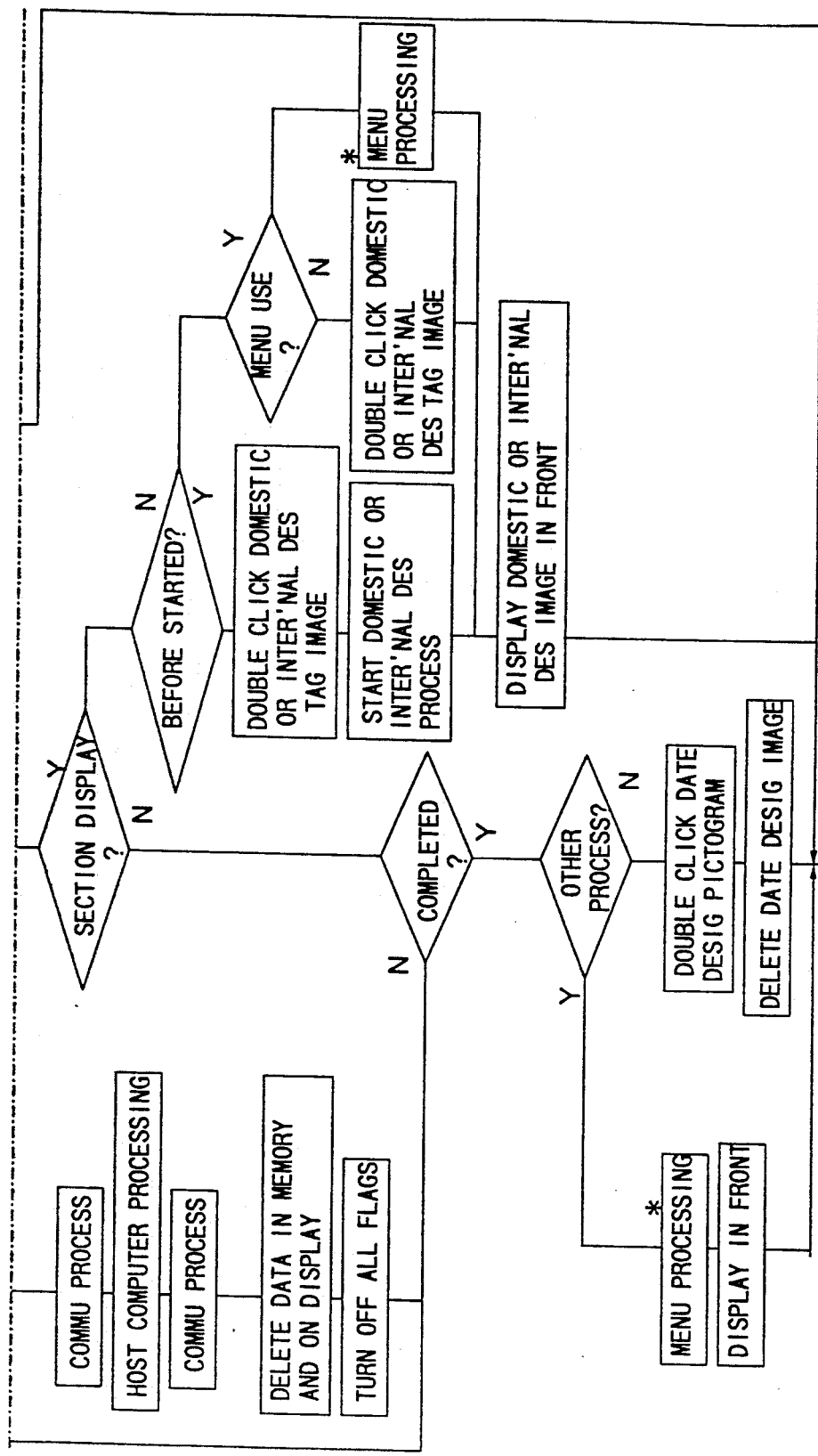
Figure 21E:
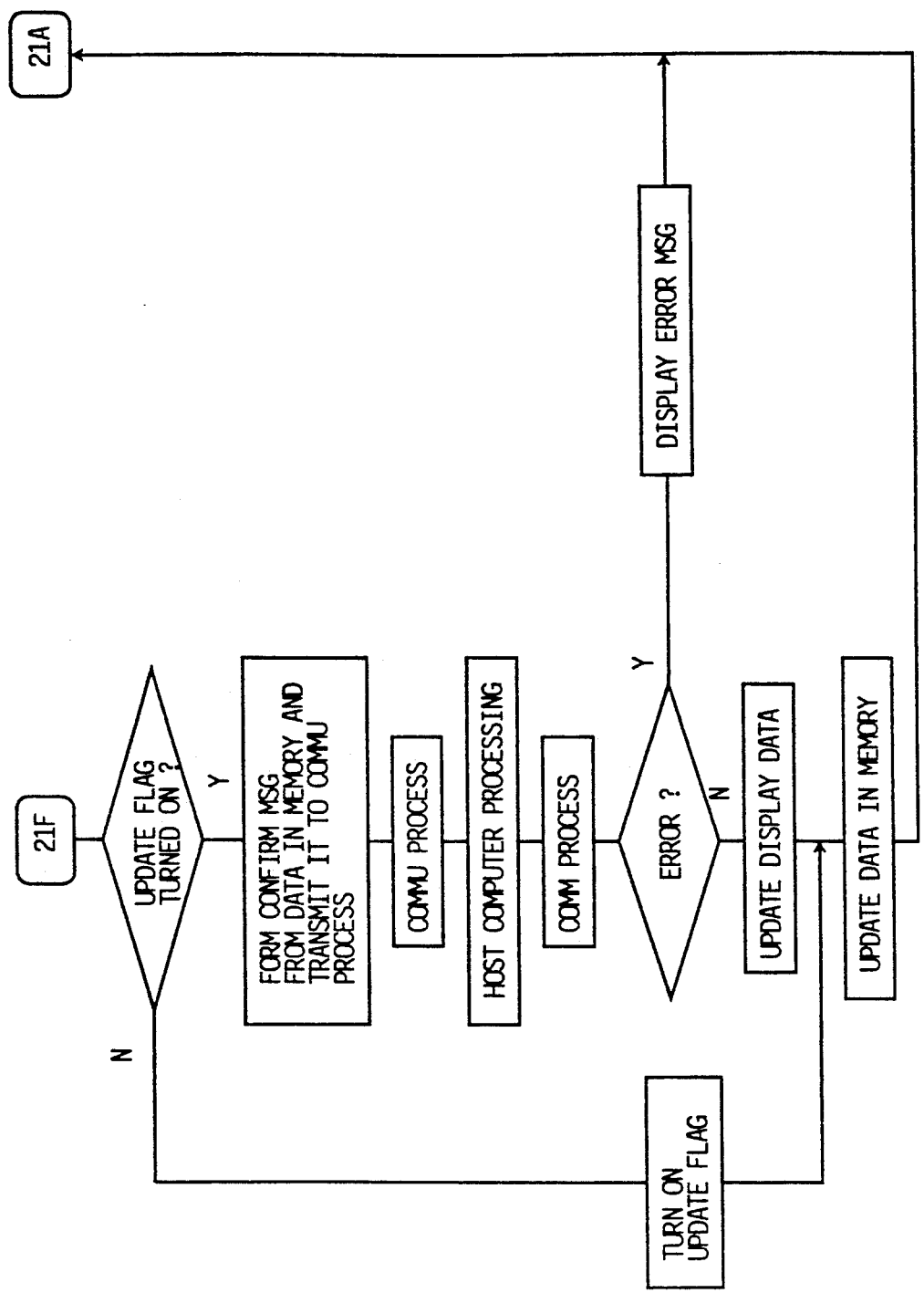
FIGS. 21A(I,II), 21B(I,II,III), 21C(I,II,III), 21D(I,II), 21E, 21F(I,II,III) and 21G(I,II) are flowcharts for assistance in explaining the reservation edit process after the reservation has been completed.

FIG. 18 shows the date designation process. This date designation image can be displayed in front by selecting the date designation process in the menu processing, clicking a visible part of the date designation image or double clicking the date designation tag image on the other images (e.g. the flight number reservation image). During the in-front display of the date designation image, when any one of the date switches displayed on the image is clicked, the date data corresponding to the clicked switch are transferred to the reservation process through the inter-process communications. When the tag image of the flight number reservation, the domestic city designation or the international city designation displayed on the date designation image is double clicked, the process corresponding to the double-clicked tag image is displayed in front on the image (after having been started if the corresponding process is at halt).

FIGS. 19A and 19B show the domestic city designation process. The domestic city designation image can be displayed in front by selecting the domestic city designation process in the menu processing, clicking a visible part of the domestic city designation image or double clicking the domestic city designation tag image on the other images. During the in-front display of the domestic city designation image, when the various switches or buttons are clicked, various operations related to the domestic city designation can be executed such as departure/arrival inputting, inputted data transferring to the flight number reservation process, etc. During the in-front display of the domestic city designation image, when either one of the flight number reservation tag image, the international city tag image, or the date designation tag image is double clicked, the process corresponding to the double-clicked tag image is displayed in front.

FIGS. 20A and 20B show the international city designation process, which is basically the same in operation as the domestic city designation process.

The reservation edition process will be explained hereinbelow with reference to FIGS. 21A to 21G.

The reservation edition image can be displayed in front by selecting the reservation edition process in the menu processing or clicking a visible part of the reservation edition image. As already explained, since the size of the reservation edition image is the largest in all, it is possible to display in front the reservation edition image at any reservation procedure. When a tag image of another process is double clicked on this image, a process image corresponding to the double-clicked tag image is displayed in front. Further, various information processed in the other process and necessary for the reservation edition process is automatically transferred to the reservation edition process through inter-process communications and then displayed on the reservation edition image. When various buttons or switches displayed on the reservation edition image are clicked or thereafter the keyboard is operated, various operations can be executed such that inputted data are displayed on the reservation image; messages are transmitted to the host computer; response data from the host computer are received and displayed; etc., as already explained.

Figure 22A:
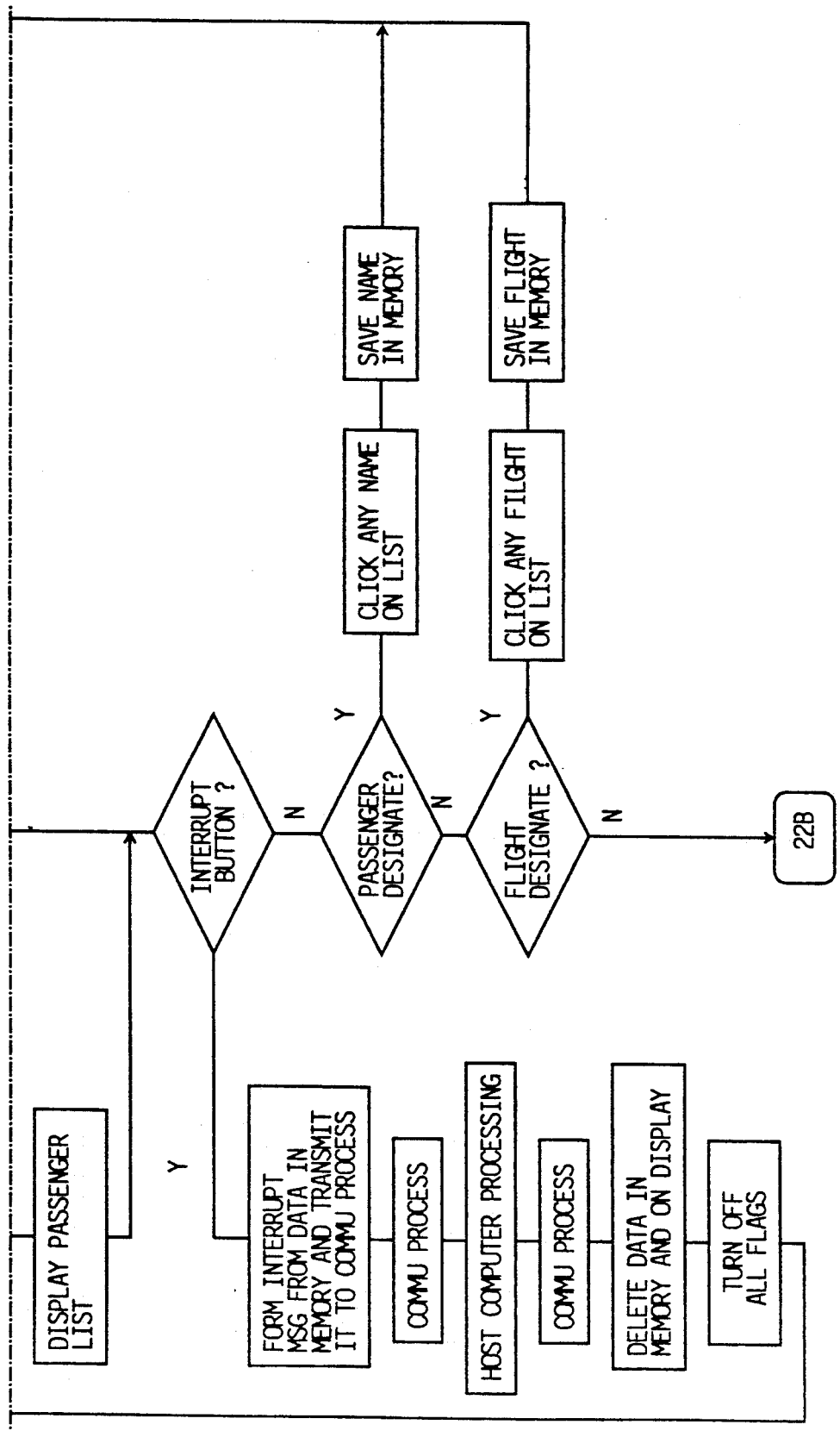
FIGS. 22A(I,II) and 22B(I,II) are flowcharts for assistance in explaining the previous seat designation process.

FIGS. 22A and 22B shown the previous seat designation process. The previous seat designation image can be displayed in front by selecting the previous seat designation process in the menu processing, clicking a visible part of the previous seat designation image, or double-clicking the previous seat designation tag image on the reservation edition image. When various buttons on this image and lists within the scroll selector are clicked, various processing required for the previous seat designation process can be executed as already explained.

FIGS. 23A and 23B show a seat chart process. This seat chart image for the seat chart process can be displayed in front by selecting the seat chart process in the menu processing, clicking a visible part of the seat chart image or a seat chart button on the previous seat image. Whenever the seat buttons are clicked on the seat chart image, the clicked seat numbers can be saved. When various buttons on the seat chart image are clicked, various operations can be executed in correspondence to the clicked buttons as already explained.

The reservation record reference process will be explained with reference to FIGS. 24A and 24B.

The reservation record reference image can be displayed in front by selecting the reservation record reference process in the menu processing, clicking a visible part of the reservation record reference image, or double-clicking the reservation record reference tag image on the reservation edition image. When various switches and buttons on this image are clicked, various operations corresponding to the clicked switches and buttons are executed, as already explained. When the contents of a specific reservation record is required to be referred to in this reservation record reference process, the contents are transferred to the reservation edition process automatically through the inter-process communications, and then displayed in front on the reservation edition image.

FIGS. 25A, 25B and 25C show the hotel reservation process, and FIGS. 26A, 26B and C show the tour reservation process. These processes are basically similar to the flight number reservation process. That is, when various buttons and switches on the hotel or tour reservation image or lists within the scroll selector are clicked, various processing procedures corresponding to the clicked parts can be executed.

FIGS. 27A and 27B show the international city designation process started by double clicking the international city designation tag image on the hotel or tour reservation image. This process includes the processing of the international city designation process shown in FIG. 20 and the processing of the visit city designation.

Figure 28:
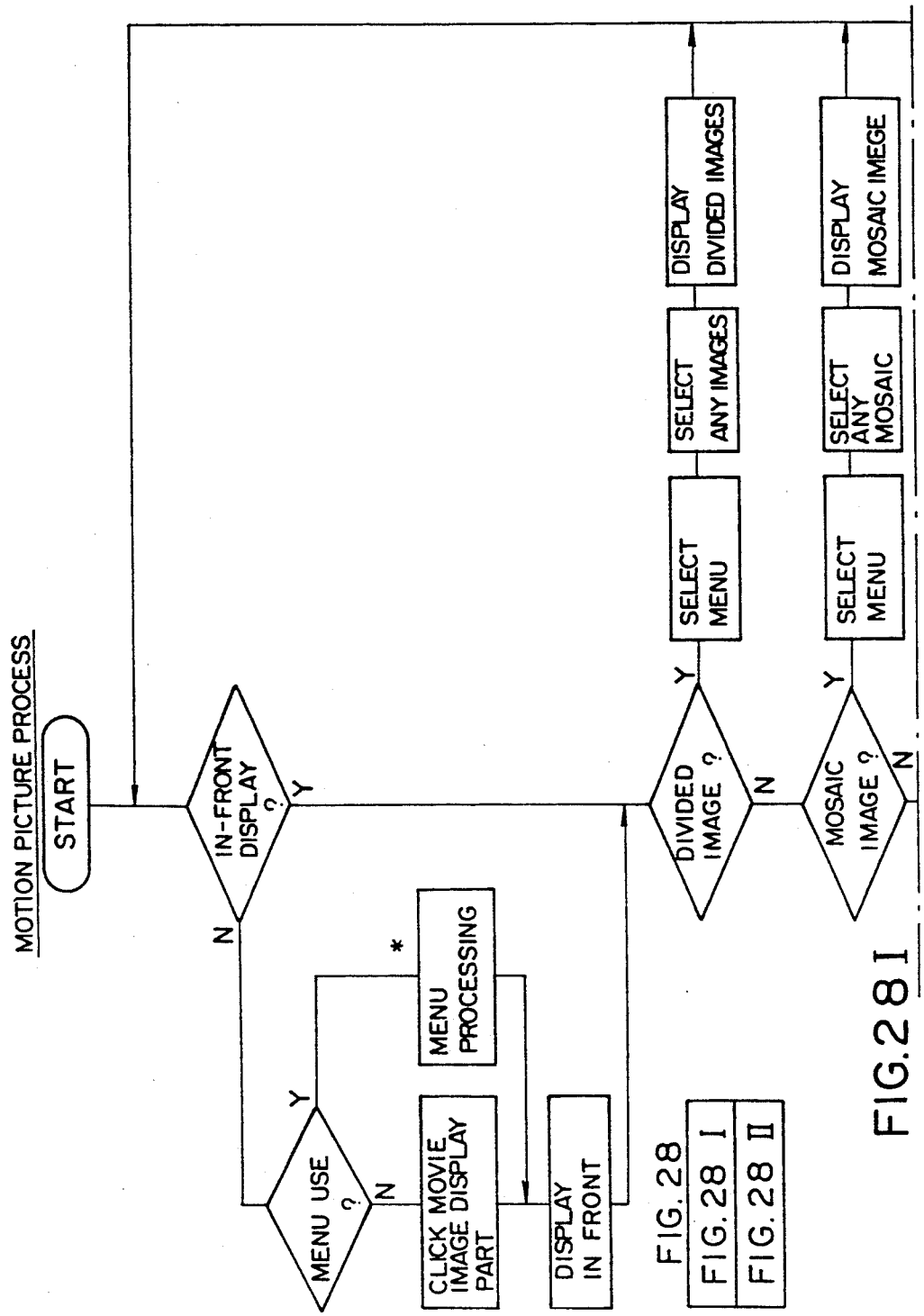
FIG. 28(I,II) is a flowchart for assistance in explaining the motion picture display process.
Figure 28:
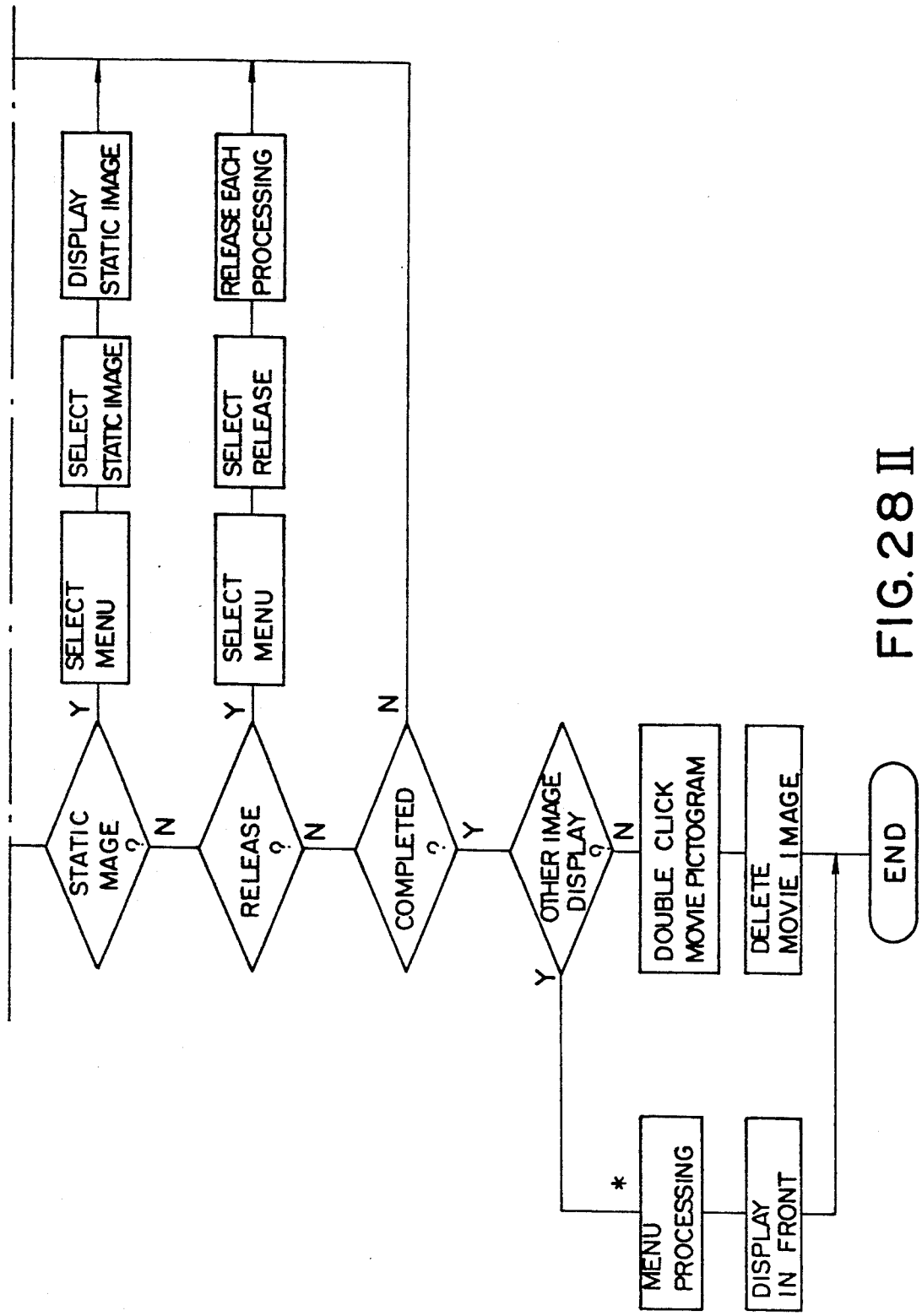

FIG. 28 shows the motion picture process. The motion picture image can be displayed in front by selecting the motion picture process in the menu processing, clicking a visible part of the motion picture image, or double-clicking the motion picture tag image on the reservation edition image. Further, divided image or mosaic image processing or static image display can be executed. Further, the motion picture image can be deleted by double clicking the motion picture pictogram.

One preferred embodiment of the present invention has been explained by way of example as described above. Without being limited thereto, however, the present invention can be applied not only to a reservation system for only flight number, hotel or tour, but also to the reservation system for other transport facilities, theaters, restaurants, etc. Further, it is also possible to omit some of the afore-mentioned processes according to the required reservation objects and the number of observation items. In the case of the most simple system, for instance, the reservation process and the host-to-terminal communication process may be sufficient. Further, it is also possible to incorporate one of the above-mentioned various process with a conventional system. Furthermore, the composition of the images can be modified in various ways.

What is claimed is:

1. A reservation system terminal associated with a host computer for processing reservation status, which comprises:
(A) reserving means (35, 41, 43, 45, 47) for forming a reservation image, said reservation image including a firs part for inputting data related to predetermined reservation items, a second part for inquiring of the host computer a reservation status related to the inputted data concerning the predetermined reservation items, a third part for selecting a reservation option from one or more reservation options provided by the host computer, and a fourth part for requesting of the host computer a reservation acquisition related to the selected reservation option;

(B) displaying means (119, 121, 17) for receiving the reservation images formed by said reserving means, and forming and displaying a display image including the formed reservation image;

(C) pointing device means (30) for operating the parts arranged in the image displayed by said displaying means;

(D) part operation detecting means (31, 33) for detecting the part operated by said pointing device means; and (E) host-to-terminal communicating means (125) for transmitting various messages to said host computer and receiving response data from said host computer.

2. The reservation system terminal of claim 1, which further comprises motion picture playback means (15, 19) for playing back a previously recorded motion picture related to said selected reservation option, said displaying means simultaneously displaying the reservation image formed by said reserving means and the motion picture played back by said motion picture playback means on the display image in an overlapping arrangement condition.

3. A reservation system terminal associated with a host computer for processing reservation status, which comprises:

(A) reserving means (35, 41, 43, 45, 47) for forming a reservation image, said reservation image including a first part for inputting data related to predetermined reservation items, a second part for inquiring of the host computer a reservation status related to the inputted data concerning the predetermined reservation items, a third part for selecting a reservation option from one or more reservation options provided by the host computer, and a fourth part for requesting of the host computer a reservation acquisition related to the selected reservation option;

(B) reservation item selecting means (37, 39) for forming a reservation item selection image, said reservation item selection image including a plurality of parts for selecting any one of a plurality of predetermined selectable data package options related to at least one specific item among the reservation items;

(C) displaying means (119, 121, 17) for receiving the reservation image formed by said reserving means and the reservation item selection image formed by said reservation item selecting means, and forming and displaying a display image which includes the two images arranged in overlapping condition;

(D) pointing device means (30) for operating the parts arranged in the display image displayed by said displaying means;

(E) part operation detecting means (31, 33) for detecting the part operated by said pointing device means;

(F) inter-process communicating means (123) connected between said reserving means and said reservation item selecting means, for allowing communications therebetween;

(G) host-to-terminal communicating means (125) for transmitting various messages to said host computer and receiving response data from said host computer; and (H) said reservation item selecting means being adapted for selecting one of the selectable data package options on the basis of the part operation detected by said part operation detecting means in the reservation item selection image, and for transmitting the data package option selection to said reserving means via said inter-process communicating means as inputted data related to the specific item.

4. The reservation system terminal of claim 3, wherein said inter-terminal communicating means is a memory unit accessible from both said reserving means and said reservation item selecting means in order to store information to be transmitted/received between said two means.

5. The reservation system terminal of claim 3, wherein said displaying means comprises image controlling means (119) for controlling an arrangement of the reservation image and the reservation item selection image according to a part operation detected by said part operation detecting means.

6. A reservation system terminal associated with a host computer for processing reservation status, which comprises:

(A) reserving means (35, 41, 43, 45, 47) for forming a reservation image, said reservation image including a first part for inputting data related to predetermined reservation items, a second part for inquiring of the host computer a reservation status related to the inputted data concerning the predetermined reservation items, a third part for selecting a reservation option from one or more reservation options provided by the host computer, and a fourth part for requesting of the host computer a reservation acquisition related to the selected reservation option;

(B) reservation editing means (51, 53, 55, 57) for forming a reservation edition image including arranged parts for inputting data related to predetermined detailed reservation items, and requesting a reservation record preparation related to the inputted data concerning the predetermined detailed reservation items and already-acquired reservations to said host computer;

(C) displaying means (119, 121, 17) for receiving the reservation image formed by said reserving means and the reservation edition image formed by said reservation editing means, and forming and displaying a display image including the two images arranged in overlapping condition;

(D) pointing device means (30) for operating the parts arranged in the image displayed by said displaying means;

(E) part operation detecting means (31, 33) for detecting the part operated by said pointing device means;

(F) inter-process communicating means (123) connected between said reserving means and said reservation editing means, for allowing communications therebetween; and (G) host-to-terminal communicating means (125) for transmitting various messages to said host computer and receiving response data from said host computer.

7. The reservation system terminal of claim 6, wherein said inter-terminal communicating means is a memory unit accessible from both said reserving means and said reservation editing means in order to store information to be transmitted/received between said two means.

8. The reservation system terminal of claim 6, wherein said displaying means comprises image controlling means (119) for controlling an arrangement of the reservation image and the reservation edition image according to a part operation detected by said part operation detecting means.

9. A reservation system terminal associated with a host computer for processing reservation status, which comprises:

(A) reservation record referring means (71, 73, 81, 83, 85) for forming a reservation record reference image, said record reference image including a first part for inputting data related to predetermined reservation record reference items so as to form a selected reservation record, a second part for referring to the host computer for an already-prepared reservation record relating to the data concerning the inputted reservation record reference items, a third part for displaying the selected and prepared reservation records, and a fourth part for referring to the host computer said selected reservation record and said prepared reservation record;

(B) reservation editing means (51, 53, 55, 57) for forming a reservation edition image including a plurality of parts for inputting data to be changed that is related to the predetermined detailed reservation items, and requesting change in the selected and prepared reservation records related to the inputted detailed reservation items to be changed in said host computer;

(C) displaying means (119, 121, 17) for receiving the reservation image formed by said reservation record preparing means and the reservation edition image formed by said reservation editing means, and forming and displaying a display image including these two images arranged in overlapping condition;

(D) pointing device means (30) for operating the parts arranged in the display image displayed by said displaying means;

(E) part operation detecting means (31, 33) for detecting the part operated by said pointing device means;

(F) inter-process communicating means (123) connected between said reservation record referring means and said reservation editing means, for allowing communications therebetween; and (G) host-to-terminal communicating means (125) for transmitting various messages to said host computer and receiving response data from said host computer.

10. The reservation system terminal of claim 9, wherein said inter-terminal communicating means is a memory unit accessible from both said reservation record referring means and said reservation editing means in order to store information to be transmitted/received between said two means.

11. The reservation system terminal of claim 9, wherein said displaying means comprises image controlling means (119) for controlling an arrangement of the reservation record reference image and the reservation edition image according to part operation detected by said a part operation detecting means.

12. A reservation system terminal associated with a host computer for processing reservation status, which comprises:

(A) reserving means (35, 41, 43, 45, 47) for forming a reservation image, said reservation image including a first part for inputting data related to predetermined reservation items, a second part for inquiring of the host computer a reservation status related to the inputted data concerning the predetermined reservation items, a third part for selecting a reservation option from one or more reservation options provided by the host computer, and a fourth part for requesting of the host computer a reservation acquisition related to the selected reservation option;

(B) reservation record referring means (71, 73, 81, 83, 85) for forming a reservation record reference image, said record reference image including a first part for inputting data related to predetermined reservation record reference items so as to form a selected reservation record, a second part for referring to the host computer for an already-prepared reservation record related to the data concerning the inputted reservation record reference items, a third part for displaying the selected and already-prepared reservation records, and a fourth part for referring to the host computer the selected reservation record and the prepared reservation record;

(C) reservation editing means (51, 53, 55, 57) for forming a reservation edition image including arranged parts for inputting data related to predetermined detailed reservation items, requesting a reservation record preparation related to the inputted data concerning the predetermined detailed reservation items and already-acquired reservations to said host computer, inputting data changes related to the predetermined detailed reservation items, and requesting of the host computer a change in the selected and prepared reservation records related to the inputted detailed reservation items to be changed;

(D) displaying means (119, 121, 17) for receiving the reservation image formed by said reserving means, the reservation record reference image formed by said reservation record referring means, and the reservation edition image formed by said reservation editing means, and forming and displaying a display image including these three images arranged in overlapping condition;

(E) pointing device means (30) for operating the parts arranged in the image displayed by said displaying means;

(F) part operation detecting means (31, 33) for detecting the part operated by said pointing device means;

(G) inter-process communicating means (123) connected between said reserving means, said reservation record referring means and said reservation editing means, for allowing communications therebetween; and (H) host-to-terminal communicating means (125) for transmitting various messages to said host computer and for receiving response data from said host computer.

13. The reservation system terminal of claim 12, wherein said inter-terminal communicating means is a memory unit accessible from any of said reserving means, reservation record referring means and said reservation editing means in order to store information to be transmitted/received among said three means.

14. The reservation system terminal of claim 12, wherein said displaying means comprises image controlling means (119) for controlling an arrangement of the reservation image, the reservation record reference image and the reservation edition image according to a part operation detected by said part operation detecting means.

15. A method of operating a terminal computer incorporated in a reservation system terminal associated with a host computer for processing reservation status and provided with a display unit coupled to the terminal computer to display images and with a pointing device also coupled to the terminal computer to point visible parts on the displayed image, comprising the steps of:

(A) forming a reservation image with a plurality of parts including a first part for inputting data related to predetermined reservation items, a second part for inquiring of the host computer a reservation status related to the inputted reservation items, a third part for selecting a reservation option from one or more reservation options provided by the host computer and a fourth part for requesting of the host computer a reservation acquisition related to the selected reservation option;

(B) forming a display image including the formed reservation image, and transmitting the formed display image to the display unit for display;

(C) detecting a part operated by the pointing device on the displayed image;

(D) if a part pointing operation for inputting the data relating to the reservation items is detected, displaying the inputted data relating to the reservation items on the reservation image;

(E) if a part pointing operation for inquiring of the host computer the reservation status is detected after the inputted reservation items have been displayed, forming a reservation status inquiry message for inquiring the reservation status related to the inputted reservation items;

(F) transmitting the formed reservation status inquiry message to the host computer;

(G) receiving reservation status information indicative of selectable reservation options transmitted from the host computer in response to the inquiry message;

(H) forming a list indicative of the selectable reservation options on the basis of the reservation status information, and displaying the formed list related to the part for selecting a desired reservation option on the reservation image;

(I) if a part pointing operation for selecting the reservation object is detected after the reservation option list has been displayed, displaying the reservation option selected by the part pointing operation on the reservation image;

(J) if a part pointing operation for requesting the reservation acquisition is detected after the selected reservation option has been displayed, forming a reservation request message for requesting a reservation acquisition related to the selected reservation option;

(K) transmitting the formed reservation request message to the host computer;

(L) receiving reservation acquisition information indicative of the items of the acquired reservation transmitted from the host computer in response to the reservation request message; and (M) displaying the acquired reservation items on the reservation image on the basis of the acquired reservation information.

16. A method of operating a terminal computer incorporated in a reservation system terminal associated with a host computer for processing reservation status and provided with a display unit coupled to the terminal computer to display images and with a pointing device also coupled to the terminal computer to point visible parts on the displayed image, comprising the steps of:

(A) forming a reservation image with a plurality of parts including a first part for inputting data related to predetermined reservation items, a second part for inquiring of the host computer a reservation status related to the inputted reservation items, a third part for selecting a reservation option from one or more reservation options provided by the host computer and a fourth part for requesting of the host computer a reservation acquisition related to the selected reservation option;

(B) forming a reservation item selection image including parts for selecting one item from a plurality of selectable items previously determined with respect to data inputted and relating to at least one specific item among the reservation items;

(C) forming a multidisplay image including the reservation image and the reservation item selection image, and transmitting the formed multidisplay image to the display unit for display;

(D) detecting a part operated by the pointing device on the displayed image;

(E) if a part pointing operation is detected on the reservation item selection image, transmitting one item selected by the part pointing operation to the reservation image, and displaying the transmitted item on the reservation image;

(F) if a part pointing operation for inputting data relating to one of the reservation items is detected, displaying the inputted data relating to the one reservation item on the reservation image;

(G) if a part pointing operation for inquiring into the reservation status is detected after the inputted reservation items have been displayed, forming a reservation status inquiry message for inquiring into the reservation status related to the inputted reservation items;

(H) transmitting the formed reservation status inquiry message to the host computer;

(I) receiving reservation status information indicative of one or more selectable reservation options transmitted from the host computer in response to the inquiry message;

(J) forming a list indicative of the selectable reservation options on the basis of the reservation status information, and displaying the formed list related to the part for selecting the reservation options on the reservation image;

(K) if a part pointing operation for selecting a reservation option is detected after the reservation option list has been displayed, displaying the reservation option selected by the part pointing operation on the reservation image;

(L) if a part pointing operation for requesting the reservation acquisition is detected after the selected reservation option has been displayed, forming a reservation request message for requesting a reservation acquisition related to the selected reservation option;

(M) transmitting the formed reservation request message to the host computer;

(N) receiving reservation acquisition information indicative of the items of acquired reservation transmitted from the host computer in response to the reservation request message; and (O) displaying the acquired reservation items on the reservation image on the basis of the acquired reservation information.

17. The method of operating a terminal computer of claim 16, which further comprises a step of controlling arrangement of the reservation image and the reservation item selection image, according to the detected part pointing operation.

18. A method of operating a terminal computer incorporated in a reservation system terminal associated with a host computer for processing reservation status and provided with a display unit coupled to the terminal computer to display images and with a pointing device also coupled to the terminal computer to point visible parts on the displayed image, comprising the steps of:

(A) forming a reservation image with a plurality of parts including a first part for inputting data related to predetermined reservation items, a second part for inquiring of the host computer a reservation status related to the inputted reservation items, a third part for selecting a reservation option from one or more reservation options provided by the host computer and a fourth part for requesting of the host computer a reservation acquisition related to the selected reservation option;

(B) forming a reservation editor image which includes a plurality of parts for inputting data related to predetermined detailed reservation items, and requesting the host computer to prepare a reservation record as to the inputted data relating to the predetermined detailed reservation items and of the already acquired reservation option;

(C) forming a multidisplay image including the reservation image and the reservation item selection image, and transmitting the formed multidisplayed image to the display unit for display;

(D) detecting a part operated by the pointing device on the displayed image;

(E) if a part pointing operation for inputting data relating to one of the reservation items is detected, displaying the inputted data relating to the one reservation item on the reservation image;

(F) if a part pointing operation for inquiring into the reservation status is detected after the inputted reservation items have been displayed, forming a reservation status inquiry message for inquiring into the reservation status related to the inputted reservation items;

(G) transmitting the formed reservation status inquiry message to the host computer;

(H) receiving reservation status information indicative of one or more selectable reservation options transmitted from the host computer in response to the inquiry message;

(I) forming a list indicative of the selectable reservation options on the basis of the reservation status information, and displaying the formed list related to the part for selecting the reservation options on the reservation image;

(J) if a part pointing operation for selecting a reservation option is detected after the reservation option list has been displayed, displaying the reservation option selected by the part pointing operation on the reservation image;

(K) if a part pointing operation for requesting the reservation acquisition is detected after the selected reservation option has been displayed, forming a reservation request message for requesting a reservation acquisition related to the selected reservation option;

(L) transmitting the formed reservation request message to the host computer;

(M) receiving reservation acquisition information indicative of the items of acquired reservation transmitted from the host computer in response to the reservation request message;

(N) displaying the acquired reservation items on the reservation image on the basis of the acquired reservation information;

(O) displaying the acquired reservation items on the reservation edition image;

(P) if a part pointing operation for inputting data relating to the detailed reservation items is detected, displaying the data relating to the detailed reservation items inputted by the detected part pointing operation on the reservation edition image;

(Q) if a part pointing operation for requesting the reservation record formation after the acquired reservation information has been displayed and further the inputted detailed reservation items have been displayed, forming a reservation record preparation request message for requesting a reservation record preparation related to the inputted detailed reservation items and the acquired reservation information; and (R) transmitting the formed reservation record preparation request message to the host computer.

19. The method of operating a terminal computer of claim 18, which further comprises a step of controlling arrangement of the reservation image and the reservation edition image, according to the detected part pointing operation.

20. A method of operating a terminal computer incorporated in a reservation system terminal associated with a host computer for processing reservation status and provided with a display unit coupled to the terminal computer to display images and with a pointing device also coupled to the terminal computer to point visible parts on the displayed image, comprising the steps of:

(A) forming a reservation record reference image with a plurality of parts including a first part for inputting data related to predetermined reservation record reference items, a second part for referring to the host computer for an already-prepared reservation record related to the inputted data concerning the reservation record reference items, a third part for selecting the already-prepared reservation record, and a fourth part for referring to the host computer for data relating to said reservation record items which concern the selected reservation record;

(B) forming a reservation edition image including a plurality of parts for inputting changed data relating to predetermined detailed reservation items, and requesting change in the selected reservation record based on the changed data to form a changed reservation record;

(C) forming a multidisplay image including the reservation image and the reservation edition image, and transmitting the formed multidisplay image to the display unit for display;

(D) detecting a part operated by the pointing device on the displayed image;

(E) if a part pointing operation for inputting data related to the reservation record reference items is detected, forming a reservation record reference message for referring to the prepared reservation record reference related to the inputted reservation record reference items;

(F) if a part pointing operation for referring to the reservation record reference is detected after the inputted data of the reservation record reference items have been displayed, forming a reservation record reference message for referring to the prepared reservation record reference related to the inputted data concerning the reservation record reference items;

(G) transmitting the formed reservation record reference message to the host computer;

(H) receiving reservation record information indicative of the prepared reservation record transmitted from the host computer in response to the reference message;

(I) forming a prepared reservation record list on the basis of the reservation record information, and displaying the formed list relating to said fourth part for selecting the reservation record on the reservation record reference image;

(J) if a part pointing operation for selecting the reservation record is detected, forming a reservation record item reference message for referring to the reservation record items related to the prepared reservation record selected by the part pointing operation;

(K) transmitting the formed reservation record item reference message to the host computer;

(L) receiving reservation record item information indicative of the selected reservation record items transmitted from the host computer in response to the reservation record content reference message;

(M) displaying the selected reservation record items obtained on the basis of the reservation record item information on the reservation edition image;

(N) if a part pointing operation for inputting the changed data is detected, displaying the detailed reservation items inputted by the part pointing operation on the reservation edition image;

(O) if a part pointing operation for requesting the reservation record change is detected after the changed data has been displayed, forming a reservation record change request message for requesting change in the selected reservation record related to the inputted detailed reservation items concerning the changed data; and (P) transmitting the formed reservation record change request message to the host computer.

21. A method of operating a terminal computer incorporated in a reservation system terminal associated with a host computer for processing reservation status and provided with a display unit coupled to the terminal computer to display images and with a pointing device also coupled to the terminal computer to point visible parts on the displayed image, comprising the steps of:

(A) forming a reservation image with a plurality of parts including a first part for inputting data related to predetermined reservation items, a second part for inquiring of the host computer a reservation status related to the inputted reservation items, a third part for selecting a reservation option from one or more reservation options provided by the host computer and a fourth part for requesting of the host computer a reservation acquisition related to the selected reservation option;

(B) forming a reservation record reference image with a plurality of parts including a first part for inputting data related to predetermined reservation record reference items, a second part for referring to the host computer for an already-prepared reservation record related to the inputted data concerning the reservation record reference items, a third part for selecting the already-prepared reservation record, and a fourth part for referring to the host computer for data relating to said reservation record items which concern the selected reservation record;

(C) forming a reservation edition image including a plurality of parts for inputting data related to predetermined detailed reservation items, requesting reservation record preparation of the host computer related to the inputted data concerning the detailed reservation items and the requested reservation acquisition, inputting data changes related to predetermined detailed reservation items, and requesting of the host computer change in the selected and already-prepared reservation records related to the inputted data changes concerning the detailed reservation items;

(D) forming a multidisplay image including the reservation image, the reservation record reference image, and the reservation edition image, and transmitting the formed multidisplayed image to the display unit for display;

(E) detecting a part operated by the pointing device;

(F) if a part pointing operation for inputting data relating to the reservation items is detected, displaying the inputted data relating to the reservation items on the reservation image;

(G) if a part pointing operation for inquiring into the reservation status is detected after the inputted data relating to the reservation items has been detected, forming a reservation status inquiry message for inquiring into the reservation status related to the inputted data related to the reservation items;

(H) transmitting the formed reservation status inquiry message to the host computer;

(I) receiving reservation status information indicative of selectable reservation options transmitted from the host computer in response to the formed inquiry message;

(J) forming the selectable reservation option list on the basis of the reservation status information, and displaying the formed list related to a part for selecting the reservation options on the reservation image;

(K) if a part pointing operation for selecting the reservation options is detected after the reservation option list has been displayed, displaying the reservation option selected by the part pointing operation on the reservation image;

(L) if a part pointing operation for requesting the reservation acquisition is detected after the selected reservation option has been displayed, forming a reservation request message for requesting the reservation acquisition related to the selected reservation option;

(M) transmitting the formed reservation request message to the host computer;

(N) receiving acquisition reservation information indicative of the acquired reservation items transmitted from the host computer in response to the reservation request message;

(O) displaying the reservation items acquired on the basis of the acquisition reservation information on the reservation image;

(P) displaying the acquired reservation items acquired on the reservation edition image;

(Q) if a part pointing operation for inputting data related to the reservation record reference items is detected, forming a reservation record reference message for referring to the prepared reservation record reference related to the inputted data concerning the reservation record reference items;

(R) if a part pointing operation for referring to the reservation record reference is detected after the inputted data concerning the reservation record reference item has been displayed, forming a reservation record reference message for referring to the prepared reservation record reference related to the inputted data concerning the reservation record reference items;

(S) transmitting the formed reservation record reference message to the host computer;

(T) receiving reservation record information indicative of the prepared reservation record transmitted from the host computer in response to the reference message;

(U) forming the prepared reservation record list on the basis of the reservation record information, and displaying the formed list related to a part for selecting the reservation record on the reservation record reference image;

(V) if a part pointing operation for selecting the reservation record is detected, forming a reservation record item reference message for referring to the reservation record items related to the prepared reservation record selected by the part pointing operation;

(W) transmitting the formed reservation record content reference message to the host computer;

(X) receiving reservation record item information indicative of the selected reservation record items transmitted from the host computer in response to the reservation record item reference message;

(Y) displaying the selected reservation record items obtained on the basis of the reservation record item information on the reservation edition image;

(Z) if a part pointing operation for inputting data relating to the detailed reservation items is detected, displaying the data relating to the detailed reservation items inputted by the part pointing operation on the reservation edition image;

(AA) if a part pointing operation for requesting the reservation record preparation is detected after the acquired reservation items have been displayed and after the inputted data related to the detailed reservation items has been displayed, forming a reservation record preparation request message for requesting the reservation record preparation related to the inputted data concerning the detailed reservation items and the acquired reservation items;

(AB) transmitting the formed reservation record preparation request message to the host computer;

(AC) if a part pointing operation for inputting data changes is detected, displaying the detailed reservation items inputted by the part pointing operation on the reservation edition image;

(AD) if a part pointing operation for requesting the reservation record change is detected after the items to be changed have been displayed, forming a reservation record change request message for requesting the selected reservation record change related to the inputted data changes concerning the detailed reservation items; and (AE) transmitting the formed reservation record change request message to the host computer.

22. The method of operating a terminal computer of claim 21 which further comprises a step of controlling an arrangement of the reservation image, the reservation record reference image, and the reservation edition image, according to the detected part pointing operation.

23. A method of operating a terminal computer incorporated in a reservation system terminal associated with a host computer for processing reservation status aand provided with a display unit coupled to the terminal computer to display images and with a pointing device also coupled to the terminal computer to point visible parts on the displayed image, and with a motion picture playback unit coupled to the terminal computer to playback previously record motion pictures, comprising the steps of:

(A) forming a reservation image including a plurality of parts for inputting data related to predetermined reservation items, inquiring of the host computer a reservation status related to the inputted data concerning the reservation of items, selecting a reservation option from one or more reservation options provided by the host computer, and requesting a reservation acquisition related to the selected reservation option;

(B) forming a multidisplay image including the formed reservation image and a motion picture being played by the motion picture playback unit, and transmitting the formed multidisplay image to the display unit for dislay;

(C) detecting a part operated by the pointing device on the displayed image;

(D) if a part pointing operation for inputting data relating to the reservation items is detected, displaying the inputted data related to the reservation items on the reservation image;

(E) if a part pointing operation for inquiring into the reservation status is detected after the inputted data relating to the reservation items has been displayed, forming a reservation status inquiry message for inquiring into the reservation status related to the inputted data relating to the reservation items;

(F) transmitting the formed reservsation status inquiry message to the host computer;

(G) receiving reservation status information indicative of selectable reservation options transmitted from the host computer in response to the inquiry message;

(H) forming a list indicative of the selectable reservation options on the basis of the reservation status information, and displaying the formed list related to the part for selecting the reservation option on the reservation image;

(I) if a part pointing operation for selecting the reservation option is detected after the reservation option list has been displayed, displaying the reservation option selected by the part pointing operation on the reservation image;

(J) if a part pointing operation for requesting the reservation aquisition is detected after the selected reservation option has been displayed, forming a reservation request message for requesting a reservation acquisition related to the selected reservation option;

(K) transmitting the formed reservation request message to the host computer;

(L) receiving reservation acquisition information indicative of the items of acquired reservation transmitted from the host computer in response to the reservation transmitted from the host computer in response to the reservation request message; and (M) displaying the acquired reservation items on the reservation image on the basis of the acquired reservation information.

24. The reservation system terminal of claim 4, wherein said displaying means comprises image controlling means (119) for controlling an arrangement of the reservation image and the reservation item selection image according to a part operation detected by said part operation detecting means.

25. The reservation system terminal of claim 7, wherein said displaying means comprises image controlling means (119) for controlling an arrangement of the reservation image and the reservation edition image according to part operation detected by said a part operation detecting means.

26. The reservation system terminal of claim 10, wherein said displaying means comprises image controlling means (119) for controlling an arrangement of the reservation record reference image and the reservation edition image acccording to a part operation detected by said part operation detecting means.

27. The reservation system terminal of claim 13, wherein said displaying means comprises image controlling means (119) for controlling an arrangement of the reservation image, the reservation record reference image and the reservation edition image according to a part operation detected by said part operation detecting means.

* * * * *